US011854427B2

(12) United States Patent
Segall et al.

(10) Patent No.: US 11,854,427 B2
(45) Date of Patent: *Dec. 26, 2023

(54) WEARABLE MEDICAL TRAINER

(71) Applicant: Strategic Operations, Inc., San Diego, CA (US)

(72) Inventors: Stuart C. Segall, La Jolla, CA (US); Kit Lavell, San Diego, CA (US); Jeffery Markham, Oceanside, CA (US); Aislinn Brody, San Diego, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/961,563

(22) Filed: Oct. 7, 2022

(65) Prior Publication Data

US 2023/0037948 A1 Feb. 9, 2023

Related U.S. Application Data

(60) Continuation of application No. 17/489,151, filed on Sep. 29, 2021, and a continuation of application No. 17/151,140, filed on Jan. 16, 2021, now Pat. No. 11,495,143, which is a continuation-in-part of application No. 16/449,279, filed on Jun. 21, 2019, now Pat. No. 11,151,902, which is a continuation-in-part of application No. 16/449,279, filed on Jun. 21, 2019, now Pat. No. 11,151,902, which is a continuation of application No. 15/919,024, filed on Mar. 12, 2018, now Pat. No. 10,360,817, said application No. 17/151,140 is a
(Continued)

(51) Int. Cl.
*G09B 23/30* (2006.01)
*G09B 23/28* (2006.01)
*G09B 23/32* (2006.01)

(52) U.S. Cl.
CPC .......... *G09B 23/303* (2013.01); *G09B 23/28* (2013.01); *G09B 23/30* (2013.01); *G09B 23/32* (2013.01)

(58) Field of Classification Search
CPC ...... G09B 23/303; G09B 23/28; G09B 23/30; G09B 23/32
USPC ........................................................ 434/268
See application file for complete search history.

(56) References Cited

U.S. PATENT DOCUMENTS 2,213,270 A  9/1940  Chase
2,689,415 A  9/1954  Haver
(Continued)

FOREIGN PATENT DOCUMENTS

CA        2777374 A1 *  4/2011  ............. G09B 23/30

*Primary Examiner* — Peter S Vasat
*Assistant Examiner* — Stephen Alvesteffer
(74) *Attorney, Agent, or Firm* — Enrique A. Monteagudo, Esq.

(57) ABSTRACT

Aspects of the present disclosure relate to a wearable medical trainer. The medical trainer may be embodied as a device for simulating wounds and injuries received during a trauma event, or otherwise. Aspects of the present disclosure further relate to a medical training device for Trauma Emergency Casualty Care and Tactical Combat Casualty Care (TCCC). A wearable device may be worn by a live human (e.g., trauma actor) or simulated body (e.g., full/partial manikin, drag dummy, etc.). The medical trainers disclosed herein may include one or more simulated injuries, which may be operational or merely to provide more realism. The medical trainers disclosed herein may further include features directed toward to internal and/or external trauma injuries.

20 Claims, 32 Drawing Sheets

Related U.S. Application Data continuation-in-part of application No. 14/989,165, filed on Jan. 6, 2016, now abandoned, said application No. 15/919,024 is a continuation-in-part of application No. 14/943,099, filed on Nov. 17, 2015, now Pat. No. 9,916,774, which is a division of application No. 14/494,490, filed on Sep. 23, 2014, now Pat. No. 9,336,693, which is a division of application No. 12/803,609, filed on Jun. 30, 2010, now Pat. No. 8,840,403.

(56) References Cited

U.S. PATENT DOCUMENTS

| | | |
|---|---|---|
| 2,752,697 A | 7/1956 | Lawall |
| 2,995,832 A | 8/1961 | Alderson |
| 3,027,655 A | 4/1962 | Alderson |
| 3,562,820 A | 2/1971 | Braun |
| 3,852,893 A | 12/1974 | Smrcka |
| 4,209,919 A | 7/1980 | Krikae et al. |
| 4,221,975 A | 9/1980 | Ledniczki et al. |
| 4,288,222 A | 9/1981 | Kling |
| 4,331,426 A | 5/1982 | Sweeney |
| 4,408,597 A | 10/1983 | Tenny, Jr. |
| 4,439,162 A | 3/1984 | Blaine |
| 4,531,919 A | 7/1985 | Ware |
| 4,773,865 A | 9/1988 | Baldwin |
| 4,878,890 A | 11/1989 | Bilweis |
| 4,917,372 A | 4/1990 | Zeitlin |
| 5,104,328 A | 4/1992 | Lounsbury |
| 5,156,777 A | 10/1992 | Kaye |
| 5,305,181 A | 4/1994 | Schultz |
| 5,397,237 A | 3/1995 | Dhont et al. |
| 5,411,437 A | 5/1995 | Weber et al. |
| 5,634,797 A | 6/1997 | Montgomery |
| 5,823,787 A | 10/1998 | Gonzalez et al. |
| 5,990,625 A | 11/1999 | Meissner et al. |
| 5,995,077 A | 11/1999 | Wilcox et al. |
| 6,022,743 A | 2/2000 | Naughton et al. |
| 6,057,540 A | 5/2000 | Gordon et al. |
| 6,234,804 B1 | 5/2001 | Yong |
| 6,471,723 B1 | 10/2002 | Ashforth et al. |
| 6,544,041 B1 | 4/2003 | Damadian |
| 6,780,016 B1 | 8/2004 | Toly |
| 6,942,692 B2 | 9/2005 | Landau et al. |
| 6,984,208 B2 | 1/2006 | Zheng |
| 7,021,940 B2 | 4/2006 | Morris et al. |
| 7,037,343 B2 | 5/2006 | Imran |
| 7,201,772 B2 | 4/2007 | Schwammenthal et al. |
| 7,326,237 B2 | 2/2008 | DePalma et al. |
| 7,665,995 B2 | 2/2010 | Toly |
| 7,810,504 B2 | 10/2010 | Guzman |
| 7,850,456 B2 | 12/2010 | Chosack et al. |
| 7,857,626 B2 | 12/2010 | Toly |
| 7,887,330 B2 | 2/2011 | King |
| 7,963,770 B2 | 6/2011 | Kukora et al. |
| 7,967,679 B2 | 6/2011 | Ombrellaro et al. |
| 8,012,189 B1 | 9/2011 | Webb et al. |
| 8,070,743 B2 | 12/2011 | Kagen et al. |
| 8,162,668 B2 | 4/2012 | Toly |
| 8,262,668 B2 | 9/2012 | Biegun |
| 8,342,852 B2 | 1/2013 | King |
| 8,382,485 B2 | 2/2013 | Bardsley et al. |
| 8,491,309 B2 | 7/2013 | Parry et al. |
| 8,770,985 B2 | 7/2014 | Adams |
| 8,840,403 B2 * | 9/2014 | Segall ............ G09B 23/32 434/272 |
| 9,017,080 B1 | 4/2015 | Placik |
| 9,336,693 B2 * | 5/2016 | Segall ............ G09B 23/303 |
| 9,916,774 B2 * | 3/2018 | Segall ............ G09B 23/28 |
| 10,360,818 B2 * | 7/2019 | Segall ............ G09B 23/32 |
| 10,847,058 B2 * | 11/2020 | Segall ............ G09B 23/28 |
| 11,495,143 B2 * | 11/2022 | Segall ............ G09B 23/303 |
| 2004/0126746 A1 | 7/2004 | Toly |
| 2007/0218438 A1 | 9/2007 | Sanders et al. |
| 2007/0243512 A1 | 10/2007 | King |
| 2007/0292829 A1 | 12/2007 | King et al. |
| 2008/0038702 A1 | 4/2008 | Choquet |
| 2008/0167398 A1 | 7/2008 | Patil et al. |
| 2008/0227073 A1 | 9/2008 | Bardsley et al. |
| 2008/0274769 A1 | 11/2008 | Linden |
| 2009/0051544 A1 | 2/2009 | Niknejad |
| 2009/0068627 A1 | 3/2009 | Toly |
| 2009/0246747 A1 | 10/2009 | Buckman, Jr. |
| 2009/0263775 A1 | 10/2009 | Ullrich |
| 2009/0291421 A1 | 11/2009 | Duprez et al. |
| 2009/0292161 A1 | 11/2009 | Parker |
| 2009/0298034 A1 * | 12/2009 | Parry ............ G09B 23/30 434/274 |
| 2010/0062407 A1 | 3/2010 | Lecat |
| 2010/0167248 A1 | 7/2010 | Ryan |
| 2010/0167253 A1 | 7/2010 | Ryan et al. |
| 2010/0167254 A1 | 7/2010 | Nguyen |
| 2010/0209899 A1 | 8/2010 | Park et al. |
| 2011/0008760 A1 | 1/2011 | Bevan et al. |
| 2011/0060555 A1 | 3/2011 | Koehler et al. |
| 2012/0003621 A1 | 1/2012 | Segall |
| 2012/0015339 A1 | 1/2012 | Hendrickson et al. |
| 2012/0148994 A1 | 6/2012 | Hori et al. |
| 2012/0202180 A1 | 8/2012 | Stock |
| 2012/0270197 A1 | 10/2012 | Brost |
| 2013/0059279 A1 | 3/2013 | Reid-Searl |
| 2013/0078604 A1 | 3/2013 | King |
| 2013/0123940 A1 | 5/2013 | Hurely et al. |
| 2014/0017650 A1 | 1/2014 | Romero |
| 2014/0082814 A1 | 3/2014 | Rober et al. |
| 2014/0154656 A1 | 6/2014 | Segall |
| 2017/0011655 A1 | 1/2017 | Sakezles |
| 2020/0013314 A1 | 1/2020 | Hare |
| 2021/0150937 A1 | 5/2021 | White |

* cited by examiner

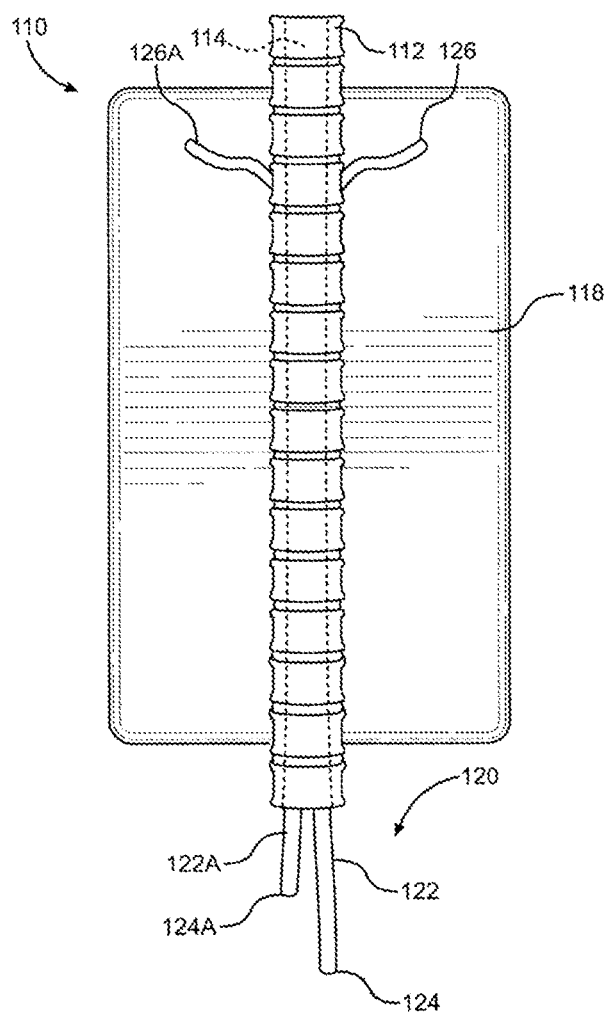 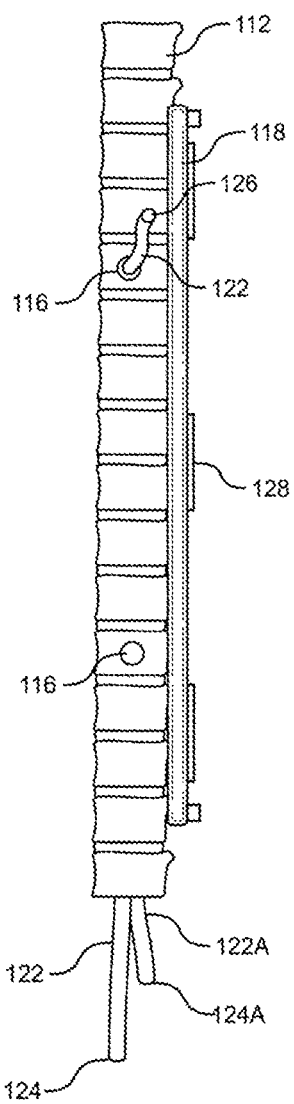
FIG. 8
FIG. 9

WEARABLE MEDICAL TRAINER

CROSS-REFERENCE TO RELATED APPLICATION

The present application is a continuation of currently pending U.S. patent application Ser. No. 17/151,140 (filed Jan. 16, 2021 and entitled "EMERGENCY CASUALTY CARE TRAINER"); which is a continuation-in-part of U.S. patent application Ser. No. 16/449,279 (filed Jun. 21, 2019, entitled "Wearable Partial Task Surgical Simulator" and issued as U.S. patent Ser. No. 11/151,902 on Oct. 19, 2021); which is continuation of U.S. patent application Ser. No. 15/919,024 (filed Mar. 12, 2018, entitled "Wearable Partial Task Surgical Simulator", and issued as U.S. Pat. No. 10,360,817 on Jul. 23, 2019); which is a continuation-in-part of U.S. patent application Ser. No. 14/943,099 (filed Nov. 17, 2015, entitled "Wearable Partial Task Simulator", and issued as U.S. Pat. No. 9,916,774 on Mar. 13, 2018); which is a divisional of U.S. patent application Ser. No. 14/494,490 (filed on Sep. 23, 2014, entitled "Wearable Partial Task Simulator", and issued as U.S. Pat. No. 9,336,693 on May 5, 2016); which is a divisional of U.S. patent application Ser. No. 12/803,609 (filed on Jun. 30, 2010, entitled "Wearable Partial Task Simulator", and issued as U.S. Pat. No. 8,840,403 on Sep. 23, 2014), the contents of which are all incorporated herein by reference in their entirety. The abovementioned currently pending U.S. patent application Ser. No. 17/151,140 is also a continuation-in-part of U.S. patent application Ser. No. 14/989,165 (filed Jan. 6, 2016, entitled "Hemorrhage Control Trainer" and currently abandoned); which is incorporated by reference herein in its entirety.

The present application is also a continuation of currently pending U.S. patent application Ser. No. 17/489,151 (filed Sep. 29, 2021 and entitled "PROSTHETIC INTERNAL ORGAN MODULE"); which is a continuation-in-part of abovementioned U.S. patent application Ser. No. 16/449,279; again the contents of which are all incorporated herein by reference in their entirety.

BACKGROUND OF THE INVENTION

Technical Field

The present invention pertains generally to medical training devices, and is more particularly directed towards devices, systems, and methods for realistically simulating the wounds and injuries to a human for hands-on training.

Related Art

As is well known, and widely accepted, task simulators and training aids can be very effective for teaching individuals how to perform a wide variety of different tasks. More specifically, they can be extremely helpful for teaching an individual how to perform certain medical procedures.

The present disclosure pertains generally to devices and methods for use in simulating the wounds and injuries that a person may receive, for example, during a medical injury event. The present disclosure is particularly, but not exclusively, useful as a training aid for providing realistic-looking medical effects to first responders, in a dynamic presentation, when practicing first aid on a person who has, for example, experienced trauma resulting in a hemorrhaging wound.

U.S Pat. App. Pub. No. 20080227073 filed by Bardsley, et al. on Sep. 28, 2006 shows methods and apparatus for autonomous casualty simulation. In one embodiment an autonomous casualty simulator includes a processing module having a scenario progression controller and a physiological modeling system to receive sensor input and to control effectors. The autonomous casualty simulator can be contained in a nominal human manikin form.

U.S Pat. App. Pub. No. 20070243512 filed by King on Apr. 23, 2007 shows a trauma training system. The trauma training system is described as a system for simulating one or more hemorrhages in order to provide a more dynamic and realistic hemorrhage simulation in order to train medical personnel and other critical care givers, such as first responders, medics, and emergency medical technicians (EMTs) on treating hemorrhages. The system includes a reservoir, a flow controller, and at least one conduit connected to at least one simulated wound site wherein the system supplies fluid to the simulated wound site in order to simulate a hemorrhage. The system may further include a plurality of wound sites that have their respective fluid flows controlled by the fluid flow controller. In at least one embodiment, the reservoir and the flow controller are housed within a bag. In at least one embodiment, the system further includes an audio system for providing audio cues to the simulation participants to enhance the realism of the simulation.

The present disclosure is directed toward overcoming known problems and problems discovered by the inventors.

SUMMARY OF THE INVENTION

A wearable medical trainer for a reference torso is disclosed herein. The wearable medical trainer care suit includes an internal portion sized and dimensioned to cover the chest of a human, a torso couple affixed to the internal portion, and configured to couple the internal portion to the reference torso, and an external raiment having an inner surface and an outer surface, the inner surface configured to face inward, relative to the reference torso, and to cover the internal portion, and the outer surface configured face outward, relative to the reference torso, and to simulate a human skin. The wearable medical trainer care suit further includes a simulated injury positioned forward of the internal portion, relative to the reference torso.

A wearable medical trainer according to another embodiment is also disclosed herein. This embodiment of the wearable medical trainer includes a wearable vest and a simulated skin. The wearable vest includes a first portion sized and dimensioned to cover the chest of a human, a second portion configured to simulate an internal structure of a human torso underneath a human skin, and a torso couple configured to couple the wearable vest to the reference torso. The simulated skin has an inner surface and an outer surface, where the inner surface is configured to face inward, relative to the reference torso, and to cover the simulated internal structure of the human torso, and the outer surface is configured face outward, relative to the reference torso, and to simulate the human skin.

According to another embodiment a medical trainer is also disclosed herein. The medical trainer includes a simulated torso sized and dimensioned as a human torso (the simulated torso including a chest), a wearable vest, and a simulated skin. The wearable vest includes a first portion sized and dimensioned to cover the chest of the simulated torso, a second portion configured to simulate an internal structure of a human torso underneath a human skin, and a torso couple configured to couple the wearable vest to the simulated torso and alternately a human torso. The simulated skin has an inner surface and an outer surface, the inner surface configured to face inward, relative to the reference torso, and to cover the simulated internal structure of the human torso, and the outer surface configured face outward, relative to the reference torso, and to simulate the human skin.

BRIEF DESCRIPTION OF THE DRAWINGS

FIG. 8 is a front view of a module frame of the prosthetic organ module;

FIG. 9 is a side view of the module frame;

DETAILED DESCRIPTION

Figure 1:
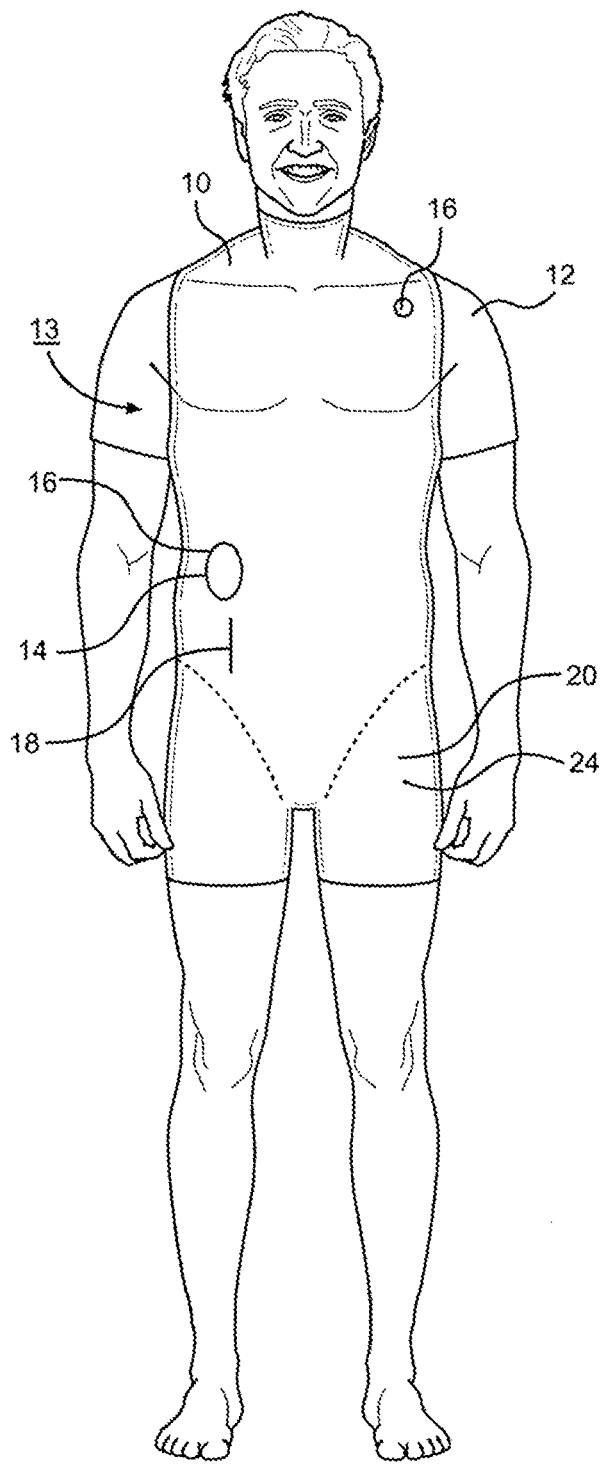
FIG. 1 is a front view of a raiment in accordance with the present disclosure mounted on a human body.

The novel features of this disclosure, as well as the disclosure itself, both as to its structure and its operation, will be best understood from the following description taken in conjunction with the accompanying he accompanying drawings.

Aspects of the present disclosure relate to a wearable device for simulating wounds and injuries received during a trauma event. Aspects of the present disclosure further relate to a medical training device for Trauma Emergency Casualty Care and/or Tactical Combat Casualty Care (TCCC) ("medical trainers"). A wearable device may be worn by a live human (e.g., trauma actor) or simulated body (e.g., full/partial manikin, drag dummy, etc.). The medical trainers disclosed herein may include one or more simulated injuries, which may be operational (e.g., bleeding wound) or merely to provide more realism (e.g., surface wound). The medical trainers disclosed herein may further include features directed toward to internal and/or external trauma injuries.

Aspects of medical trainers disclosed herein (e.g., an emergency casualty care trainer) may be configured for and thus used for realistic training on procedures to treat the three most preventable causes of death on the battlefield or in civilian trauma situations. In particular, the emergency casualty care trainer may be configured for training on massive hemorrhage (i.e., responsive to managed using tourniquets, hemostatic dressings, junctional devices, and pressure dressings). Also, the emergency casualty care trainer may be configured for training on airway management (i.e., responsive to the airway being managed by rapid and aggressive opening of the airway—to include cricothyroidotomy). Also, the emergency casualty care trainer may be configured for training on respiration and breathing management (i.e., responsive to respiration and breathing being assessed for tension pneumothorax, and managed by the aggressive use of needle decompression devices to relieve tension and improve breathing).

As above, and of particular importance for the present disclosure, are those medical procedures that are required for response to a life-threatening, emergency situation resulting in hemorrhaging wounds. The import here is two-fold. Firstly, the medical trainers disclosed herein should effectively augment the educational background that is necessary to assess an emergency situation. Secondly, they should serve as a tool with which a person can learn how to respond to an emergency situation by properly performing essential life-saving tasks. The efficacy of any task simulator or training aid, however, is dependent on the realism it provides and its ability to simulate or mimic an environment where the task is to be actually performed. It is understood that, unless defined otherwise, the various technical and scientific terms used herein may have the same meaning as commonly understood by one of ordinary skill in the art to which this disclosure pertains.

With the above in mind, a catastrophic event presents a situation wherein the proper training of emergency medical personnel can be invaluable. Regardless whether the event is the result of an accident, a natural disaster, or some form of combat, the consequence of a first response to the event may make the difference between life and death. In such instances, the ability of medical personnel to rapidly and reliably attend to wounds and injuries is of crucial importance.

Practice on task simulators/medical trainers, such as medical manikins, are valuable teaching aids. Further, one medical trainer can be used to train several trainees at the same time by allowing one trainee to perform the actual medical procedures required by the simulation while the other trainees observe the response. In addition, the task simulator/medical trainer can be used to train trainees to assist a lead responder when performing the medical procedures. When the simulation comes to an end, the training device can be reset to allow the next person to perform the medical procedure, thereby increasing the training value of the simulation.

In light of the above, it is an object of the present disclosure to provide devices, systems, and methods for realistically and dynamically simulating hemorrhaging wounds that can be received during a traumatic event. Another object of the present disclosure is to provide devices, systems, and methods that effectively function as a training aid to teach a person how to treat the wounds and injuries that can be received by a person during a traumatic event. Still another object of the present disclosure is to provide a training aid for teaching how to treat trauma injuries such as hemorrhaging wounds that is easy to use, is simple to manufacture, and is comparatively cost effective.

Partial Task Surgical Simulator

In accordance with the present disclosure, a partial task surgical simulator (training aid device) is provided for simulating the wounds and injuries on a role player, actor or model that could be received by a person during a trauma event. Specifically, the device includes a raiment fitting over strapped vests that are dimensioned to cover the torso of a person and therefore be worn by a person in a simulation. Further, the raiment can extend over the person's shoulders and upper arms, as well as over his/her groin area and upper thighs. Structurally, the raiment is made primarily of silicone and nylon fiber, and it is formed as a layer having an inner surface and an outer surface, with the outer surface having a color and a texture that is comparable to human skin. The vest is designed to fit under the raiment and on the torso of a body. Structurally, the vest is made primarily of silicone, nylon fiber, plastic and rubber materials, and it is formed as a shield portion covering the front and side of the torso held in place by straps. The vest provides a protective layer between the raiment and the model or actor. The vest is further designed to provide a detail of the internal structure of a human body, such as the rib cage and internal organs, for example, as viewable under the skin. The vest forms a cavity generally under and below the rib cage in which such prosthetic internal organs can be placed. The importance of the disclosure is that the simulator presents first responders with realistic-looking, dynamic medical effects that can simulate and mimic a plurality of different wounds and injuries.

As part of the presentation for simulating a trauma event, the device of the present disclosure comprises a wound simulator that can be selectively attached to the outer surface of the raiment. The wound simulator can then simulate either surface or penetrating wounds and injuries. For example, the wound simulator can be used to simulate surface injuries such as burns, scrapes, abrasions, or the effects of chemical, biological or nuclear agents, or the result of internal injuries from punctures and other injuries. Additionally, the wound simulator can be used to simulate penetrating injuries such as high and low velocity missile wounds caused by gunshot, shrapnel, and blunt/sharp object penetration.

In order to provide added realism for the simulation of penetrating wounds, the raiment is formed with at least one orifice on its outer surface. Further, the raiment includes at least one fluid reservoir that is formed into the layer of the raiment, between its inner and outer surfaces. Specifically, the reservoir is provided for holding a blood-like fluid, and it is connected in fluid communication with the orifice. Thus, the person who is wearing the raiment can selectively expel the blood-like fluid from the reservoir and through the orifice, merely by squeezing the reservoir, to simulate bleeding. Depending on the particularly desired presentation, a wound simulator may be juxtaposed with the orifice to simulate bleeding from the wound.

In addition to the outward appearances of traumatic wounds and injuries mentioned above, the present disclosure also employs prosthetics to mimic certain internal organs and anatomical structures that may be affected by the trauma event. These prostheses are made of composite materials such as open or closed cell polyurethane foam of various densities, elasticity, and deformation characteristics to simulate internal organs. Specifically, these prostheses can be used to mimic torso injuries (e.g., abdominal, upper torso; as well as other injuries, such as thorax wounds/injuries).

For the simulation of penetrating wounds, the present disclosure includes access through the raiment, such as through an orifice, to internal organs within the cavity of the vest. Further, the orifice, wound simulators, reservoirs and internal organs are positioned and juxtaposed to simulate various injury scenarios, which may be selectively done. For example, the organs may include a predetermined length of flexible tubing that is comparable in appearance and texture to intestines. When used, this pseudo intestine is positioned between the vest and the inner surface of the raiment. Further, a portion of the pseudo intestine can be juxtaposed with at least one orifice in the raiment for use in simulating the penetrating abdominal wound within the torso cavity. Similar simulations can be used for various upper torso injuries (e.g., lungs, heart, kidneys, stomach, etc.).

Referring initially to FIG. 1, a simulator in accordance with the present disclosure is shown and designated 13. As shown, an external raiment in accordance with the present disclosure is also shown and designated 10. As shown, the raiment 10 is dimensioned and fitted to cover a person 12 (e.g., person, role player, actor, model). As such, the raiment 10 is a base member of the simulator 13. More specifically, the raiment 10 is intended to be wearable by a human torso (e.g., a person, a manikin, a partial torso, etc.). Accordingly, it is intended to cover the torso of a person 12, or other reference torso, and further may extend over the shoulders, upper arms, groin area and upper thighs of the person 12. For purposes of this disclosure, the person 12 is shown in FIG. 1 to present these anatomical features, but as above, other reference torsos may also include these features. FIG. 1 also indicates that a wound simulator 14 can be used with the raiment 10, and that the raiment 10 can be formed with an orifice 16 from which a blood-like fluid 18 can be expelled. For example, the wound simulator 14 can be used to simulate surface injuries such as burns, scrapes, abrasions, radiation, or the result of internal injuries from punctures and other injuries. Additionally, the wound simulator 14 can be used to simulate penetrating injuries to the internal cavity of the human torso. As further shown in FIG. 1 (and FIGS. 3A and 3B), blood-like fluid 18 may be expelled in various ways (e.g., patches, spots, drops, drips, puddles, ooze spots).

As further shown in FIG. 1, the raiment 10 is made of a layer 20 having an outer surface 24. Preferably, the layer 20 is made of a silicon material that contains nylon fibers. However, other materials may also be used, such as carbon fibers, other composite materials, latex and other rubber materials. In any event, the layer 20 must be sufficiently flexible to allow it to be worn by a person 12 as the person 12 moves to mimic the motions of a severely injured victim of a traumatic event. For this purpose, the outer surface 24 of the raiment 10 is preferably colored and textured to simulate human skin. In alternative embodiments, portions of inner layer 22 may be resin coated to protect the person 12 from being cut, such as by a surgical instrument in simulating trauma events and response to trauma events.

Figure 2A:
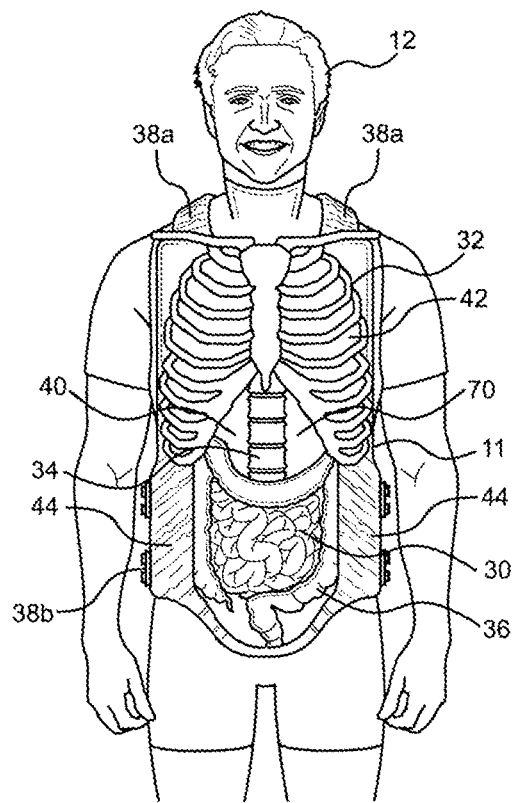
FIG. 2A is a perspective view of a vest in accordance with the present disclosure mounted on a human body.

Referring to FIG. 2A, a vest in accordance with the present disclosure is also shown and designated 11. As shown, vest 11 is dimensioned to fit on the torso of a person 12 as an internal cover or otherwise underneath the raiment 10. Vest 11 may be fitted onto a person 12 by portions 40, 42 and 44 and straps 38a and 38b. More specifically, vest 11 has a first portion 40 covering at least part of the chest of a person 12 (internally, relative to the external raiment 10). Portion 40 is akin to a shield. Portion 40 may be used to protect the person 12 in the course of simulating trauma events and responses to trauma events. Accordingly, it may be made of rigid material, such as polyurethane resin or resin coated.

Vest 11 has a second portion 42 attached to the first portion 40 and forms a cavity 34 in the general area between the first and second portions 40, 42. Vest 11 also has third and fourth side portions 44 attached to the first portion 40 and covering at least part of the sides of the torso of a person 12. Portions 44 may be integrated into portion 40, such as being one continuous portion. Portions 44, 42 and 40 may also be integrated together into one piece constituting the major component of vest 11, other than straps 38. Portions 40, 42 and 44 may also be attached by various conventional mechanical means such as adhesives, fasteners, welding, melding and other joiners. Portions 40, 42 and 44 are preferably constructed of composite or plastic material, but other and additional materials may also be used, such as silicon material that contains nylon fibers, carbon fibers, other composite materials and latex and other rubber materials.

Figure 2B:
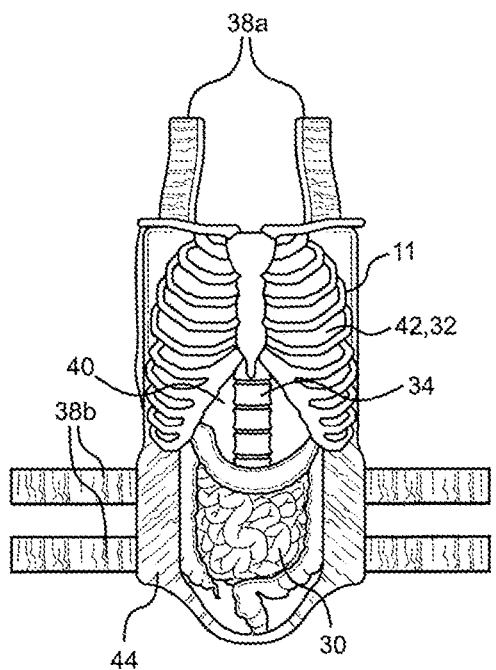
FIG. 2B is a front view of a vest in accordance with the present disclosure.

As shown in FIGS. 2A and 2B, portions 40 and 44 have front and back sides 70, 72. In general, the back sides 72 face towards person 12 and the front sides 70 face away from person 12. As also indicated in FIGS. 2A, 2B and 2C, front side 70 of portions 40 and 42 may be colored or textured to mimic or otherwise resemble or simulate the internal cavity of the torso of a body.

Figure 2C:
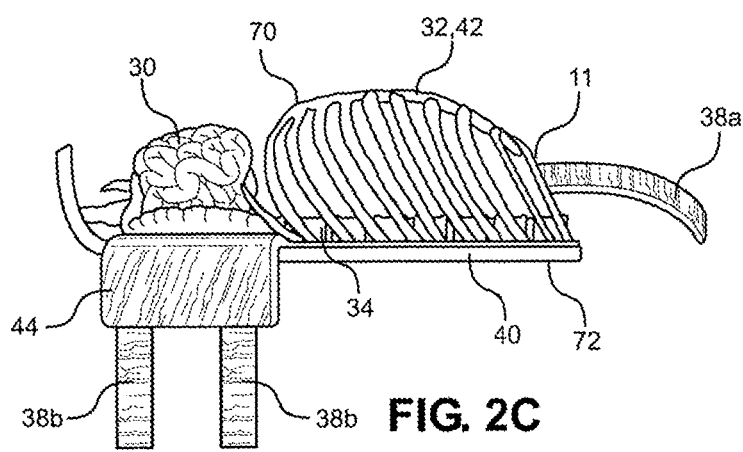
FIG. 2C is a side view of a vest in accordance with the present disclosure.

Also, as shown in FIGS. 2A, 2B and 2C, portion 42 is preferably made as an artificial rib cage 32. As such, portion 42, as rib cage 32, is a prosthetic resembling a human rib cage. Portion 42, including as rib cage 32, is positioned against the inner surface 22 of the raiment 10 (see also FIGS. 3A, 3B, 4) to simulate a skeletal structure. As also shown, at least one prosthetic internal organ 36 (e.g., intestine 30) is positioned within the cavity 34 of the vest 11.

Figure 4:
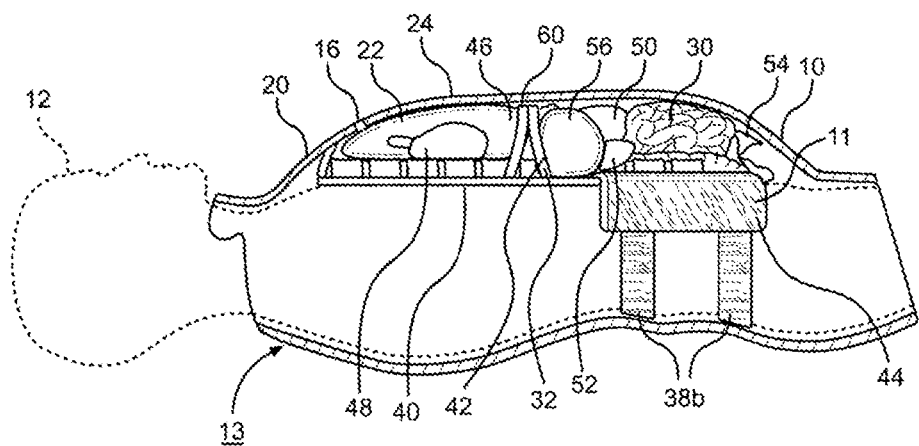
FIG. 4 is side view of a simulator in accordance with the present disclosure mounted on a human body with a cut away view of the vest underneath the raiment.
Figure 5:
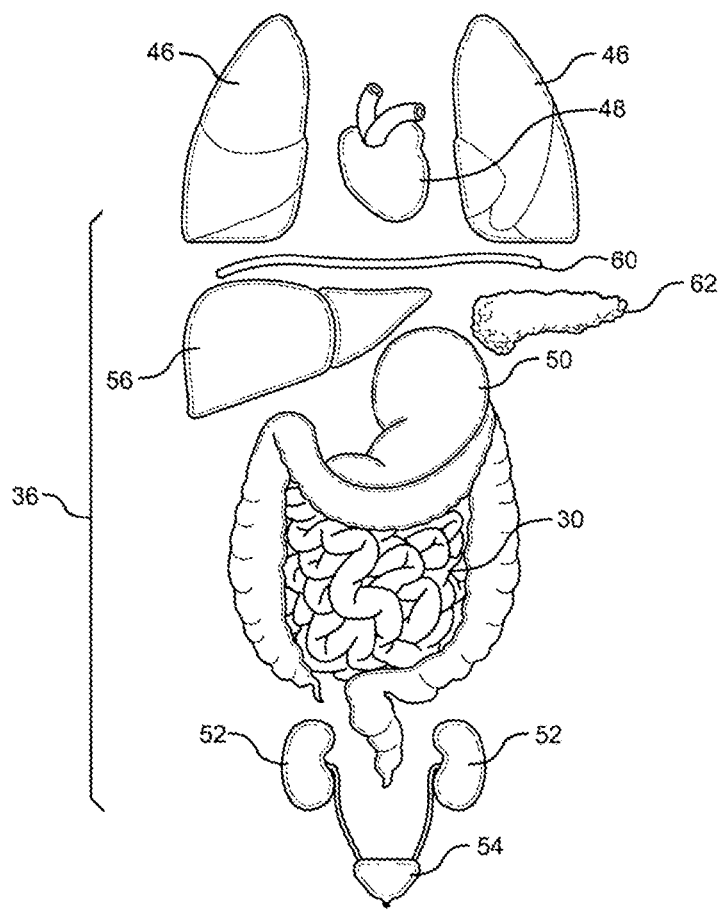
FIG. 5 is an exploded view of prosthetic internal organs of the present disclosure.

The one or more prosthetic internal organs 36 (e.g., intestine 30 as shown in FIGS. 2A, 2B, and 2C; lungs 46, heart 48, stomach 50, kidneys 52, bladder 54, liver 56, diaphragm 60 and spleen 62 as shown in FIGS. 4 and 5) are attached to vest 11 by fittings, adhesives, fasteners, welding, melding and other joiners. Alternatively, one or more prosthetic internal organ 36 may be positioned within cavity 34 of vest 11 without attachment to vest 11.

As further shown in FIGS. 2A, 2B and 2C, the vest 11 is intended to cover at least a part of the front of the torso of a person 12 and to fit over the person's shoulders or around the person's neck by straps 38a and around the torso of the person by straps 38b. Straps 38a are secured to portion 40 of vest 11 and may be secured together or to other straps by various well known means (e.g., buckles, ties, Velcro, etc.). Straps 38b are secured to portion 40 or 44 of vest 11 and may be secured together or to straps 38a in the same fashion.

Figure 3A:
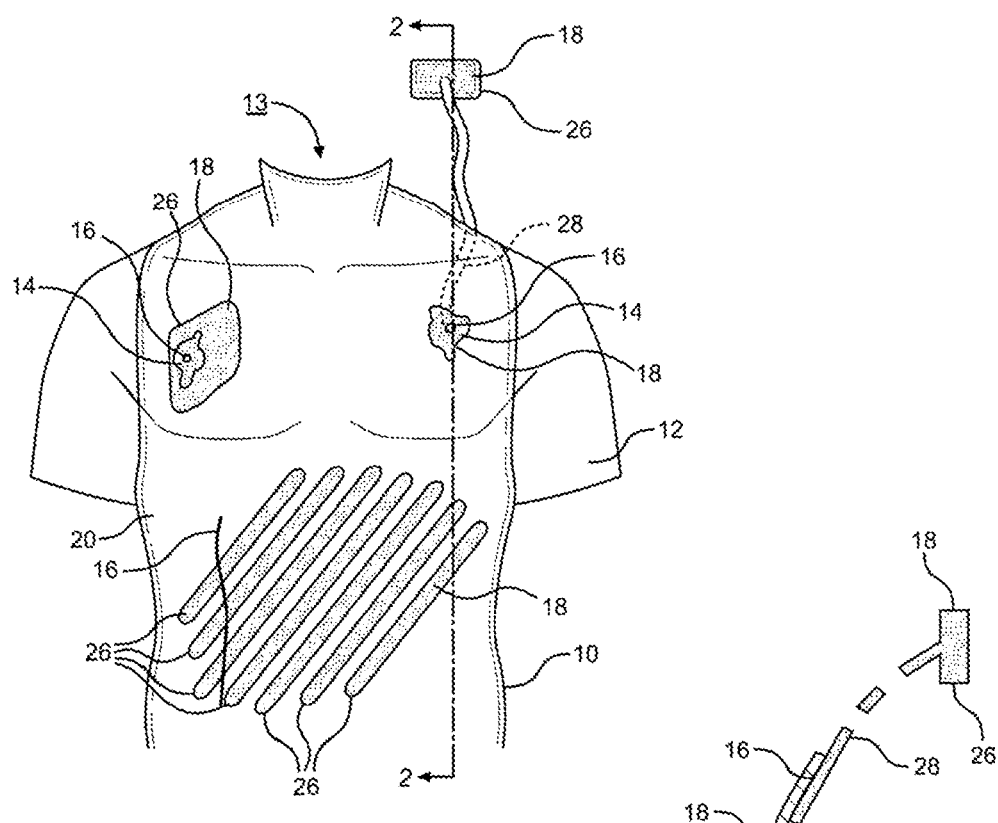
FIG. 3A is a perspective view of the simulator of the present disclosure with cut away views to show internal features of the raiment.
Figure 3B:
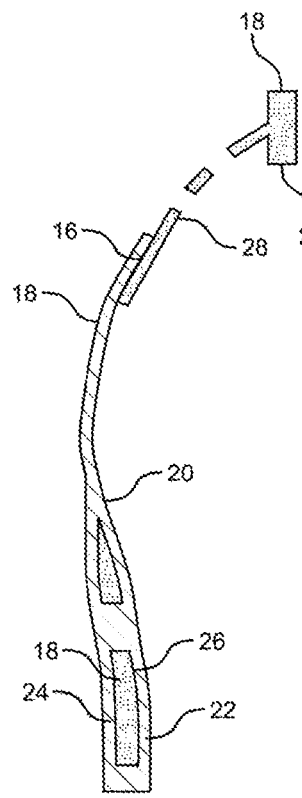
FIG. 3B is a cross sectional view seen along line 2-2 in FIG. 3A.

The structural aspects of the raiment 10 will be more fully appreciated by referencing FIGS. 3A and 3B. There it will be seen that layer 20 of the raiment 10 has inner surface 22 in addition to an outer surface 24. FIGS. 3A and 3B show that the layer 20 of raiment 10 can be formed with one or more reservoirs 26 for holding the blood-like fluid 18 therein. As shown, reservoirs 26 may be embedded in raiment 10 between inner and outer surfaces 22 and 24 or covered by raiment 10. Reservoirs 26 may constitute any shape, including generally rectangular or circular pockets (over the right chest area of person 12 in FIG. 3A), strand like pockets (over the stomach area of person 12 in FIG. 3A) or separate containers (over the left shoulder of person 12 in FIG. 3A). Reservoirs 26 may be attached to raiment 10 by fluid channels 28. Fluid channels 28 preferably constitute flexible tubing mounted under the outer surface 24 of the raiment 10 and may extend and join to reservoirs 26 proximate to or distant from the raiment 10. Tubing for fluid channels 28 may be of predetermined length. Fluid channels 28 constituting such tubing may be positioned against the inner surface 22 of the raiment 10 with a portion thereof juxtaposed with at least one orifice 16. For example, a fluid channel 28 is provided to connect the reservoir 26 in fluid communication with the orifice 16 for use in simulating a penetrating internal wound. Importantly, the reservoir 26 is positioned so it can be squeezed by a hand of a limb of the person 12 who is wearing the raiment 10. Reservoir 26 may be also positioned to be manipulated by the person 12 wearing the raiment 10 to expel blood like fluid 18 in alternative ways, such as by applying pressure with a limb to the reservoir 26 or by changing the position of person 12. This will then cause a portion of blood-like fluid 18 to be expelled from the reservoir 26 and through the orifice 16 to simulate bleeding. As shown, wound simulator 14 may be further aligned with orifice 16 to further simulate the injury, wound or other trauma event.

As shown further in FIG. 3B, reservoir 26 may be filled with blood like fluid 18 and may further be refillable via conventional means, such as filling fluid 18 into reservoir 26 via the same opening for connection of reservoir 26 to channel 28. Or reservoir 26 may be a separate container or pocket with a separate opening for filling reservoir 26 with fluid 18. As such, reservoir 26 may be used to expel fluid 18 for multiple uses. Reservoirs 26 are also preferably replaceable for multiple uses of simulator 13 to simulate multiple trauma events.

Referring back to FIG. 1, it will be appreciated that wound simulator 14 can be juxtaposed with the orifice 16 to simulate a bleeding abrasion. On the other hand, the orifice 16 can be presented as a puncture wound, substantially as shown in FIG. 1, without a surrounding wound simulator 14. By further example, orifice 16 can also present an opening to the cavity 34 of vest 11 to display and access one or more prosthetic internal human organs 36 during simulation of a penetrating wound to the human body. As intended for the present disclosure, the orifice 16 and the wound simulator 14 can be located anywhere on the raiment 10, as desired, to simulate a plurality of different wound/injury presentations. Also, the wound simulator 14 can be used alone to simulate gas or liquid agent injuries.

In addition to the superficial wound/injury presentations disclosed above, the present disclosure also envisions presentations for internal injuries. Specifically, with reference to FIGS. 4 and 5, it will be seen that the present disclosure includes various prostheses for use in simulating wounds/injuries that might be received in a trauma event. These prostheses include: a prosthetic intestine 30, a prosthetic rib cage 32, prosthetic lungs 46, a prosthetic heart 48, a prosthetic stomach 50, prosthetic kidneys 52, a prosthetic bladder 54, prosthetic liver 56, prosthetic diaphragm 60 and a prosthetic spleen 62. In detail, for example, the prosthetic intestine 30 is a length of flexible hosing that is made to resemble a real intestine. Such flexible hosing may be used as fluid channel 28 or reservoir 26 to selectively expel blood like fluid 18. Alternatively, fluid channel 28 and reservoir 26 may be selectively attached to the hosing of intestine 30 to simulate bleeding from the intestine 30 during simulation of a trauma event. Similar arrangements can be made with respect to any of the organs 36.

Preferably, the prosthetic internal organs 36 (30, 46, 48, 50, 52, 54, 56, 60, 62) and rib cage 32 are made from composite, plastic or rubber materials. These prostheses of internal organs 36 (30, 46, 48, 50, 52, 54, 56, 60, 62) are most preferably made of composite materials such as open or closed cell polyurethane foam of various densities, elasticity, and deformation characteristics to simulate internal organs. Other and additional materials may also be used, such as silicon material that contains nylon fibers, carbon fibers, other composite materials and latex and other rubber materials. The prosthetic rib cage 32 is preferably made from rigid material, such as rigid polyurethane resin material. In use, both the prosthetic rib cage 32 and any desired combination of prosthetic internal organs (30, 46, 48, 50, 52, 54, 56, 60, 62) are positioned between the body of the person 12 (actor) who is wearing the raiment 10, and the inner surface 22 of the raiment 10 within the cavity 34 of the vest 11.

As shown in FIG. 4, and also in connection with FIGS. 3A and 3B, internal prosthetic organ(s) 36 may be positioned proximate to at least one orifice 16 and at least one fluid reservoir 26 for simulation of a penetrating wound to the human torso. In use, the raiment 10 of the present disclosure can be used with any combination of superficial wounds/injuries disclosed above. Specifically, there may be a plurality of reservoirs 26, with a corresponding number of orifices 16. Likewise, a plurality of wound simulators 14 can be used.

The prosthetics of organs 36 (i.e. intestine 30, rib cage 32, lungs 46, heart 48, stomach 50, kidneys 52, bladder 54, liver 56, diaphragm 60, spleen 62 (see FIG. 5) and thorax described below may, or may not, be used, as desired. The prosthetic organs 36 may be combined within the cavity 34 in various combinations to simulate wounds and injuries. FIG. 4 shows a preferred embodiment including a large group or package of organs 36. Further, the prosthetic organs 36 may be combined into such packages and formed to represent certain wounds and injuries. For example, a package may be assembled to simulate injuries to the lungs 46 and heart 48 and another package may be assembled to simulate injuries to the stomach 50 and liver 56. The prosthetic organs 36 and packages of prosthetic organs are interchangeable so that various injury scenarios can be simulated. The wound simulators 14, orifices 16, channels 28 and reservoirs 26 are similarly interchangeable and positionable in alternative arrangements so that various injury scenarios can be simulated. And, as explained above, the positions of the wound simulators 14, orifices 16, channels 28, reservoirs 26 and organs 36 may be selectively juxtaposed to simulate various wounds and injuries. Collectively, the component elements of the present disclosure are intended to be used to simulate or mimic the various wounds/injuries that are likely to be received by a person involved in a traumatic event.

Figure 6:
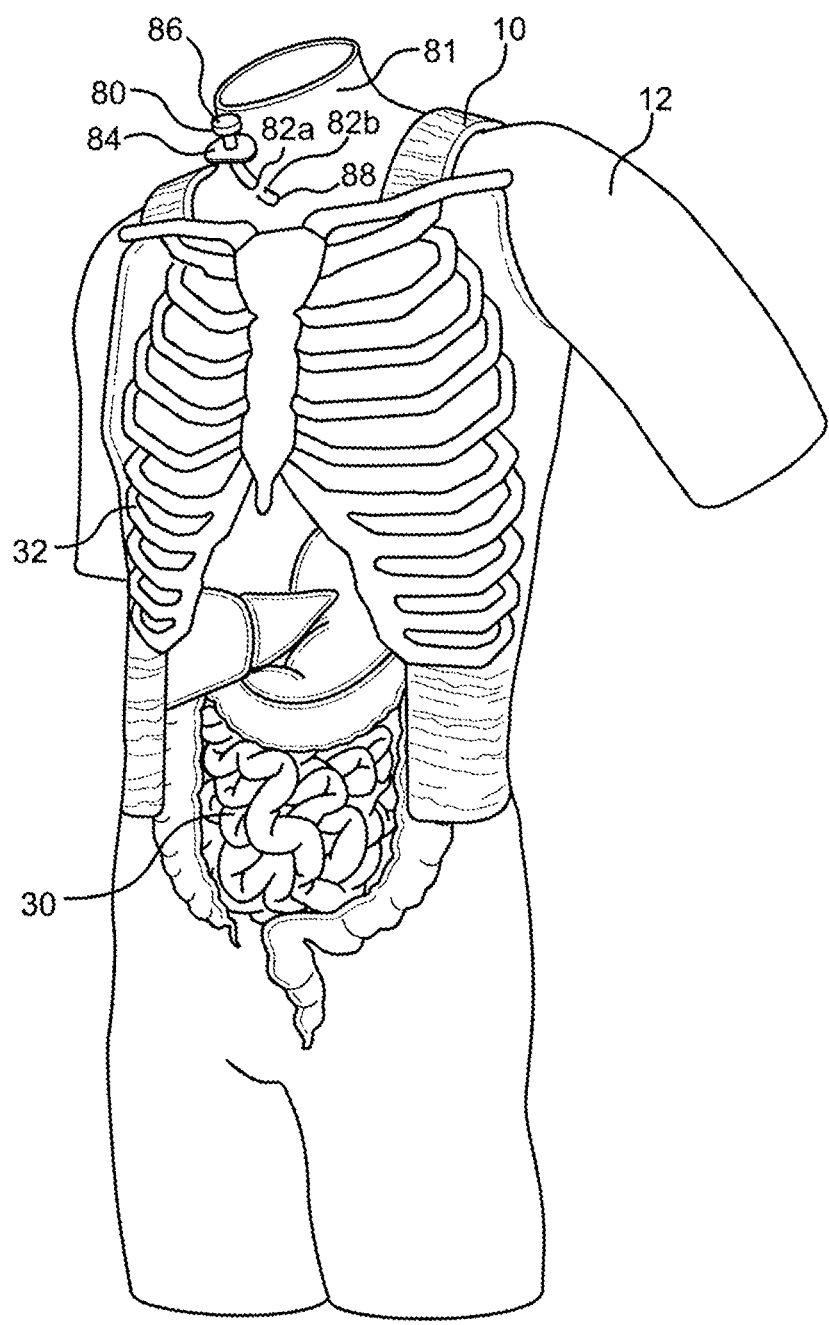
FIG. 6 is a perspective view of the prosthetic thorax of the disclosure.

As shown in FIG. 6, in alternative embodiments, penetrating injuries to the thorax can also be simulated by mounting a prosthetic thorax 80 under or on the raiment 10 in the area of the neck of the person 12. In detail, the prosthetic thorax 80 is held on a bib 81 by retaining straps 82a and 82b, and the bib 81 is mounted or fitted around the neck of person 12. For example, bib 81 can have straps, ties, Velcro or other fasteners to secure bib 81 at the back of the neck of person 12. The prosthetic thorax 80 and bib 81 can fit underneath or over raiment 10. Structurally, the prosthetic thorax 80 includes an elongated hollow tube-like member 84 that has an open end 86 and a closed end 88. For use, the tube 84 is presented on the bib 81, and the bib 81 is positioned on the throat of the person 12 with the open end 86 positioned for receipt of a cricothyroid tube (not shown). Thus, the prosthetic thorax 34 can be used for simulating an invasive surgical placement of a cricothyroidotomy. Operationally, the tube-like member 84 is held on the raiment 10 to mimic a thorax, and to present its open end 86 for access thereto with a chest tube during a simulation of a penetrating wound to the thorax. These prostheses can be made of plastic, rubber or composite materials, such as open or closed cell polyurethane foam of various densities, elasticity, and deformation characteristics to simulate internal organs.

Use of the wearable partial task surgical simulator 13 as a teaching aid is accomplished by using the simulator 13 on a person 12 who portrays an injured person in a trauma event. The simulator 13 dynamically simulates the wounds and injuries the person 12 received during the simulated traumatic event. The simulator 13 is set up to simulate a trauma event among various possible scenarios. Simulator 13 allows verbal and gesticular interaction between person 12 wearing the simulator 13 and a first responder (e.g. trainee, trainer, other participant) who is treating the person 12 wearing the simulator 13.

Accordingly, in using the partial task surgical simulator 13 as a teaching aid, the raiment 10 is provided with at least one wound simulator 14 related to the simulated trauma event and at least one fluid reservoir 26 for holding a blood-like fluid 18 and is in fluid communication with at least one orifice 16. The vest 11 is provided on person 12 underneath the raiment 10 and provides simulation of the internal skeletal structure (e.g., rib cage 32) and internal organs (e.g., prosthetic organs 36) of the person 12 simulating injury in the trauma event. Person 12 selectively expels the blood-like fluid 18 from the reservoir 26 and through the orifice 16 to simulate the trauma event. Simulator 13 is used to mimic a penetrating wound by positioning a predetermined length of flexible tubing (e.g., intestine 30 or fluid channel 28) against the inner surface 22 of the raiment 10 with a portion thereof juxtaposed with the orifice 16 of at least one superficial wound. At least one fluid reservoir 26 is attached to a length of flexible tubing (e.g., fluid channel 28) attached to the raiment 10 and reservoir 26 is manipulated to expel blood-like fluid 18. A first responder selectively accesses at least one prosthetic internal human organ 36 in the cavity 34 through at least one orifice 16 of the raiment 10 during simulation of a penetrating wound to the human body. The prosthetic human internal organs 36 are selected from among multiple combinations of prosthetic human internal organs 36 and used in the cavity 34 of the vest 11 to simulate from among various internal organ structure injuries involved in a selected trauma event.

Figure 7:
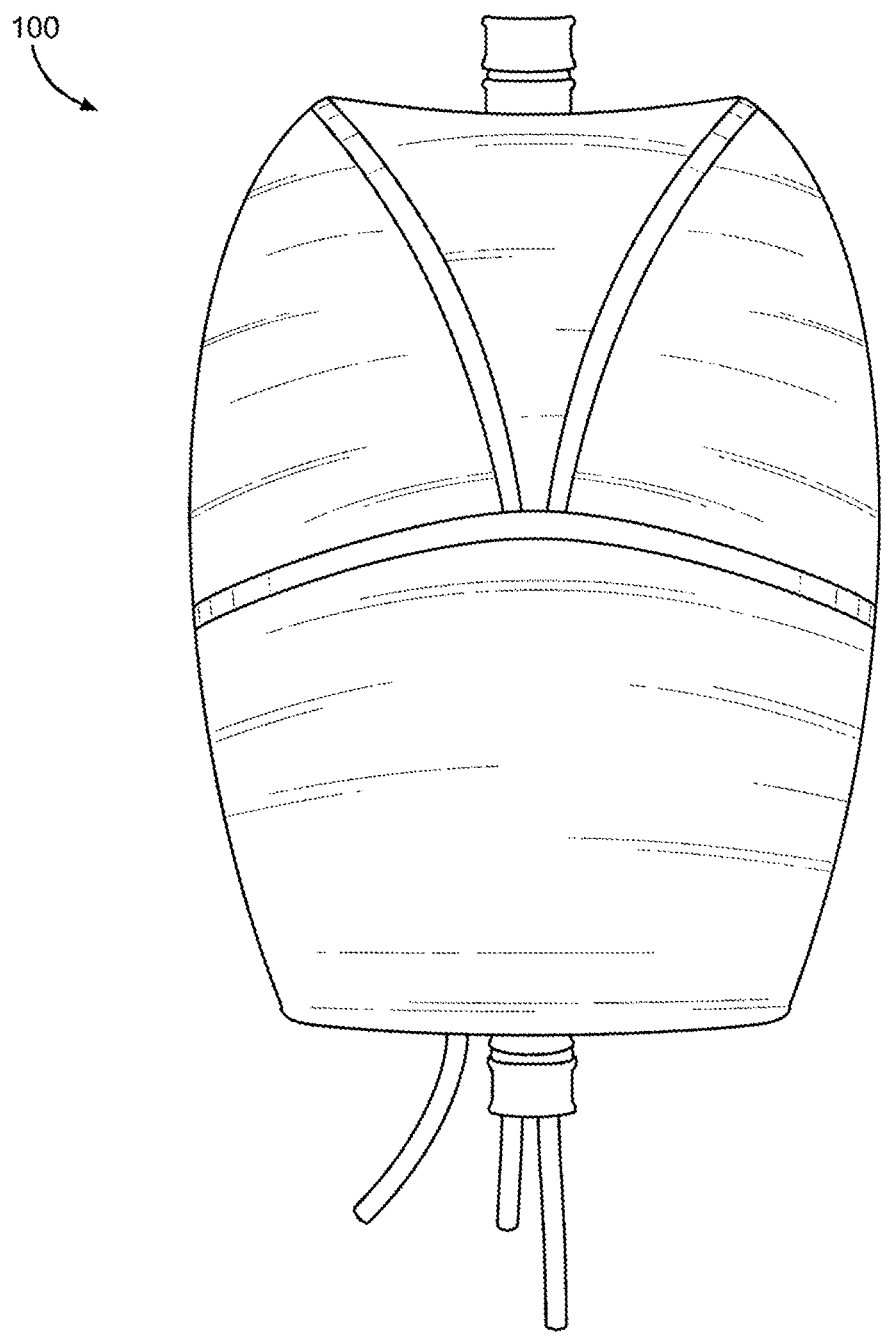
FIG. 7 is a preferred embodiment of a prosthetic organ module with wound simulation capabilities.

Referring now to FIG. 7, a preferred embodiment of a prosthetic internal organ module is shown and generally designated 100. The prosthetic internal organ module 100 includes a plurality of prosthetic organs that simulates the internal organs of a human including the shape, color, and texture. The prosthetic internal organ module 100 may include all, or some of the internal organs of a human depending on the needs of the simulation. The prosthetic internal organ module 100 includes the capabilities to simulate an internal injury by providing point of contact bleeding simulation. Additionally, each prosthetic internal organ also has its separate capability to simulate an injury.

The prosthetic internal organ module 100 is packaged and dimensioned to fit within the cavity 34 of the vest 11. The prosthetic internal organ module 100 is inserted into the cavity 34 of the vest 11 to provide realistic simulation of human organs with the capabilities of simulating injury. The prosthetic internal organ module 100 is not limited to be used with the simulator only, but may be inserted into any other human simulator with a cavity. It is contemplated that the prosthetic internal organ module 100 may be used independently from the vest 11, and utilizes only the raiment 10. It is also contemplated that the prosthetic internal organ module 100 may be used independently to simulate specific internal injuries without the encumbrances of a simulated skeletal structure.

Referring now to FIG. 8 and FIG. 9, a module frame is shown and generally designated 110. The module frame 110 includes a center frame 112 attached to a base 118. In the preferred embodiment, the center frame 112 is a tube simulating the spinal column of a human and the base 118. The center frame 112 is formed with a central lumen 114 (shown in dashed lines). Along the center frame 112 are a plurality of ports 116 that provide access to the central lumen 114 from the outside of the center frame 112. This allows for the passage of a fluid delivery system 120 through the central lumen 114 of the central frame 112 and out the ports 116 to a designated location on the base 118. The use of a tube for the center frame 112 is not meant to be limiting, and it is contemplated that various other types of structures may be used for the center frame 112.

The fluid deliver system 120 includes a plurality of tubing. In the preferred embodiment, the fluid delivery system 120 includes tubing 122 having an inlet 124 and an outlet 126 and tubing 122A having an inlet 124A and an outlet 126A. The tubing 122 and 122A is inserted into the central lumen 114 of the center frame 112 and exits through one of the plurality of ports 116. The outlet 126 and 126A of tubing 122 and 122A, respectively, exits through the corresponding ports 116 and is directed to a designated area of the module frame 110 where an injury is to be simulated. By attaching the inlets 124 and 124A to a source of fluid, fluid may be delivered to the outlets 126 and 126A to simulate an internal bleeding injury. The fluid delivery system 120 is not meant to be limited to two tubes. It is contemplated that the fluid delivery system 120 may have one or more tubes, a network of tubing, a network of tubing and valves, or various other combinations of structures that allow for the delivery of a fluid.

The module frame 110 provides a platform that the prosthetic human organs are attached to. The prosthetic organs may be attached to the base 118 or to the center frame 112 by fasteners, locks, adhesives, or any other similar method. Attached to the back of the base 118 is a plurality of anchors 128. By attaching all of the prosthetic internal organs to the module frame 110, all of the prosthetic organs may be inserted and removed into the cavity 34 of the vest 11 in a single motion. This allows for quick and easy maintenance of the simulator 13 and the prosthetic organs of the prosthetic organ module 100 after a simulation is completed.

Figure 10:
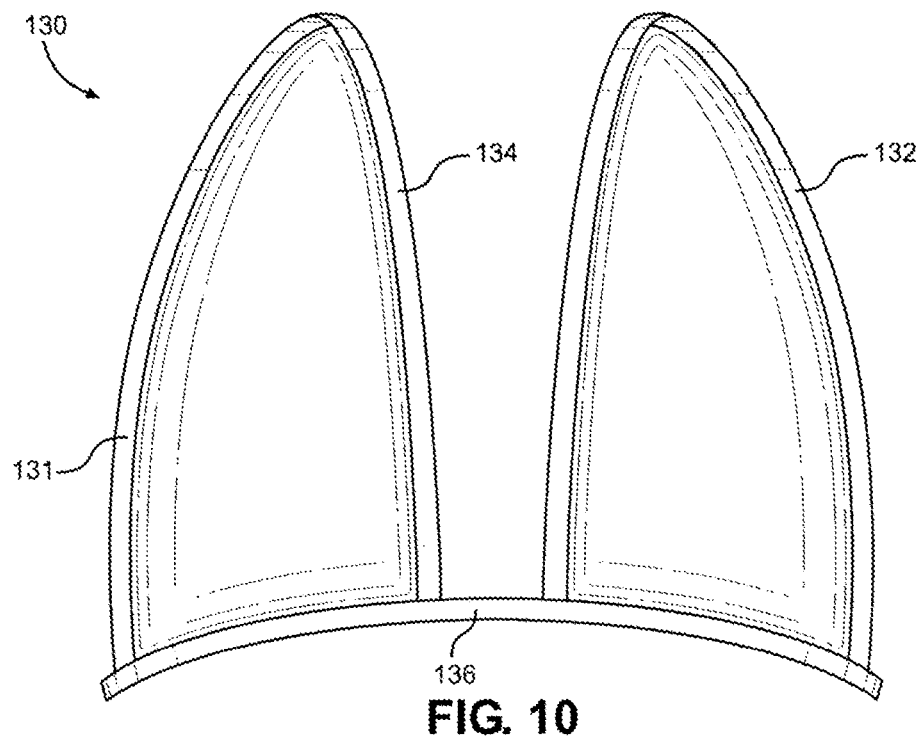
FIG. 10 is a front perspective view of a prosthetic lung of the prosthetic organ module.
Figure 11:
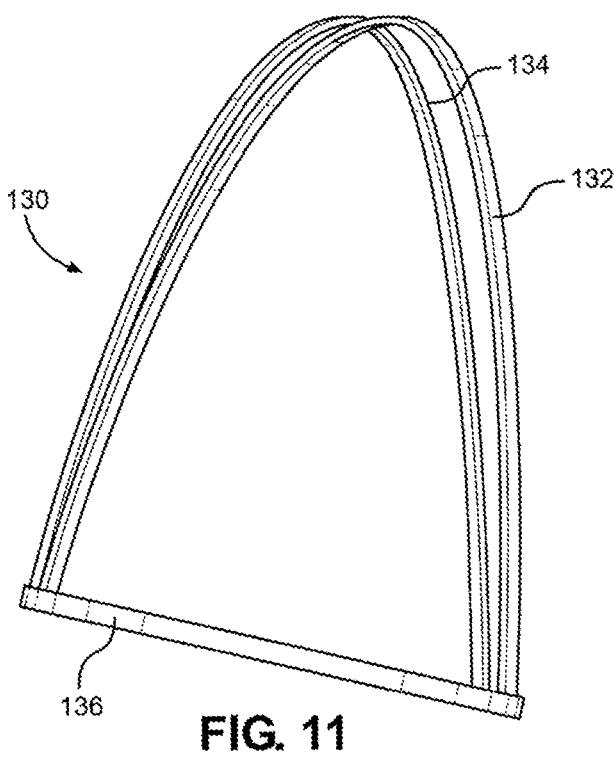
FIG. 11 is a side view of the prosthetic lung of the prosthetic organ module.

Referring now to FIG. 10 and FIG. 11, a prosthetic lung is shown and generally designated 130. The prosthetic lung 130 is a three-dimensional frame 131 outlining the shape of a human lung. The three-dimensional frame 131 includes a right member 132 and a left member 134 attached to a bottom member 136. The right member 132 is curved to form the outline of a right lung and the left member 134 is curved to form the outline of a left lung. The bottom member 136 is curved into a semi-circular shape. The three-dimensional frame 131 provides support, and gives shape to a prosthetic pleural membrane 190 (shown in FIG. 7 and FIG. 15), which in combination simulates the shape of human lungs. It is contemplated that the prosthetic lungs 130 made be made of an alternative structure, including hollow forms, solid forms, and semi-solid forms to simulate the human lungs. It is also contemplated that the prosthetic lungs 130 may be made of inflatable material, similar to balloon. This prosthetic lung 130 will have a body with a hollow cavity and a valve attached to the body. The prosthetic lung will have the capability of inflating or deflating, thereby simulating a pneumothorax.

Figure 12:
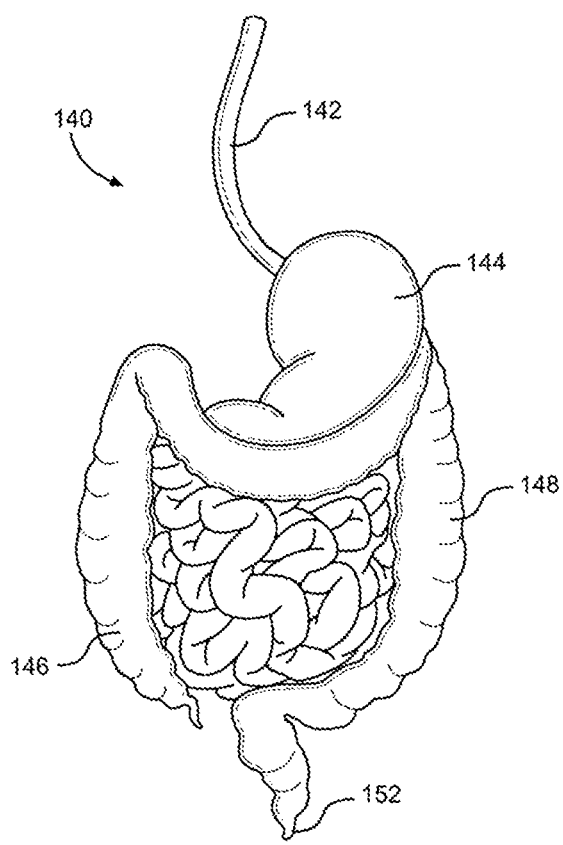
FIG. 12 is a front view of a prosthetic gastrointestinal tract of the prosthetic organ module.

Referring now to FIG. 12, a prosthetic gastrointestinal tract is shown and generally designated 140. The prosthetic gastrointestinal tract 140 simulates a human gastrointestinal tract and includes a prosthetic esophagus 142, a prosthetic stomach 144, a prosthetic small intestine 146, and a prosthetic large intestine 148. It is contemplated that the prosthetic gastrointestinal tract 140 may be modified for a particular simulation and may not include all of the various organs associated with a human gastrointestinal tract.

The prosthetic gastrointestinal tract 140 is formed with a cavity 150 (not shown) that may extend the entire length, or a portion, of the prosthetic gastrointestinal tract 140. The prosthetic esophagus 142 has a closed end and the prosthetic large intestine 148 is formed with a valve 152 sealing the cavity 150 of the prosthetic gastrointestinal tract 140. It is contemplated that the prosthetic esophagus 142 may be fitted with a valve or the prosthetic large intestine 148 may have a closed end. The cavity 150 is capable of holding a fluid. Fluid may be inserted within the cavity 150 through the valve 152. Upon puncturing the prosthetic gastrointestinal tract 140, the fluid within the cavity 150 will escape simulating a gastrointestinal injury, such as a severed intestine or punctured stomach.

Figure 13:
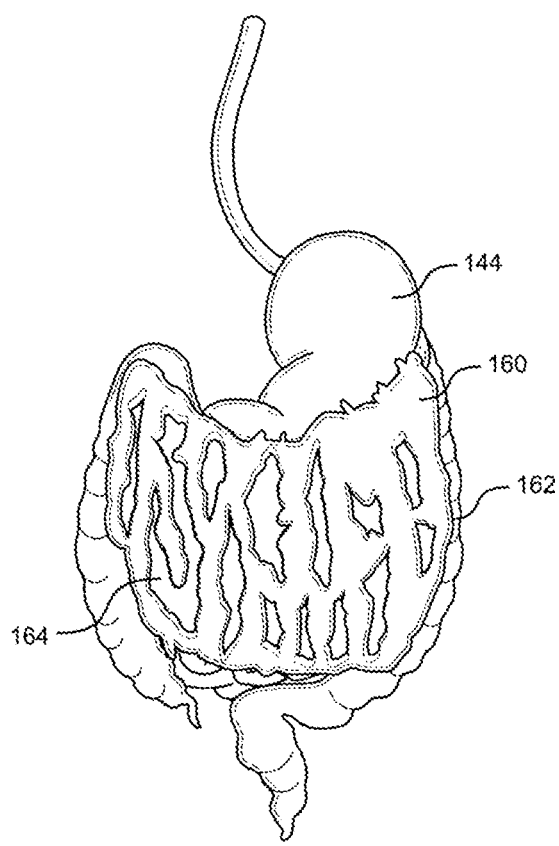
FIG. 13 is a front view of the prosthetic gastrointestinal tract of the prosthetic organ module with an attached prosthetic omentum.

Referring now to FIG. 13, a prosthetic omentum is shown and generally designated 160. The prosthetic omentum includes a base layer 162 with texturing 164 applied to simulate a human omentum. The prosthetic omentum 160 is attached to the prosthetic stomach 144 and is positioned over the prosthetic small intestine 146 and the prosthetic large intestine 148.

Figure 14:
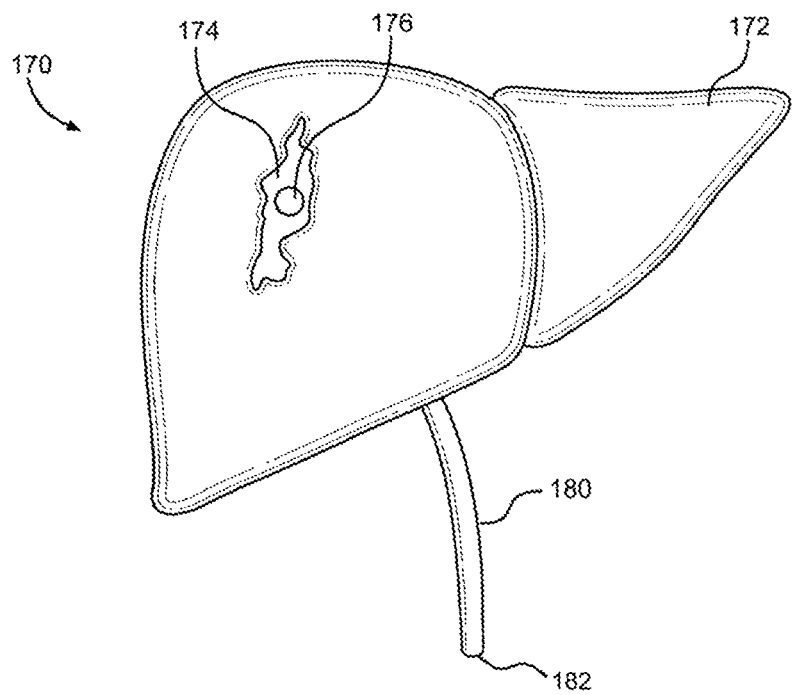
FIG. 14 is a front view of a prosthetic liver formed with a simulated injury of the prosthetic organ module.
Figure 15:
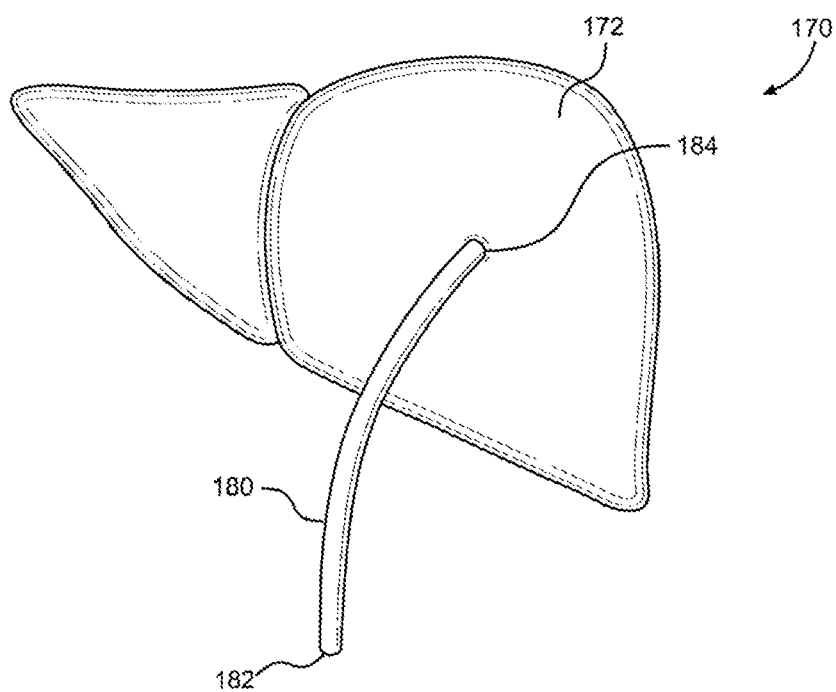
FIG. 15 is a back view of the prosthetic liver.

Referring now to FIG. 14 and FIG. 15, a prosthetic liver is shown and generally designated 170. The prosthetic liver 170 includes a body 172 formed to resemble a human liver. In the preferred embodiment, the body 172 is formed with a simulated injury 174, such as a laceration. Formed within the simulated injury 174 is an orifice 176, which is connected to a tube 180. The tube 180 has an inlet 182 and an outlet 184, where the outlet 184 is connected to the orifice 176. By connecting the inlet 182 of the tube 180 to a source of fluid, fluid may flow through the tube 180 and out the orifice 176 to simulate a bleeding liver injury.

Figure 16:
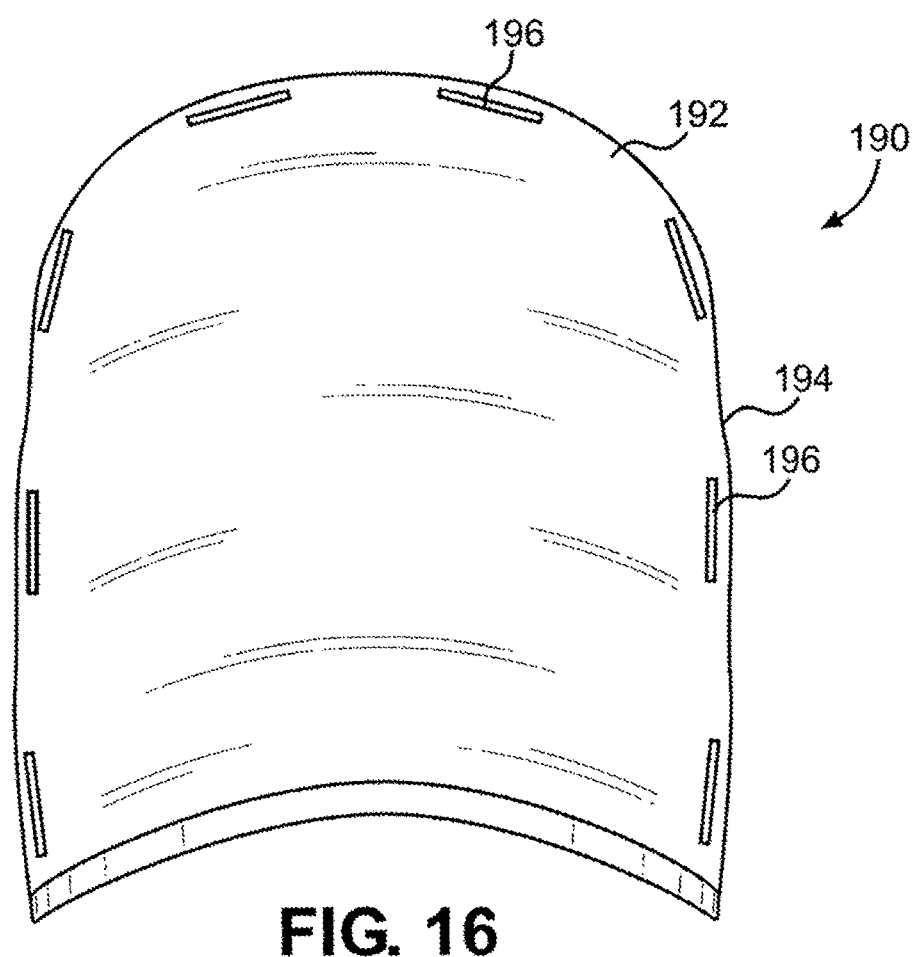
FIG. 16 is a front perspective view of a prosthetic pleural membrane of the prosthetic organ module.

Referring now to FIG. 16, the prosthetic pleural membrane 190 is shown. The prosthetic pleural membrane 190 is a sheet 192 of material having mechanical properties close to a human pleural membrane, in addition to the look and feel. Attached adjacent to the perimeter 194 of the sheet 192 is a plurality of anchors 196 that corresponds with the anchors 128 of the module frame 110. The anchors 196 and 128 attached to each other, allowing the prosthetic pleural membrane to be attached to the module frame 110.

Figure 17:
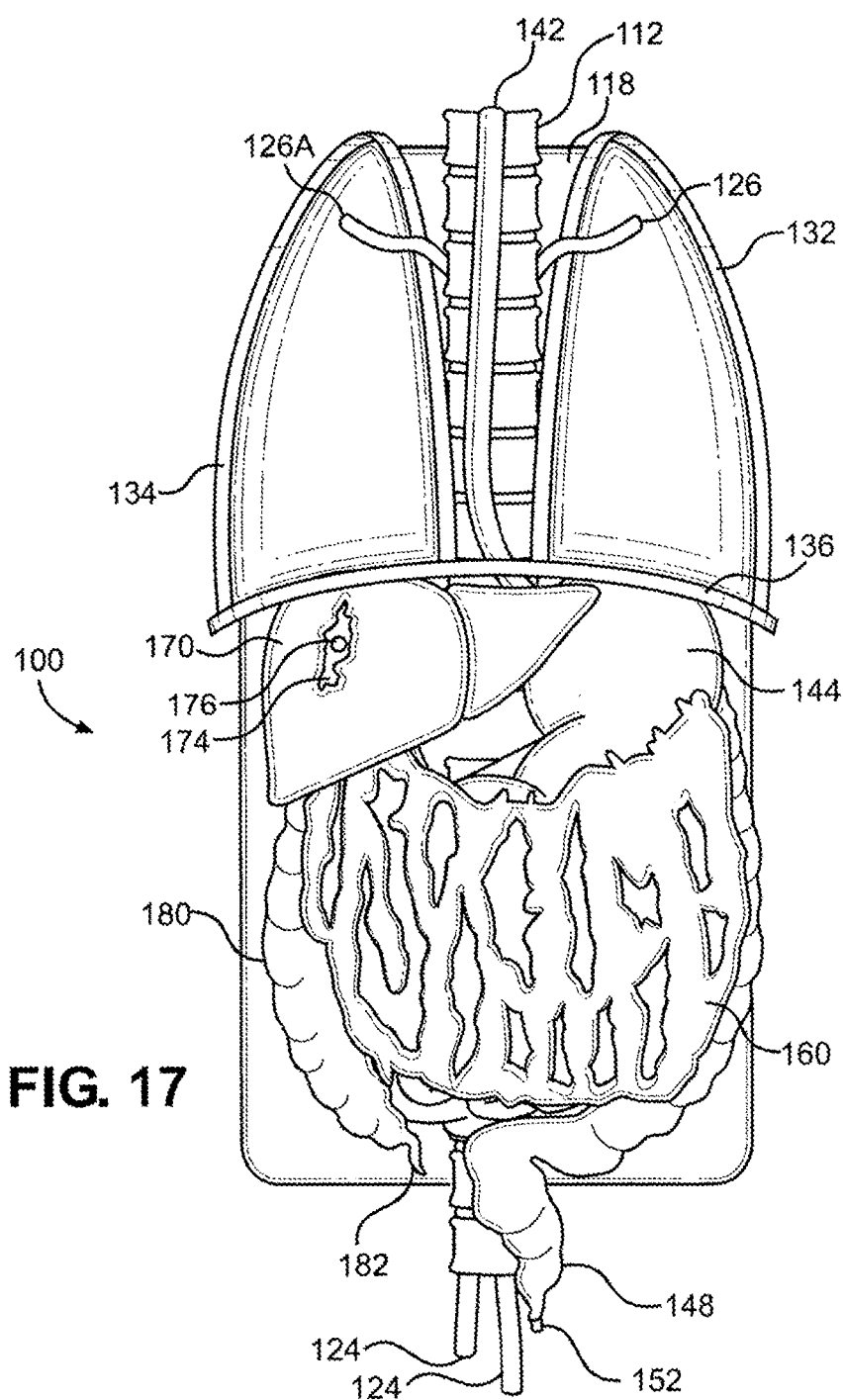
FIG. 17 is a front view of the prosthetic organ module with the prosthetic pleural membrane removed.

Referring now to FIG. 17 the prosthetic internal organ module 100 is shown assembled without the prosthetic pleural membrane 190. The prosthetic organs are assembled and attached to the module frame 110 in accordance with human anatomy. In FIG. 17, the outlet 126 and 126A of the tubing 122 and 122A, respectively, is positioned to simulate a bleeding chest wound. The inlet 124 and 124A of the tubing 122 and 122A, respectively, is left exposed to allow the connection to a fluid source.

The gastrointestinal tract 140 is attached to the module frame 110, where the prosthetic esophagus 142 is attached to the center frame 142 and the prosthetic stomach 144, the prosthetic small intestine 146, and the prosthetic large intestine 148 is attached to the base 118. A portion of the large intestine 148 extends pass the module frame 110 to allow access to the valve 152. The prosthetic pleural membrane 160 covers the majority of the prosthetic small intestine 146 and prosthetic large intestine 148.

The prosthetic liver 170 is attached to the module frame 110. The tube 180 is then positioned where the inlet 182 is left exposed to allow attachment to a fluid source. This will allow the delivery of fluid to the simulated injury 174 of the prosthetic liver 170 to simulate an injured liver. Alternatively, the tube 180 may be inserted through one of the ports 116 of the center frame 142 and exit the central lumen 114.

The prosthetic lungs 130 are attached to the module frame 110. The synthetic pleural membrane 190 is placed over the assembled prosthetic organs attached to the module frame 110. The three-dimensional frame 131 of the prosthetic lung 130 provides support, and gives shape to the prosthetic pleural membrane 190, which in combination simulates the outline of human lungs. It is contemplated that the prosthetic lungs 130 made be made of an alternative structure, including hollow forms, solid forms, and semi-solid forms to simulate the human lungs. This prosthetic lung 130 will have the capability of inflating or deflating, thereby simulating a pneumothorax.

Figure 18:
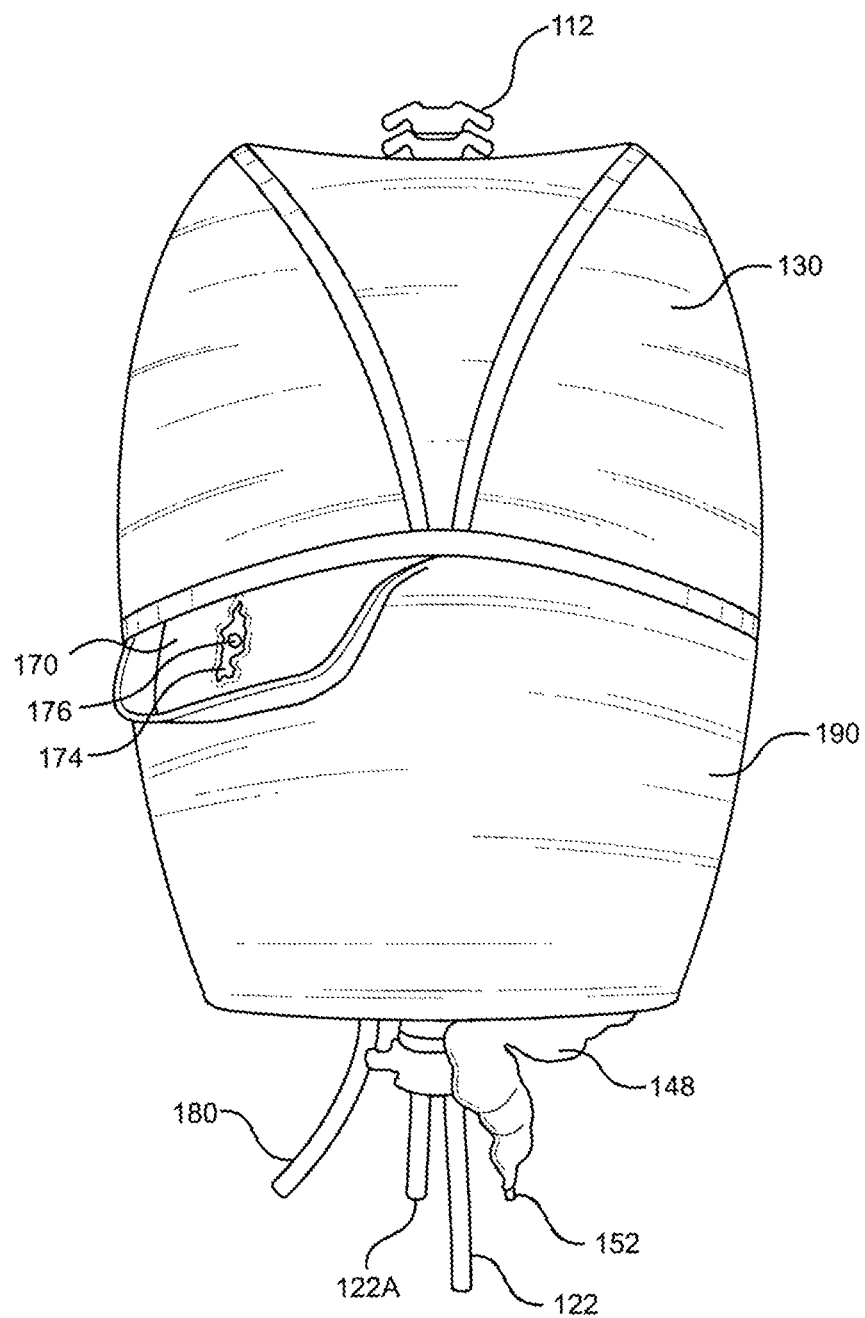
FIG. 18 is a front view of the prosthetic organ module with the prosthetic pleural membrane cut to expose the prosthetic liver with simulated injury.

Referring now to FIG. 18, the prosthetic internal organ module 100 is shown. The prosthetic internal organ module 100 is used independently, outside the cavity of a simulated human torso, to demonstrate a damaged liver. The prosthetic pleural membrane 190 is shown cut, providing an opening to the prosthetic liver 170 with the simulated injury 174 and orifice 176, the source of the bleeding. The prosthetic pleural membrane 190 provides tactile feedback when cut to provide realistic simulation of the operation. Additionally, the prosthetic gastrointestinal tract 140 has been filled with fluid, therefore a puncture to any portion of the prosthetic gastrointestinal tract 140 will result in the release of the fluid providing visual, textural, and audible cures of the puncture. It is contemplated that the raiment 11 may be placed over the prosthetic internal organ module 100 to simulate a human upper torso. The raiment 11 will be fitted with anchors corresponding with the anchors 128 on the back of the base 118, thereby allowing the raiment to attach to the prosthetic internal organ module 100.

Hemorrhage Control Trainer (HCT)

In accordance with the present disclosure, a hemorrhage control trainer (HCT) is provided for simulating the wounds on a medical manikin that could be received by a person during a trauma event. Specifically, the device includes a medical manikin located inside a reusable training suit resembling human skin. Structurally, the training suit is made primarily of silicone and nylon fiber, and it is formed as a layer having an inner surface and an outer surface, with the outer surface having a color and a texture that is comparable to human skin. Integral to the training suit are simulated wounds located at various places on the training suit. Each simulated wound has a blood supply tube attached such that the wound can simulate different types of bleeding, such a venous and arterial bleeding. The preferred embodiment of the HCT has wound simulators located at the right femoral artery, the left lower abdomen, the left arm, and the left face and neck. Alternative embodiments of the HCT have wound simulators located at other positions, such as a foot, a hand, a calf, a forearm, the chest, and the back. Other alternative embodiments allow for the simulation of a traumatic amputation by allowing the removal of a portion of a leg or arm and the placement of a wound site simulator at the end of the remaining limb portion. The severed limb portion may have a skin covering that simulates the look and effect of a severed limb.

A head wound will interfere with airway management adding value to the training since airway management is crucial to stabilizing a wounded person. The trainee must learn to overcome the airway interference to become an effective first responder. Airway management is performed on an anatomically correct and architecturally detailed throat for surgical cricothyroidotomy with appropriate tissue layers and landmarks/index points. It also permits the proper use of basic airway adjuncts such as a nasopharyngeal airway (NPA) and oropharyngeal airway (OPA).

The manikin is constructed from a rigid material that will resist cuts, abrasions, and punctures. In the chest area is a removable chest plate that allows access to the internal components housed in the chest cavity of the HCT. Located in the chest cavity are a pump, flow and pressure sensors, valves, tubing, a power supply, and a controller for controlling the internal components of the HCT. Located between the back of the manikin and the training suit is a blood reservoir, which is in fluid communication with the pump. When the manikin and blood reservoir are inserted into the training suit, the wound simulators and blood reservoir are connected to the pumping system by way of tubing. The pump and valves are then operated as necessary to simulate different types of bleeding from the simulated wound. The blood reservoir is refillable without the need to remove the reservoir from the HCT.

Pulse emitters are located at various points on the manikin to simulate the pulse of a person who has suffered a traumatic injury and is hemorrhaging blood. The pulse emitters are located such that palpable Carotid (neck), Brachial (lower abdomen), and Radial (wrist) pulses are simulated, which are the prime pulse locations for determining the current physical condition of a person. Pulses are correlated to simulated blood pressure and have appropriate pulse deficit. The pulse emitters may have integrated sensors that send and receive signals with an external control unit.

In operation, an operator initiates bleeding and pulses through the external control unit. A trainee then assesses the wounds, bleeding, and pulses to prioritize the appropriate response actions. To control the bleeding, a trainee may apply a Combat Application Tourniquet (CAT), Combat Ready Clamp (CROC), or other junctional tourniquet, or may apply pressure to a wound with a pressure dressing, body weight, or packing such as Combat Gauze.

Figure 19:
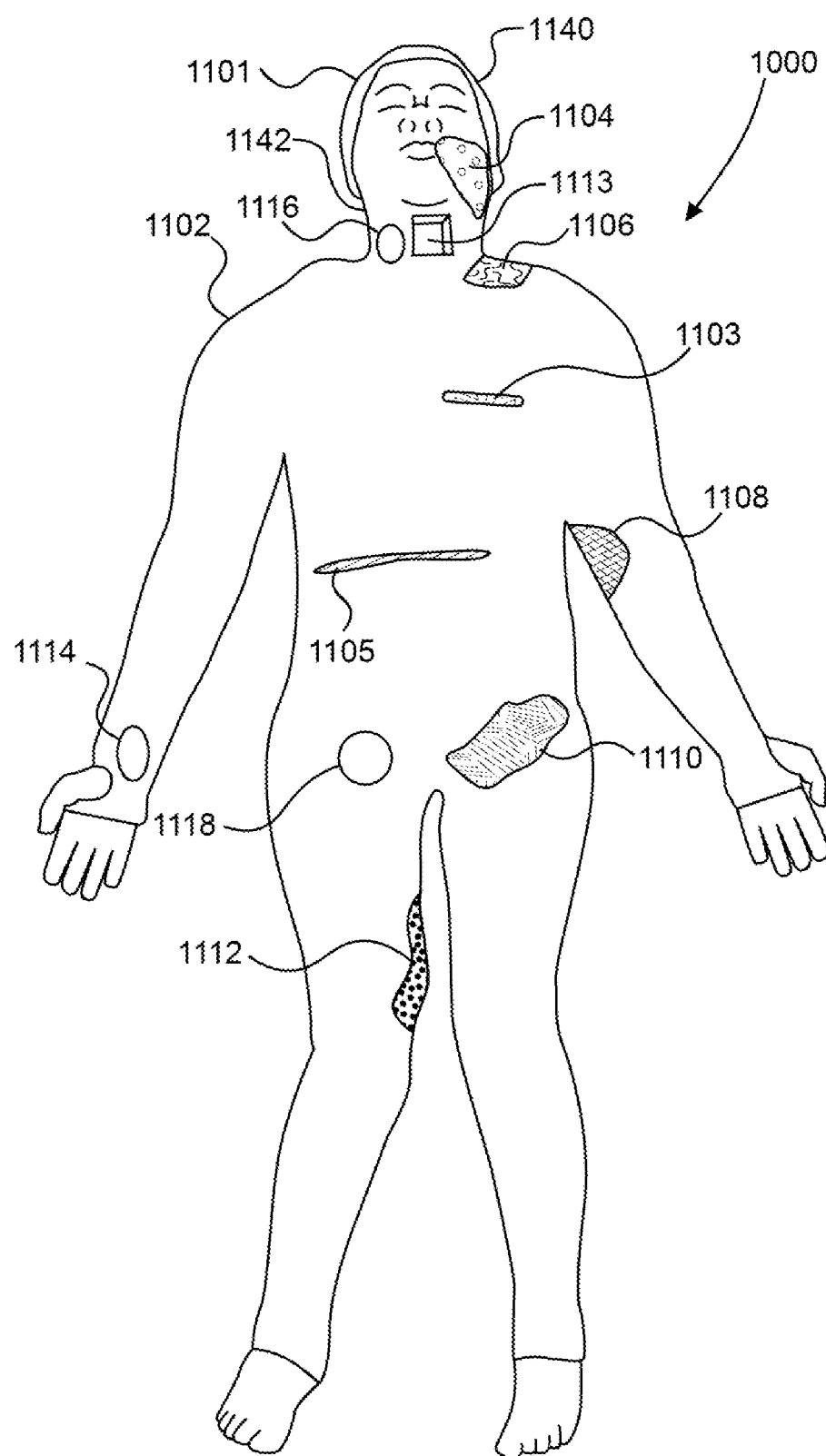
FIG. 19 is a front view of a Hemorrhage Control Trainer (HCT) in accordance with the present disclosure showing a manikin wearing a training suit having simulated wounds, a trachea insertion area, and the locations of the pulse emitters.

Referring to FIG. 19, a Hemorrhage Control Trainer (HCT) of the present disclosure is shown and designated 1100. As shown, HCT 1100 consists of a manikin 1101, a training suit 1102, and a blood bladder 1132 (not shown, See FIGS. 21 and 22). In operation, manikin 1101 is inserted into training suit 1102. Bladder 1132 is inserted between the back of manikin 1101 and training suit 1102. Training suit 1102 further consists of a fill connector access 1103, a facial wound simulator 1104, a battery compartment access 1105, a thorax wound simulator 1106, an arm wound simulator 1108, an abdominal wound simulator 1110, a leg wound simulator 1112, and a trachea module insertion area 1113. Shown in phantom are a radial pulse emitter 1114, a carotid pulse emitter 1116, and a femoral pulse emitter 1118. The operation of pulse emitters 1114, 1116, 1118 will be discussed further in the discussion of FIG. 20. It is to be appreciated by someone skilled in the art that the number and type of wound simulators located on the training suit 1102 may vary depending on the simulated trauma event.

Fill connector access 1103 allows for quick access to fill connector 1122 (not shown, see FIG. 20) when training suit is on manikin 1101. Providing quick access to fill connector 1122 allows for the refilling of bladder 1132 without the need to of removing or partially removing training suit 1102 from manikin 1101. This allows HCT 1100 to be quickly reset to a starting condition to allow for more efficient training of multiple trainees or faster repetition for a single trainee. As with fill connector access 1103, battery compartment access 1105 allows for quick access to battery compartment 124 to allow HCT 1100 to also be quickly reset to a starting condition for more efficient training. Further, a training cycle may require the replacement of a battery 1125 (see FIG. 20) during the training cycle, thereby creating the need to quickly replace the battery 1125 to minimize the impact on the quality and length of the training cycle. In alternative embodiments of the HCT, two or more batteries may be used to extend the duration of the training cycle or to supply more power to the HCT.

Thorax wound simulator 1106, arm wound simulator 1108, abdominal wound simulator 1110, and leg wound simulator 1112 simulate wounds that each need different techniques to control bleeding from a real such wound. In a preferred embodiment, wound simulators 1106, 1108, 1110 and 1112 are individually configured to simulate different types of wounds, such as a wound resulting in arterial bleeding where the simulated blood may exit in pulses, or in venous bleeding where simulated blood may ooze, drip, or flow at a slower and more constant rate then with arterial bleeding. Non-bleeding wounds may also be simulated in conjunction with bleeding wounds to increase training realism. Wound simulators 1106, 1108, 1110, and 1112 may also be configured to simulate the look of a particular type of wound. For example, a puncture wound may be simulated as a hole in training suit 1102 having simulated blood flowing from the hole, where an impact wound may result in an open wound covering a larger area. It is beneficial to the realism of the training to make these types of wounds look as real as possible. As such, wound simulators 1106, 1108, 1110 and 1112 in a preferred embodiment are constructed such that internal organs, veins, arteries, and skin layers are realistically simulated, including the source of bleeding from within the wound itself.

Thorax wound simulator 1106 is located at the base of training suit head 1140 and extends down the neck 1142 of training suit 1102. In operation, through a system discussed further below, the simulator 1106 is connected to a pumping system that provides a flow of simulated blood to wound simulator 1106. When the pumping system is activated, simulated blood is supplied to wound simulator 1106 where it flows from the simulator 1106 in the manner dictated by the training scenario. For instance, wound simulator 1106 may simulate an arterial wound. As such, the simulated blood flow from wound simulator 1106 will be in pulses and have a higher volume of flow from the wound simulator 1106. In contrast, if a venous wound is simulated, blood flow from wound simulator 1106 will be more consistent and may have a lower volume of flow.

Arm, abdominal, and leg wound simulators 1108, 1110, and 1112 function similar to thorax wound simulator 1106. The look of a wound simulator is determined by the type of wound simulated and the goals of the training session. The type of wound simulator selected for the training session partially determines the nature of the blood flow from the simulated wound. For example, a wound simulator may simulate a shallow laceration resulting in a slow blood flow where a puncture wound or deep laceration result in a high blood flow. As discussed below in regards to the pumping system, the operation of the pump system will also determine the nature of the blood flow from a simulated wound.

Figure 20:
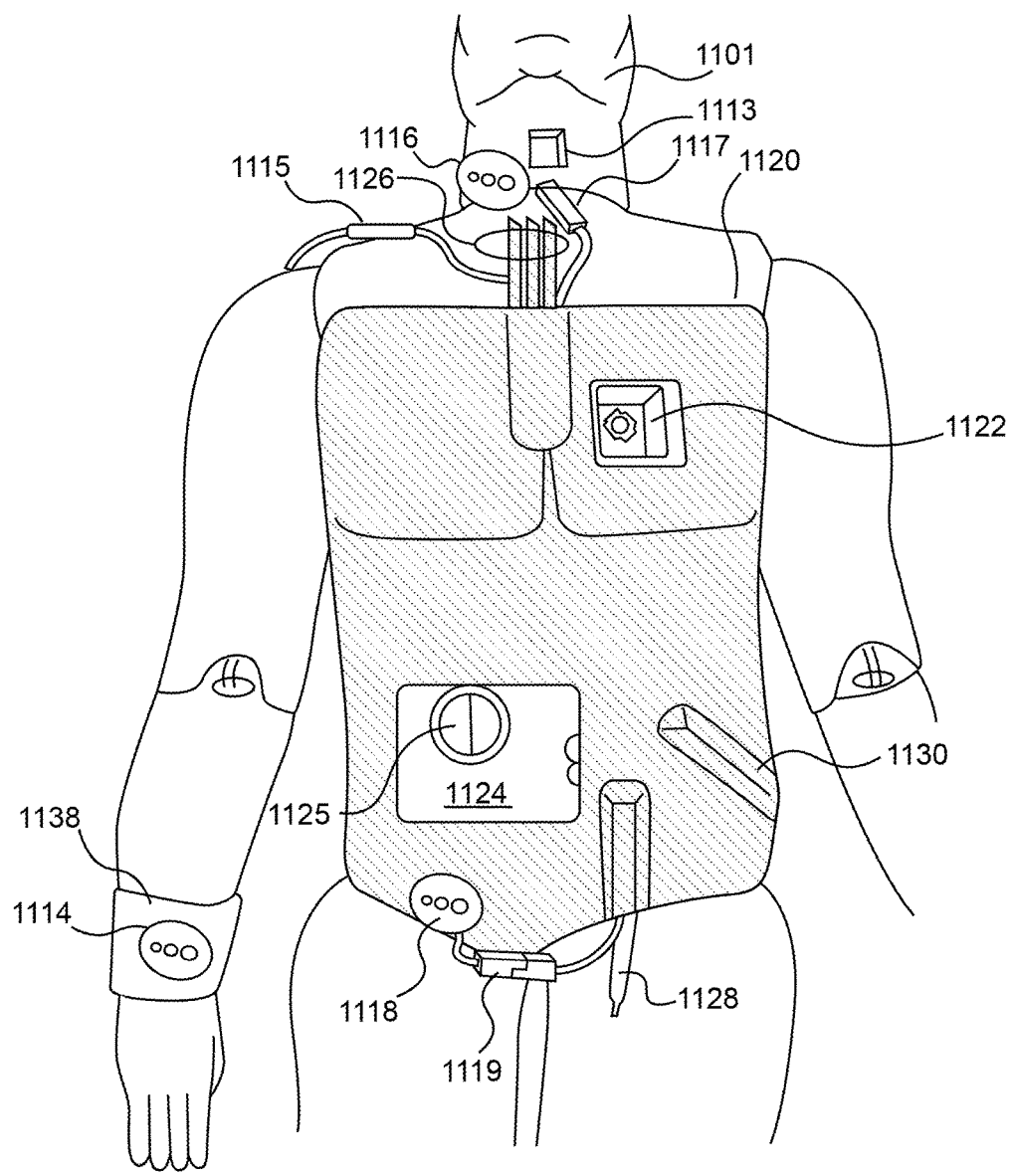
FIG. 20 is a front view of the manikin without the training suit, showing the pulse emitters, chest plate, battery compartment, and bleed connectors.

Referring now to FIG. 20, the construction of manikin 1101 is shown. Manikin 1101 consists of a chest plate 1120 which covers the internal cavity of manikin 1101. Located behind chest plate 1120 is the blood pumping system (not shown). Fill connector 1122 and battery compartment 1124 are accessible through chest plate 1120. Also shown in FIG. 20 are radial, carotid, and femoral pulse emitters 1114, 1116, and 1118, and pulse emitter connectors 1115, 1117, and 1119, bladder connector 1130, and bleed connectors 1126 and 1128. Skin cover 1138 is used to cover the wrist and neck of manikin 1101 to increase the realism of the training by creating a more realistic palpable pulse. In a preferred embodiment, skin cover 1138 also covers trachea module insertion area 1113 where trachea module 1136 (not shown, see FIG. 23). When skin cover 1138 is in place, a trainee must locate the proper location on the trachea module 1136 through skin cover 1138 to perform a cricothyroidotomy, which is used to open an airway for breathing.

Figure 26:
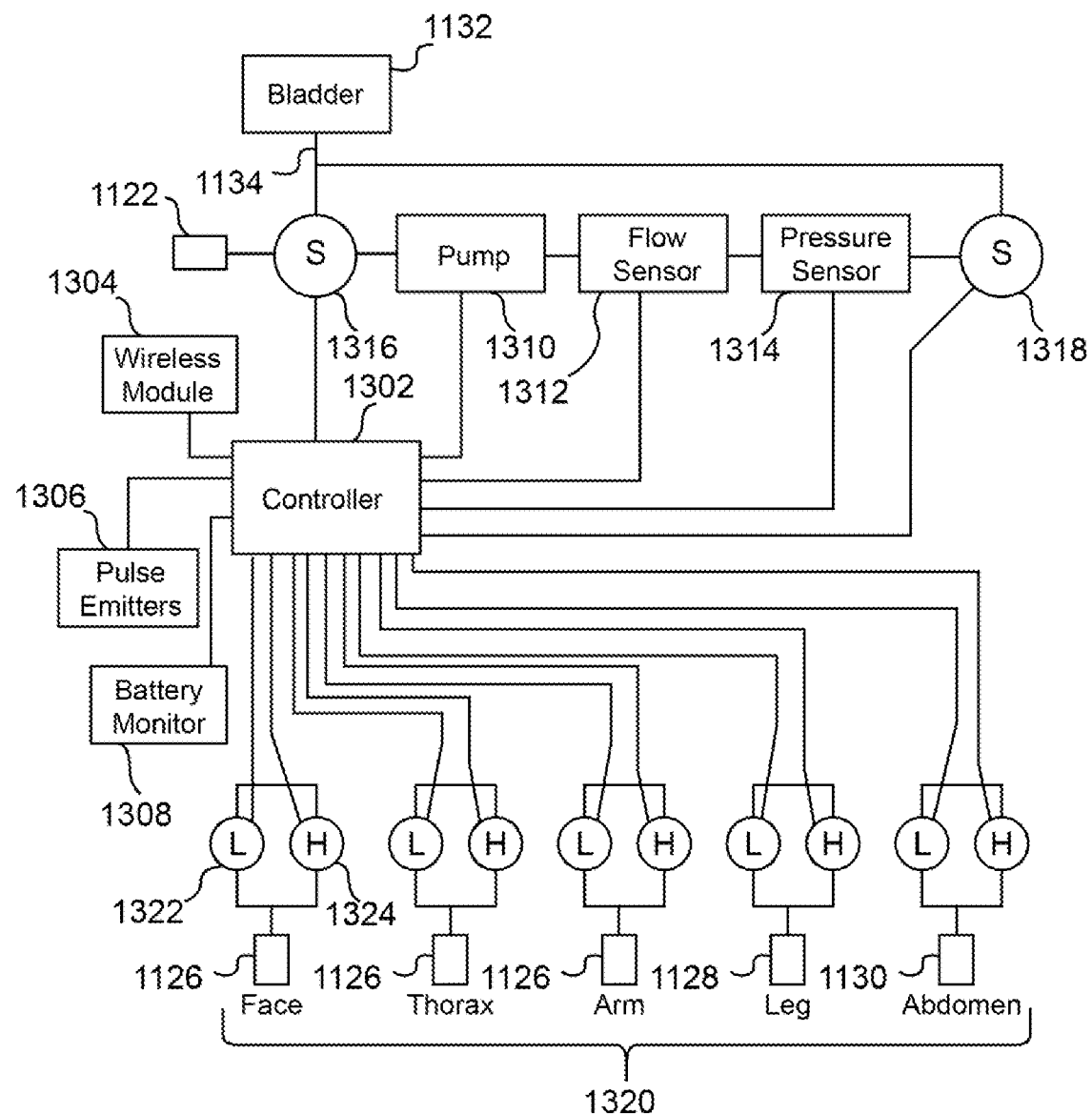
FIG. 26 is a diagram of the HCT system showing the interconnection of the valves, controllers, blood reservoir, wireless connection, and tubing.

Pulse emitters 1114, 1116, and 1118 emit mechanical pulses in response to signals from the central controller 1300 (not shown, see FIG. 26). When a trainee places a finger on the outside of the training suit 1102 over a pulse emitter 1114, 1116, and 1118, the trainee can feel the rate and intensity of the pulses. The mechanical pulses are coordinated to simulate the pulse and heart rate of an injured person having the types of wounds simulated in the training session. Using this information, the trainee can make a determination of the condition of the injured person and prioritize the required actions to stabilize the injured person, such as breathing assistance or compression to minimize or stop bleeding. The rate and intensity of the pulses may be controlled by a preset program running on central controller 1300 or may be adjusted in real time by a training supervisor using a remote control unit 1200 in response to the actions of the trainee.

Figure 21:
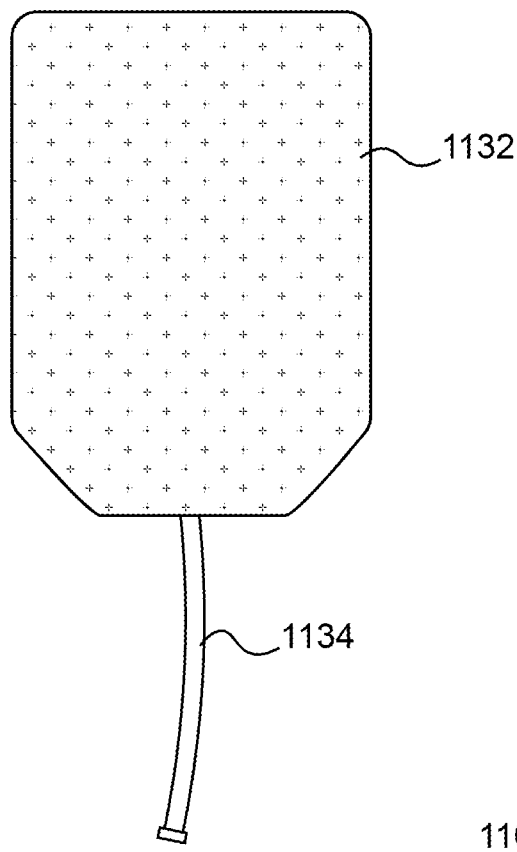
FIG. 21 is a front view of the blood reservoir with connector tube.
Figure 22:
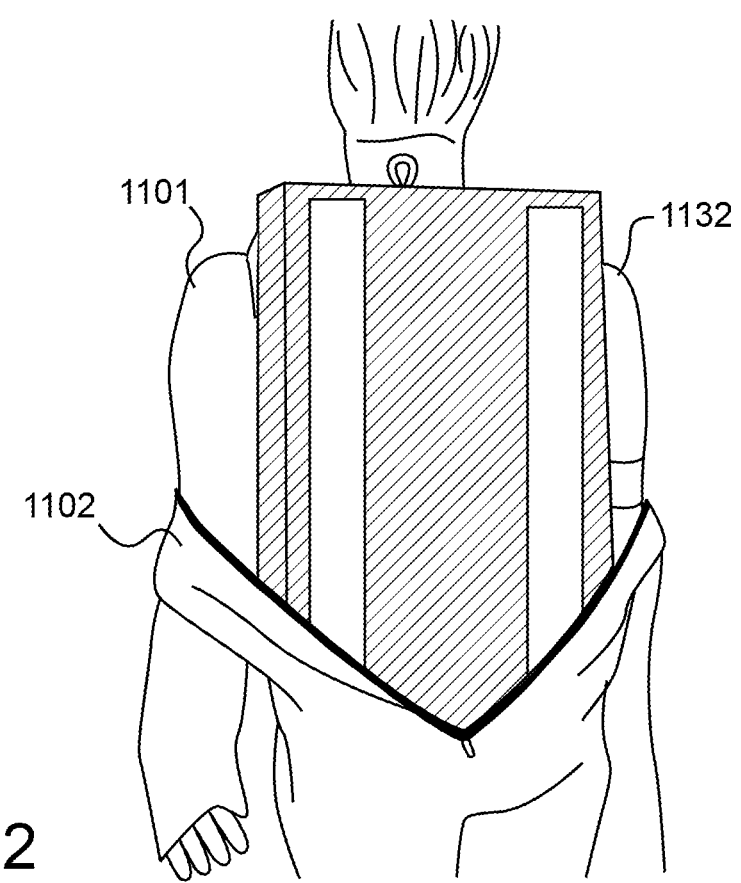
FIG. 22 is back view of the manikin partially wearing the training suit showing how the blood reservoir is incorporated into the HCT.

Referring now to FIG. 21, bladder 1132 with connector tube 1134 is shown. Bladder 1132 is connected to bladder fill connector 1130 by way of bladder connector tube 1132. In a preferred embodiment, bladder fill connector 1130 also serves as the abdominal bleed connector. In operation, bladder 1132 is located inside training suit 1102 between the back of manikin 1101 and training suit 1102 as shown in FIG. 22. When the HCT 1100 is placed on its back during a simulation, the weight of the HCT 1100 on bladder 1132 provides a source of pressure for the pumping system. However, if the HCT 1100 is oriented on its side, the pumping system is capable of providing full pressure to simulate all types of wounds. Central controller 1300, as discussed further with FIG. 26, is capable of monitoring system pressure and blood flow rate and to adjust system parameters to maintain a realistic training simulation.

Figure 23:
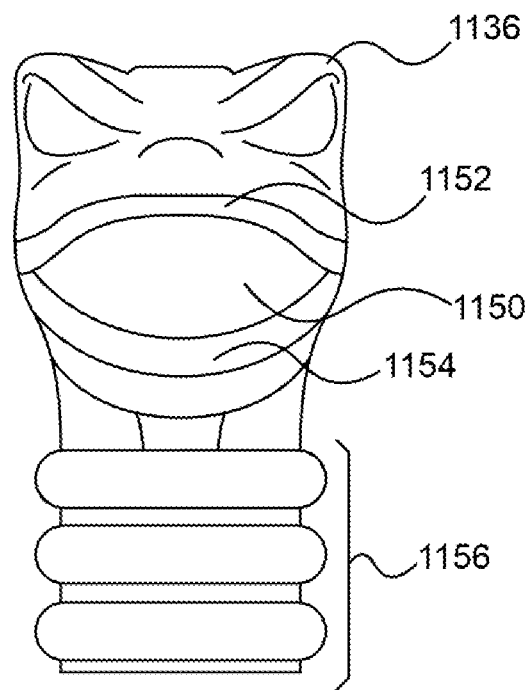
FIG. 23 is a front view of a trachea insert.

FIG. 23 shows a trachea module and is designated 1136. Module 1136 is inserted into trachea module insertion area 1113 located at the throat area of manikin 1101. Trachea module 1136 simulates the physical construction of a human trachea, which includes the thyroid cartilage 1152, the cricoid cartilage 1154, and the tracheal rings 1156. After trachea module 1136 is inserted into trachea module insertion area 1113, skin cover 1138 is installed over the insertion area 1113. In operation, a trainee must palpate the throat area to locate the trachea module 1136, the thyroid cartilage 1152, the cricoid cartilage 1154, and the tracheal rings 1156 to determine the proper location to cut through skin cover 1138 to access the proper location on trachea module 1136 to perform a cricothyroidotomy to assist with breathing.

Figure 24:
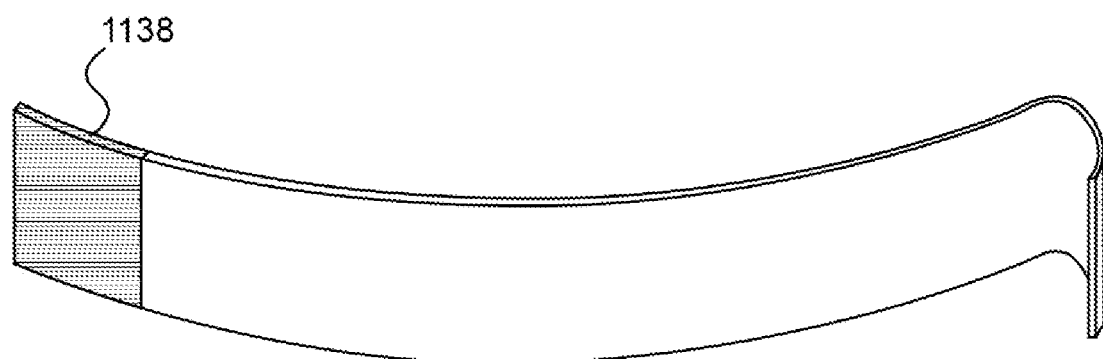
FIG. 24 is a front view of a skin cover.

FIG. 24 shows skin cover 1138. To hold skin cover 1138 in place, a fastening means such as hook and loop type fasteners are used. When skin cover 1138 is placed over a pulse emitter (see FIG. 20), a trainee is able to palpate the area and find the emitted pulse.

Figure 25:
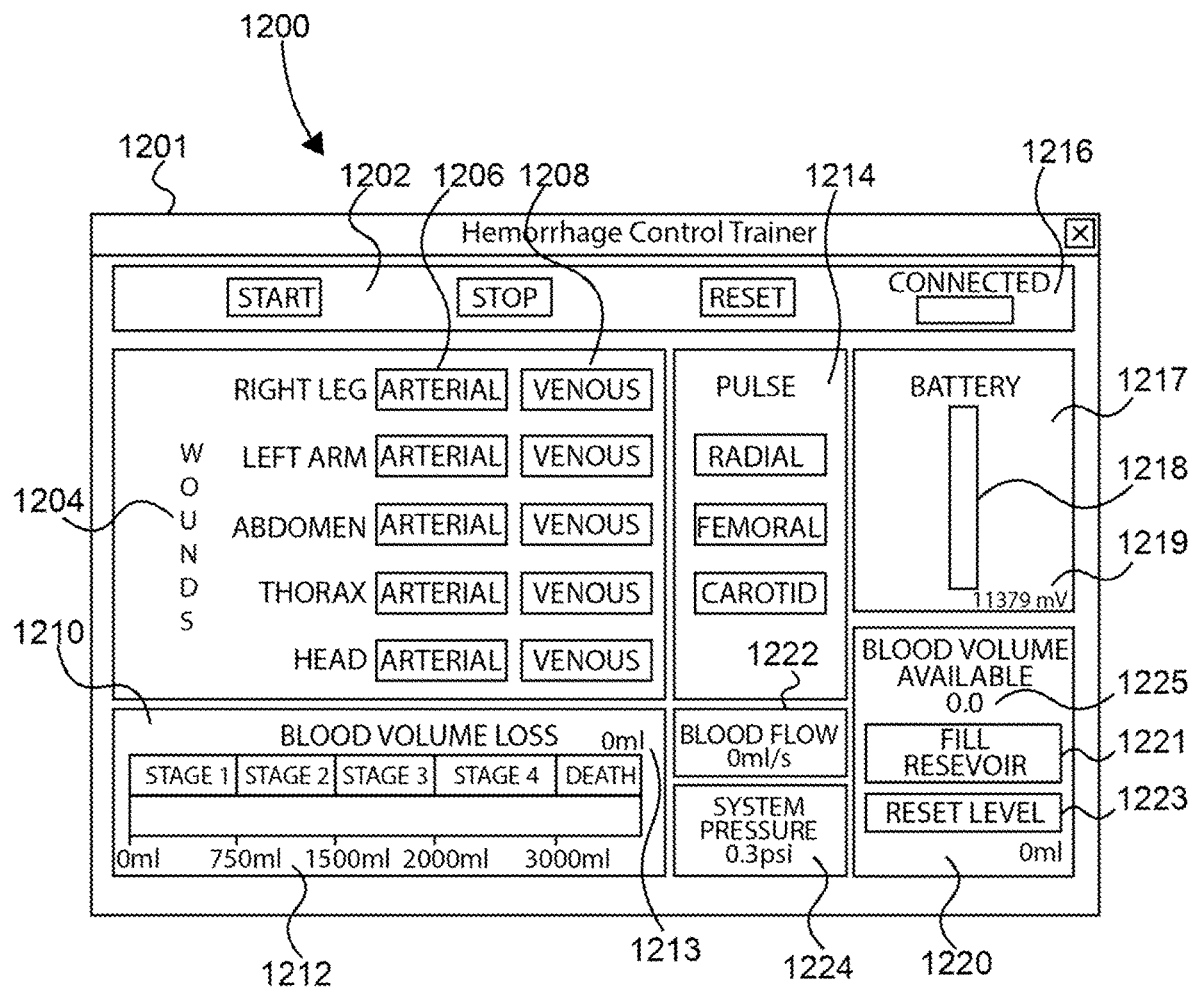
FIG. 25 is a view of the control screen on a remote control device allowing control of blood pressure, pulse rate, rate of blood loss, and system information.

FIG. 25 is a diagram view of a control screen typical of a remote control device and is designated 1200. Through control device 1200, a trainer or operator may operate all functions of HCT 1100 through GUI 1201. Specifically, the trainer/operator may start, stop, and reset the simulator through section 1202 of 1201. Connection indicator 1216 indicates a connection has been established between control device 1200 and the HCT 1100. Wound control 1204 allows the trainer/operator to start and stop either arterial or venous like bleeding from a leg, arm, abdomen, thorax, or head wound. Blood loss indicator 1210 indicates the total amount of blood lost by the HCT 1100. To indicate the amount of blood loss, blood loss scale 1212 indicates by way of a bar graph the amount of blood loss during the simulation. Blood loss is categorized in stages, specifically Stages 1 through 4. When blood loss reaches the end of Stage 4 (13000 milliliter total blood loss), death may be assumed. Blood loss indicator also shows blood loss total 1213, which shows the calculated level of blood loss.

Section 1214 of user interface 1200 provides control for the Radial, Carotid, and Femoral pulse emitters 1114, 1116, and 1118. In manual operation, the user may input a desired pulse rate. Depending on the type of wound being simulated, one pulse emitter may be set to a different rate from the other pulse emitters. For example, femoral pulse emitter 1118 may be set to a slower pulse rate than radial and carotid pulse emitters 1114 and 1116. If the pulse rates are controlled by a pre-programmed sequence, an operator may override the pre-programmed settings with manual settings.

Connection indicator 1216 of control device 1200 provides an indication when control device 1200 is connected to HCT 1100. In a preferred embodiment, the connection between control device 1200 and HCT 1100 is wireless, which includes radio frequency and infrared. However, wired connections are fully contemplated and do not depart from the spirit of the disclosure.

Battery indicator 1217 consists of battery charge indicator 1218 and battery output voltage indicator 1219. Battery charge indicator 1218 is a bar graph indicator that shows the current charge level of battery 1125. The output voltage of battery 1125 is indicated by battery output voltage indicator 1219. Depending on the type of battery 1125 used to power HCT 1100, battery output voltage indicator 1219 can be used to determine the amount of battery life remaining in battery 1125. For example, the output voltage of an alkaline battery drops linearly during use whereas a typical rechargeable battery has a small drop in output voltage during use until the end of the battery charge where the output voltage suddenly experiences a sharp drop.

Blood volume indicator 1220 consists of a fill reservoir button 1221, a reset level button 1223, and an available blood volume indicator 1225. In operation, the user presses fill reservoir button 1221 to input the amount of blood added to bladder 1132. After filling bladder 1132, the operator presses reset level button 1223 to set available blood volume indicator 1225 back to zero (0). Lastly, control device 1200 has a system pressure indicator 1224, which indicates the current pressure in the pumping system.

Referring now to FIG. 26, an exemplary system diagram of HCT 1100 is shown and designated 1300. The electrical portion of system 1300 consists of controller 1302, which is responsible for coordinating the operation of system 1300. Connected to controller 1302 is wireless module 1304, pulse emitters 1306, battery monitor 1308, pump 1310, flow sensor 1312, pressure sensor 1314, solenoids 1316 and 1318, and output control valves 1320.

The mechanical portion of System 1300 consists of bladder 1132, which is connected to solenoids 1316 and 1318. Solenoid 1316 is connected to pump 1310 and fill connector 1122. The output of pump 1310 goes to flow sensor 1312 and pressure sensor 1314. The output of pressure sensor 1314 is connected to solenoid 1318, which in turn connects to control valves 1320. Control valves 1320 connect to the various wound locations on training suit 1102. For example, low pressure control valve 1322 and high pressure control valve 1324 both connect to facial wound simulator 1104 (not shown).

In operation, controller 1302 controls the operation of the internal components of system 1300. Solenoids 1316 and 1318 control the flow to and from bladder 1132. For example, when filling bladder 1132, a volume of simulated blood is connected to fill connector 1122. Controller 1302 adjusts solenoid 1316 such that the simulated blood is directed from fill connector 1122 to bladder 1132. After bladder 1132 is filled to the desired level, controller 1302 adjusts solenoid 1316 to isolate fill connector 1122 from bladder 1132 and pump 1310. When a user initiates a training sequence or manually inputs a pump command from remote control device 1200, solenoid 1316 adjusts such that bladder 1316 is connected to the input of pump 1310. Pump 1310 is controlled by controller 1302 to simulate the desired wound conditions. For example, pump 1310 can be pulsed to help simulate the flow of blood in an arterial wound. Pump 1310 can also be run at a constant pressure when control valves 1320 are used to control the blood flow from a wound.

The output of pump 1310 is connected to flow sensor 1312 and pressure sensor 1314, which send flow and pressure data to controller 1302 to be used, for example, to calculate blood loss during a simulation. As a further example, in some training scenarios, HCT 1100 is positioned on its back. This causes the weight of manikin 1101 to apply a downward force on bladder 1132 thereby creating a pressure inside bladder 1132. This pressure is then used to force the flow of blood to control valves 1320 through solenoid 1318 where control valves 1320 are used to simulate the type of blood flow required for the type of simulated wound. In this configuration, pump 1310 is not used.

In a typical operation, the output from pressure sensor 1314 is directed to solenoid 1318, which then directs simulated blood flow to control valves 1320. As described above, control valves 1320 are connected to the wound simulators located on training suit 1102 through bleed connectors. For example, the output of low and high pressure control valves 1322 and 1324 are connected to facial bleed connector 1126, which in turn connects to facial wound simulator 1104. The remaining control valves 1320 are connected to thorax, arm, abdominal, and leg wound simulators 1106, 1108, 1110, and 1112 through neck and radial bleed connectors 1126, femoral bleed connector 1128, and abdominal bleed connector 1130 respectively.

Wireless module 1304 sends and receives data from control device 1200. The use of a wireless connection allows for a user to remotely operate HCT 1100 without the need for wires thereby adding to the realism of a simulation. Pulse emitters 1306 are controlled by controller 1302. In operation, controller 1302 coordinates the pulse rates with the amount of blood loss. For example, a normal and strong pulse rate is simulated at the beginning of a training simulation. As the simulation progresses and the simulated blood loss increases, the simulated pulse rate may become quicker and faint until the amount of simulated blood loss would indicate impending death, where the pulse rate becomes almost unascertainable when the trainee palpates the area. When the volume of blood is lost through the simulated wound(s), death is indicated and the pulse ceases to exist.

Battery monitor 1308 monitors the power supplied to the system. Battery monitor 1308 inputs the output voltage of the battery 1125, where controller 1302 calculates the amount of remaining power and then sends that information to control device 1200 through wireless module 1304.

The main purpose of HCT 1100 is to provide a simulation of an injured person suffering from one or more wounds. They type of wound(s) simulated determines the type of response necessary to save the life of a real person suffering from such injuries. For example, an arterial leg wound may require the use of a CAT to control the bleeding. If a trainee fails to timely assess HCT 1100 and apply a CAT to the leg wound, then blood loss with continue and the femoral pulse emitter 1118 will indicate the appropriate pulse deficit. As blood loss continues, the pulse deficit will increase even further until the trainee takes the proper remedial measures or the system indicates the injured person is dead, where all pulses will stop. As another example, a facial wound may require the use of a pressure dressing or packing (e.g. combat gauze) to control bleeding. The simulation may also require the use of a CROC, other types of tourniquets, and even the body weight of a trainee to control blood loss. Typical bandaging techniques may also be used to control bleeding.

In the event a facial or neck wound is simulated, an airway management capability is provided. Trachea module 1136 (see FIG. 23) is inserted into trachea module insertion area 1113 (See FIGS. 19 and 20) of manikin 1101, which is then covered with skin cover 1138. In operation, a trainee palpates trachea module 1136 for index points to find the proper location for a cricothyroidotomy. After locating the proper index points, the trainee cuts through skin cover 1138 then trachea module 1136, followed by insertion of an airway adjunct. Thus, the trachea module 1136 can be used for simulating an invasive surgical placement of a cricothyroidotomy. The use of an NPA and OPA may also be dictated by the simulation.

Emergency Casualty Care Trainer

Aspects of the present disclosure relate to a wearable device for simulating wounds and injuries received during a trauma event. Aspects of the present disclosure further relate to a medical training device for Trauma Emergency Casualty Care and Tactical Combat Casualty Care (TCCC). A wearable device may be worn by a live human (e.g., trauma actor) or simulated body (e.g., full/partial manikin, drag dummy, etc.). As above, a realistic experience is key to effective training.

According to one embodiment, a training suit for a medical trainer such as a Hemorrhage Control Trainer (HCT) may include an external and an internal garment. For clarity, the external and internal garment (along with their interfaces) may be referred to together as an emergency casualty care suit. Also for clarity, this embodiment of the medical trainer may be referred to as an emergency casualty care trainer (ECCT), which is understood to be similar to or otherwise related to a trauma emergency care trainer and the field of Tactical Combat Casualty Care (TCCC), which generally address the three most preventable causes of death from trauma: Hemorrhage, Loss of airway/Airway obstruction, and Tension pneumothorax (collapsed lung pressing on heart, and heart stops). In particular, the emergency casualty care trainer may be configured for and thus be useful for training for (1) Massive hemorrhage managed using tourniquets, hemostatic dressings, junctional devices, and pressure dressings; (2) Airway blockage managed by rapid and aggressive opening of the airway to include cricothyroidotomy; and (3) Respiration and breathing managed by the assessment for tension pneumothorax and aggressive use of needle decompression devices to relieve tension and improve breathing.

Figure 27:
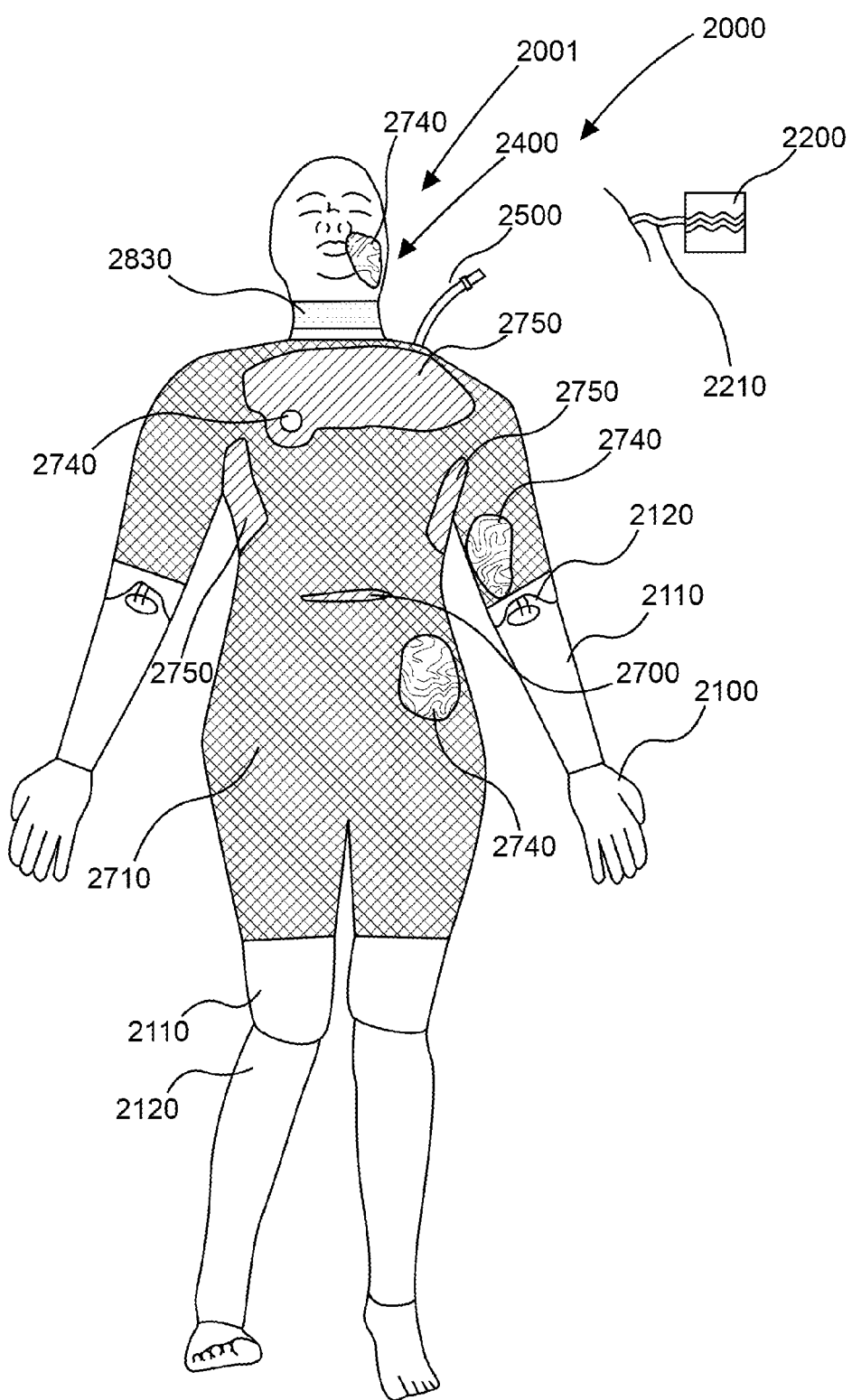
FIG. 27 is a front view of an exemplary emergency casualty care trainer, according to one embodiment of the disclosure.

FIG. 27 is a front view of an exemplary emergency casualty care trainer, according to one embodiment of the disclosure. As shown and as discussed above, the emergency casualty care trainer 2000 may include a manikin 2100 and an emergency casualty care suit 2400. For reference, the manikin 2100 may define a traditional frame-of-reference including front & back, top & bottom, left & right, and inside/inner & outside/outer, and as used throughout the present disclosure. In general, the emergency casualty care suit 2400 may be comprised of an inner and outer garment that are joined together via integral plumbing system, and configured to be worn on "Rescue Randy" type manikins.

As illustrated, the emergency casualty care suit 2400 may include an inner garment 2600 (FIG. 28) and an outer garment 2700. Preferably, the inner garment 2600 may be made of a first material selected so as to tactilely represent a layer of human flesh underlying a blood vessel (e.g. muscle and fat), and the outer garment 2700 will be made of a second material, the second material being thinner than the first material and generally representing a layer of human flesh covering a blood vessel (e.g., skin). The emergency casualty care suit 2400 may further include a blood plumbing system 2500 coupled to the inner garment 2600 and the outer garment 2700. The emergency casualty care trainer 2000 may further include a blood pumping system, or more generally, a blood supply system 2200, which is configured to supply a simulated blood to the blood plumbing system 2500 of the emergency casualty care trainer 2000.

According to one embodiment, one or more elements of the emergency casualty care suit 2400 may be part of an emergency casualty care kit 2001. The emergency casualty care kit may include the manikin 2100 including a head and a plurality of limbs, the blood plumbing system 2500, the inner garment 2600 configured to be worn by the manikin 2100, and the outer garment 2700 configured to be worn by the manikin 2100 over the inner garment 2600. The blood plumbing system 2500 may include a blood supply system interface and a first blood channel coupled to the blood supply system interface, with the first blood channel including a first wound interface, and with the first blood channel configured to convey a simulated blood from the blood supply system interface to the first wound interface. The inner garment 2500 may include a padding made of a first material, and at least one blood channel guide configured to route at least a portion of the first blood channel in a predetermined path. The outer garment including a skin cover made of a second material and a first simulated wound, the second material being thinner than the first material, the first simulated wound affixed to the second material and fluidly coupleable to the first wound interface.

According to one embodiment, the emergency casualty care kit 2001 may include any appropriate packaging, instructions, extra consumable parts, and the like. Further, it is understood that the emergency casualty care kit 2001 may include any embodiment of the aforementioned elements, as well as one or more additional elements or features described herein.

Figure 28:
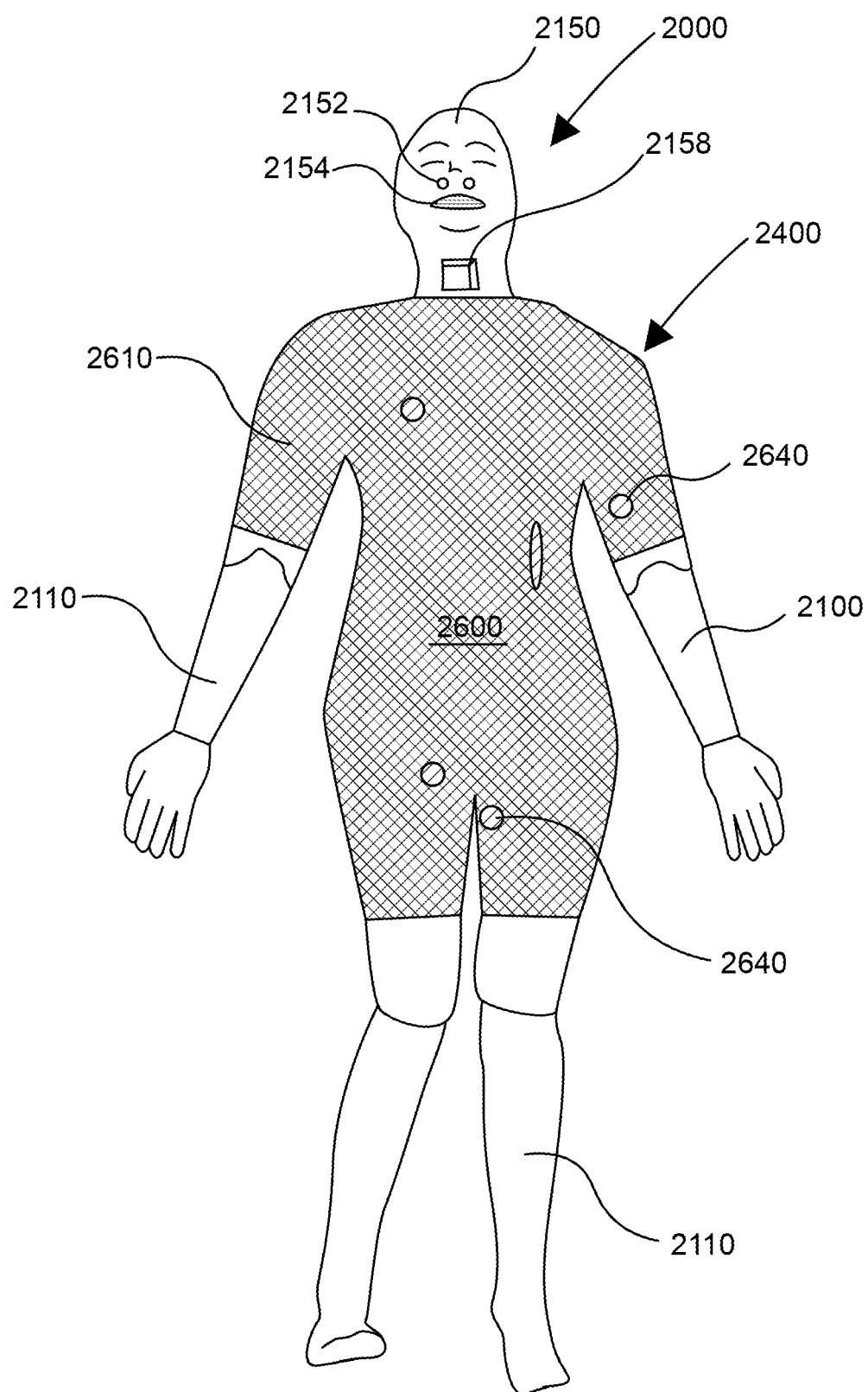
FIG. 28 is a front view of the exemplary emergency casualty care trainer of FIG. 27 having the outer garment removed, according to one embodiment of the disclosure.

FIG. 28 is a front view of the exemplary emergency casualty care trainer of FIG. 27 having the outer garment removed, according to one embodiment of the disclosure. According to one embodiment, the manikin 2100 may be a low-fidelity manikin such as a human drag dummy (similar to manikin 1101 described above). The drag dummy is understood to have a human form, size, and weight, and generally be a low cost tool for training on carrying or otherwise moving an incapacitated person. Further, the low-fidelity manikin is contrasted with a high-fidelity manikin, which will typically include animatronics and the latest technology, which may be very costly or otherwise inaccessible.

According to one embodiment, the manikin 2100 may be a simple molded form of a human, having limbs 2110 with articulating joints 2120 and a head 2150. The head may include a nose 2152 and a mouth 2154, with openings into each and a passageway therebetween (airway 2156). In addition, the head may include a throat cavity 2158 with an opening into a neck of the manikin 2100 and that joins the airway 2156.

Further, the manikin 2100 may be weighted appropriately, for example, the manikin 2100 may be a substantially hollow form having weights added to correspond to an average weight of a human having a similar size. Further, the manikin 2100 may include one of more needle cavities (not shown) integrated into its torso, which correspond to needle injection sites. According to one embodiment, the manikin 2100 may be a drag dummy modified to form one or more internal cavities sufficiently cavernous to receive a decompression needle inserted during training (e.g., 3 inches deep). As above additional weight may be added to compensate for any lost weight associated with the one or more internal cavities created.

Further, the manikin 2100 may include a chest plate (e.g., chest plate 1120) configured to tactilely appear as ribs of the manikin 2100 as felt from outside of the assembled emergency casualty care suit 2400. According to one embodiment, the chest plate may cover one or more internal cavities of the manikin 2100. According to one embodiment, the manikin 2100 may include a hanger 2130 (FIG. 29), such as a looped steel cable anchored to a hard point of the manikin 2100. In this way, the manikin 2100 may be hung for storage, cleaning, and/or use. Preferably the hanger 2130 will extend away from the manikin 2100 proximate its back upper shoulder area.

As above, the emergency casualty care suit 2400 may include the blood plumbing system 2500 coupled to both the inner garment 2600 and an outer garment 2700 (FIG. 27). Also as above, the inner garment 2600 may be made of a first material, and the outer garment 2700 will be made of a second material.

Generally, the inner garment 2600 is configured to be worn by a human form (here manikin 2100) and to support and route the blood plumbing system 2500 as desired. The inner garment 2600 may include a padding material 2610, one or more blood channel guides 2620 (FIG. 41) configured to route at least a portion of the blood plumbing system 2500 in a predetermined path, and an access fastener 2630 (FIG. 29) configured to facilitate dressing and undressing the manikin 2100.

The padding material 2610 may be a foamed synthetic rubber such as neoprene ("wetsuit material") or the like. The padding material 2610 may be selected in a thickness to simulate a layer of human flesh over a simulated blood vessel (e.g., simulated artery) to be palpated. For example, the padding material 2610 may be a sheet or layer of ~3 mm thick neoprene. Preferably, the padding material 2610 may be formed to substantially cover a torso of the manikin 2100 and well as portions of the limbs 2110 (generally resembling a "shortie wetsuit" by industry wetsuit standards, with half-length arms and legs). Beneficially, in this configuration, additional resistance to free movement may be provided to the individual limbs, providing additional realism, for example, as simulated muscle. It is understood that many different padding methods may be employed in combination or instead of the full torso/partial limbs covering (e.g., full body, target area, grid, etc.).

The one or more blood channel guides 2620 may be affixed to the padding material 2610, and configured to route the blood plumbing system 2500 in one or more predetermined paths, as discussed here and in further detail below. Preferably, the one or more blood channel guides 2620 will be made of elongated strips of fabric sewn to the padding material 2610 (e.g., a Cordura fabric strip sewn into the neoprene panel) and forming a tube sleeve/channel/passageway therebetween, where one or more tubes (blood channels 2530—see FIG. 40) may be slid into and guided along a predefined path. It is understood that many different fastening methods (e.g., fabric tubes, polymer tubes, rings, and clips, hook and latch fasteners, etc.) may be employed in combination or instead of the preferred fabric sleeve.

Preferably, the blood channel guides 2620 will be located on the inside of the padding material 2610 such that the guided or "routed" portion of the blood plumbing system 2500 is held between the padding material 2610 and the manikin 2100. As such, the inner garment 2600 may further include one or more vias 2640 passing through the padding material 2610. Each via 2640 may be configured to allow conduit of the blood plumbing system 2500 to pass through the inner garment 2600 after being routed as desired, and continue downstream to the outer garment 2700. According to one embodiment, the blood channel guides 2620 of the inner garment 2600 may cover substantially all portions of the blood plumbing system 2500 on the inside of the padding material 2610, after assembly. Beneficially, limiting the blood channel guides 2620 to the inner garment 2600 may provide for separation of the inner garment 2600 and the outer garment 2700 and flexibility of movement during transportation of the emergency casualty care suit 2400.

Figure 29:
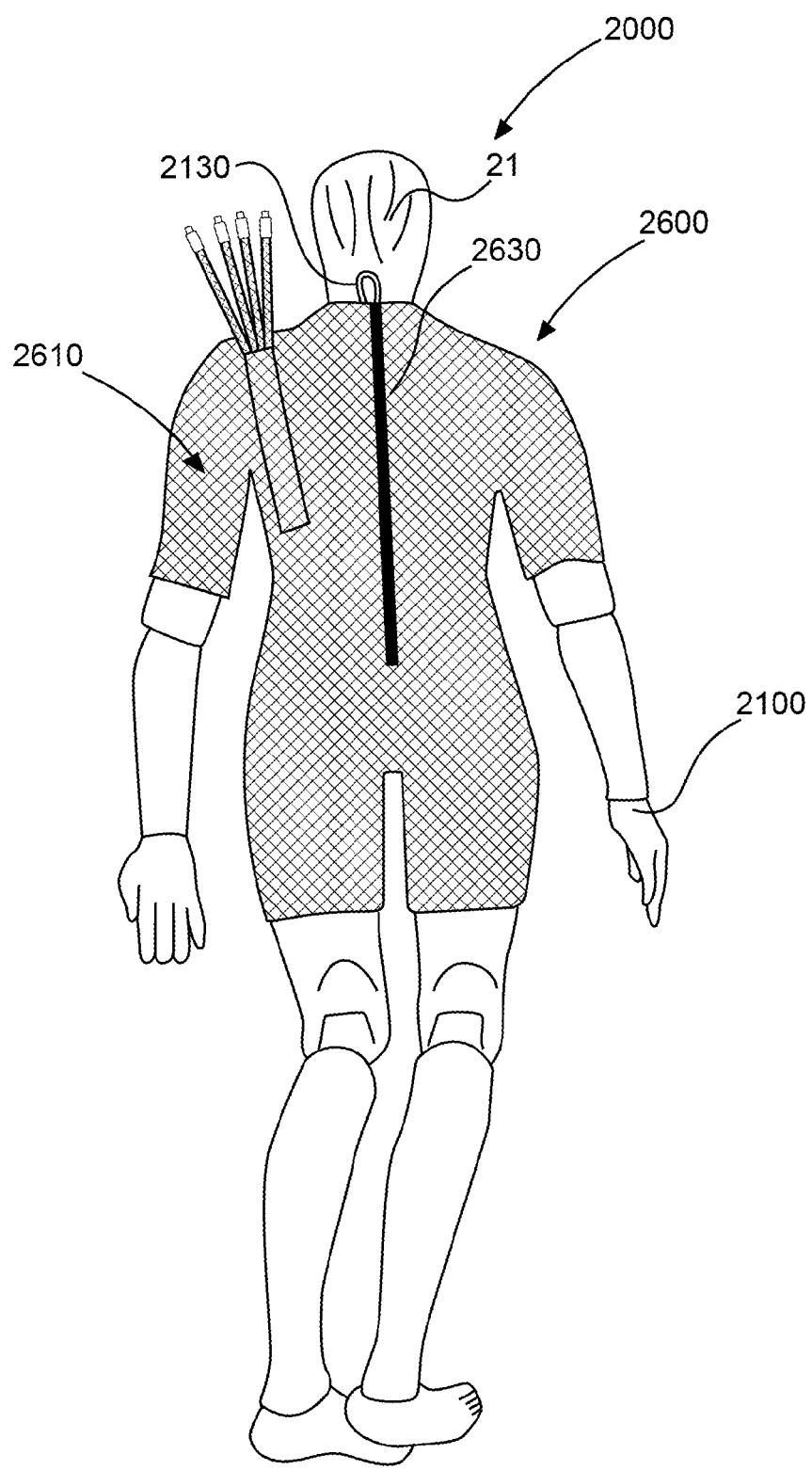
FIG. 29 is a back view of the exemplary emergency casualty care trainer of FIG. 27 having the outer garment removed, according to one embodiment of the disclosure.

FIG. 29 is a back view of the exemplary emergency casualty care trainer of FIG. 27 having the outer garment removed, according to one embodiment of the disclosure. As above, the inner garment 2600 may include the padding material 2610, the one or more blood channel guides 2620, and the access fastener 2630. The access fastener 2630 may be configured to open and close portions of the inner garment 2600 to facilitate dressing the manikin 2100 with the inner garment 2600, and removal of the inner garment 2600 from the manikin 2100. Preferably, the access fastener 2630 will be a heavy duty zipper that is corrosion resistant, which extends down the entire back of the manikin 2100 and has reinforced stitching. This may be particularly beneficial as its full length facilitates dressing/undressing of a generally rigid human form. Further, the reinforced stitching may be advantageous where the padding material 2610 is neoprene and has a relatively strong spring forces resisting closure the inner garment 2600.

Returning to FIG. 27, as shown and as discussed above, the emergency casualty care suit 2400 may include the inner garment 2600 (FIG. 28) made of the first material, the outer garment 2700 made of the second material, and the blood plumbing system 2500 coupled to both the inner garment 2600 and an outer garment 2700. As shown, the outer garment is 2700 configured to be worn by the manikin 2100 over the inner garment 2600. The outer garment 2700 may include a skin cover 2710, an access fastener 2730 (FIG. 31), and one or more simulated wounds 2740.

The skin cover 2710 may be configured support and position the one or more simulated wounds 2740 about the manikin 2100 as desired. Further, the skin cover 2710 may be configured to cover the inner garment 2600 while being worn by the manikin 2100, sandwiching portions of the blood plumbing system 2500 as discussed below. Preferably, the skin cover 2710 will completely cover the inner garment 2600 when worn, and is preferably made of a second material selected so as to visually represent a human skin. For example, the skin cover 2710 may be colored in any shade of human skin for added realism. Further, the second material may be selected so as to tactilely represent a layer of human flesh covering a blood vessel (skin) for purposes of palpating (searching) for a blood vessel. As such, the second material may generally be thinner than the first material.

According to one embodiment, the skin cover 2710 may be made of a 2-way stretch material (i.e., elastic in two orthogonal directions) such as spandex, a spandex-polyester blend, a blend of polyester with spandex, and the like (the "second material"). In this way, the outer garment 2700 may stretch over or otherwise facilitate dressing the manikin 2100 as well as adjusting the one or more simulated wounds 2740 into position. Preferably, the second material will be selected to provide a similar tactile feel as skin for purposes of training the locating of a blood vessel via palpation.

Figure 30:
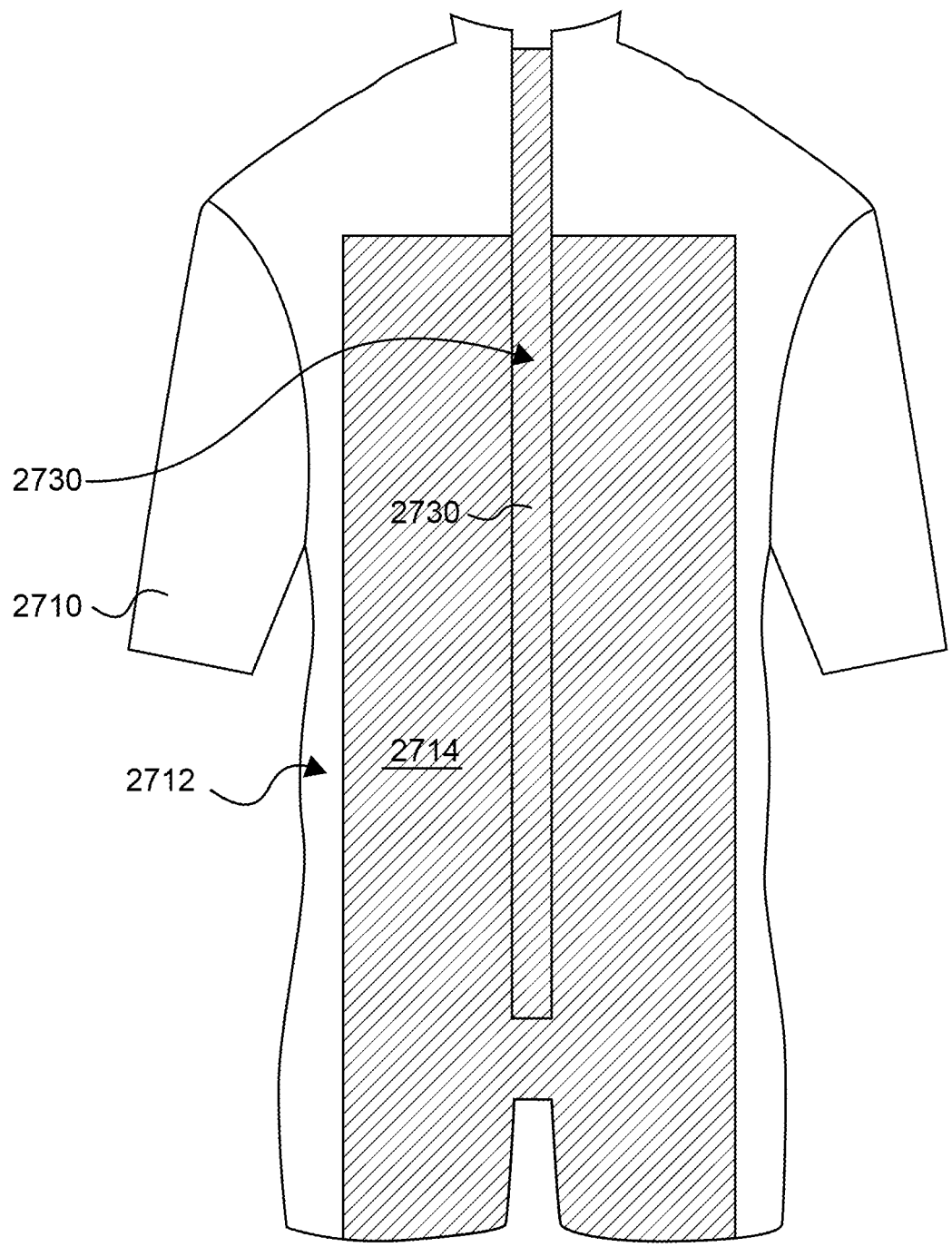
FIG. 30 is a back view of a skin cover of an outer garment for an exemplary emergency casualty care trainer, according to one embodiment of the disclosure.

FIG. 30 is a back view of the skin cover of the outer garment for an exemplary emergency casualty care trainer, according to one embodiment of the disclosure. As shown, the skin cover 2710 the outer garment 2700 may be reinforced. In particular, the skin cover 2710 may include both a flexible cover 2712 made of the second material and durable cover 2714 made of a third material. The third material may be a wear-resistant material such as canvas, textured nylon (e.g., Cordura nylon), and the like.

According to one embodiment, portions of the back side of the skin cover 2710 may include a third material. According to one embodiment, the wear-resistant fabric (i.e., the third material) may be sewn on top of the back of the 2-way stretch material (i.e., the second material). Alternately, the third material may replace portions of the second material and be sewn together at their edges. In addition, a flap cover of reinforced material (i.e., the third material) may be provided to cover the access fastener 2730, to provide similar benefits. Preferably, the reinforced material will be of a color similar to a shade of human skin.

Preferably, and as illustrated, the third material will substantially cover the back side of the outer garment 2700, i.e., without traversing either the left side nor the right side onto the front side. For example, the third material may cover the back side of the outer garment 2700 from proximate its bottom, to its shoulders, without crossing the shoulders onto the front side. According to the illustrated preferred embodiment, the wear-resistant reinforcement material of the skin cover 2710 may be sewn onto the back side of the 2-way stretch material of the skin cover 2710 from the bottom of the skin cover 2710 to the upper back, and between the left and right arms. Beneficially, in this preferred high performance configuration, the outer garment 2700, as a whole, will provide durability against wear, inter alia, when the manikin 2100 (FIG. 27) is dragged on its back on the ground, yet will still yield sufficiently to facilitate dressing and undressing the manikin 2100.

Figure 31:
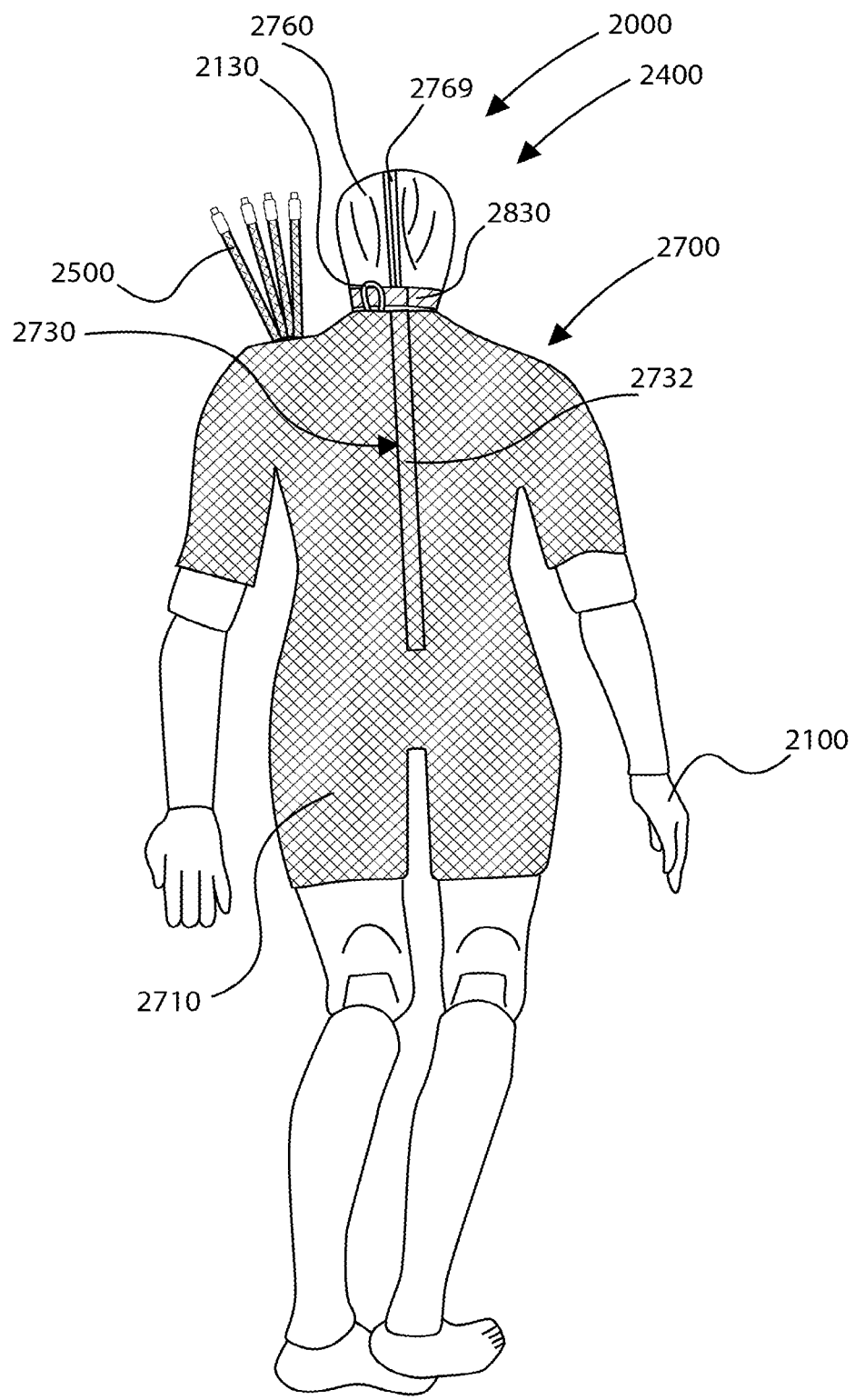
FIG. 31 is a back view of the exemplary emergency casualty care trainer of FIG. 27, according to one embodiment of the disclosure.

FIG. 31 is a back view of the exemplary emergency casualty care trainer of FIG. 27, according to one embodiment of the disclosure. As above, the outer garment 2700 may include may include the skin cover 2710, the access fastener 2730, and the one or more simulated wounds 2740.

The access fastener 2730 may be configured to open and close portions of the outer garment 2700 to facilitate dressing the manikin 2100 with the outer garment 2700, and removal of the outer garment 2700 from the manikin 2100. According to one embodiment, the access fastener 2730 may be a heavy duty zipper that is corrosion resistant, which extends down the entire back of the manikin 2100. This may be particularly beneficial as its full length facilitates dressing/undressing of a generally rigid human form. According to another embodiment, the access fastener 2730 may have reinforced stitching. According to yet another embodiment, the access fastener 2730 may include a fastener cover 2732. For example, the fastener cover 2732 may include extra material sewn in for protection of the full length of the zipper. As above, this extra material may be the reinforced material (the third material).

Figure 32:
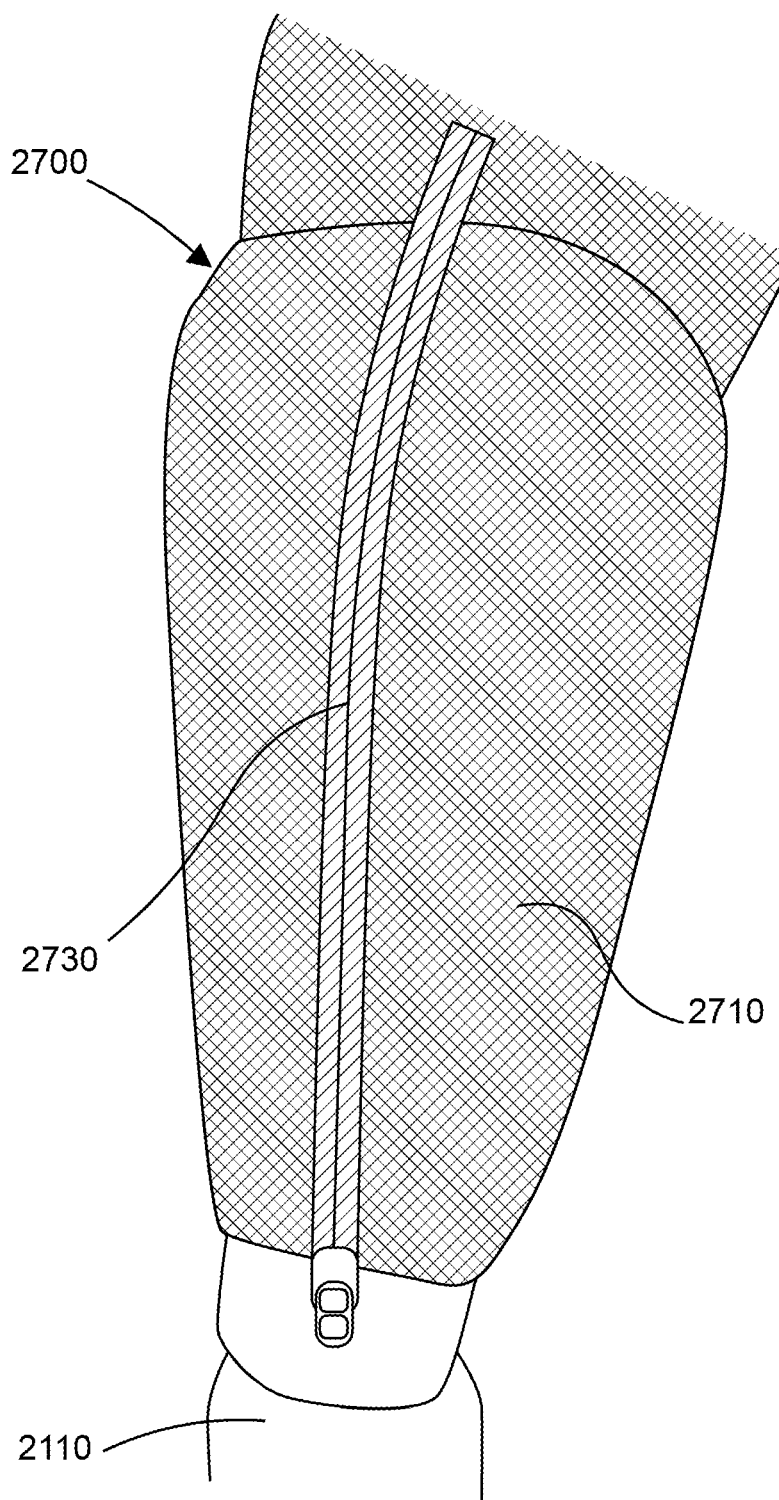
FIG. 32 is a detail view of one arm of the exemplary emergency casualty care trainer of FIG. 27, according to one embodiment of the disclosure.

FIG. 32 is a detail view of one arm of the exemplary emergency casualty care trainer of FIG. 27, according to one embodiment of the disclosure. According to one embodiment, the access fastener 2730 may, in addition to the center, be configured to open and close portions of the arms of the outer garment 2700 to facilitate dressing the manikin 2100 with the outer garment 2700, and removal of the outer garment 2700 from the manikin 2100. In particular, the access fastener 2730 may open portions of the left and right arms of the outer garment 2700. The access fastener 2730 may include a zipper is placed on each arm to allow easier on and off of the outer garment, where the zipper extends from the top of the shoulder to the end of the outer garment 2700 along the respective arm.

Figure 33:
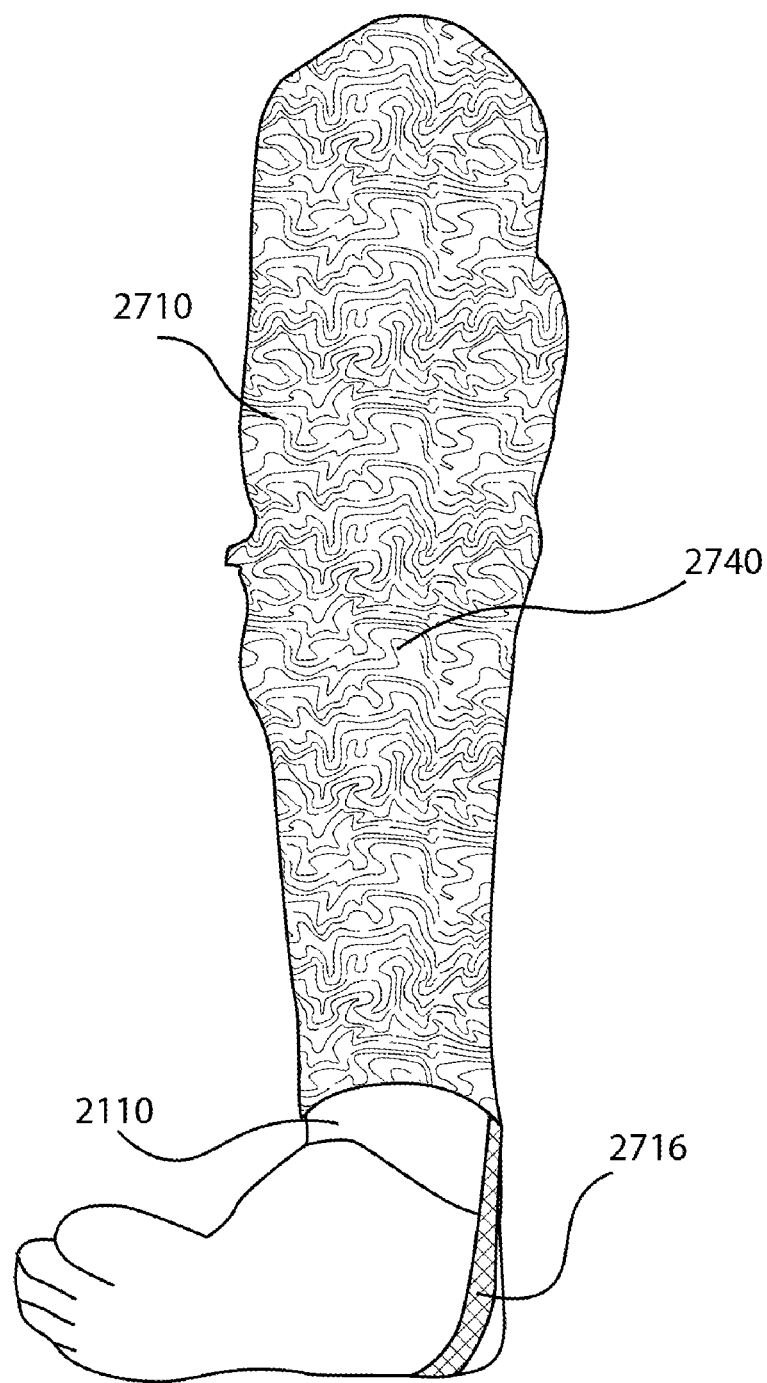
FIG. 33 is a detail view of one leg of an exemplary emergency casualty care trainer, according to one embodiment of the disclosure.

FIG. 33 is a detail view of one leg of an exemplary emergency casualty care trainer, according to one embodiment of the disclosure. As shown, the skin cover 2710, the access fastener 2730, and/or the one or more simulated wounds 2740 may extend along one or more limbs. Also as shown, where the skin cover 2710 extends the full length of a limb (e.g., leg or long sleeve), the skin cover 2710 may include a limb retention strap 2716 configured to inhibit the leg or sleeve from rising up the limb.

Returning to FIG. 27, as shown and as discussed above, the emergency casualty care suit 2400 may include the inner garment 2600 (FIG. 28) made of the first material, the outer garment 2700 made of the second material, and the blood plumbing system 2500 coupled to both the inner garment 2600 and an outer garment 2700. As shown, the outer garment is 2700 configured to be worn by the manikin 2100 over the inner garment 2600. As above, the outer garment 2700 may include may include the skin cover 2710, the access fastener 2730 (FIG. 30), and the one or more simulated wounds 2740. Also as above, the emergency casualty care suit 2400 may be configured for training on hemorrhages, respiration and breathing management, and/or airway management. Further, one or more features described above, may be applicable and included in the emergency casualty care trainer 2000.

When configured for training on hemorrhages, the one or more simulated wounds 2740 may be "wet" or bleeding wounds or dry (non-bleeding) wounds. For example, the bleeding wounds may include a neck bleed, and arm bleed, a groin bleed, a torso bleed, a chest bleed, a leg bleed, and the like, just to name a few. Also for example, the dry wounds may include cuts, burns, abrasions, shrapnel wounds, bullet wounds, and the like, just to name a few.

Preferably, each wet or dry wound may be made of a silicone material or the like, and arranged to have realistic texture and color. For example, a prosthetic mask grade silicone rubber may be used. As such, the one or more simulated wounds 2740 may be functional and interactive for treatment, and/or may be "non-functional" and merely included for added realism.

When configured as a functional or interactive bleeding wound the simulated wound 2740 may be fluidly coupled to the blood plumbing system 2500 (physically coupled to the inner garment 2600) via downstream pass-through connectors. For reference, upstream commonly refers to a fluid direction towards its source, and downstream commonly refers to a fluid direction towards its bleed exit.

Further, when configured as a functional or interactive bleeding wound, the simulated wound 2740 may be treated with wound packing techniques, and/or tourniquets dependent on wound location. For example, when configured as arm and/or leg wounds, the simulated wound 2740 may be treatable by tourniquet or wound packing techniques (coordinated with the blood plumbing system 2500). Also for example, when configured as neck and/or groin wounds, the simulated wound 2740 may be exclusively treatable by wound packing techniques known as "junctional' hemorrhages (also coordinated with the blood plumbing system 2500). Also for example, the simulated wound 2740 may be made to be amenable to treatment with an occlusive or non-occlusive dressing (e.g., made from materials amenable to skin adhesives, etc.)

When configured for respiration and breathing management, the outer garment 2700 may further include one or more decompression needle pads 2750. Needle decompression is a life-saving maneuver performed for the stabilization of a tension pneumothorax. Generally, in needle decompression, the trainee tactilely locates the second intercostal space (space between the second and third ribs) at the midclavicular line (imaginary vertical line in the body at the middle of the clavicle), and inserts a large needle (14 gauge or larger) attached to a catheter into the spot where the midclavicular line crosses the second intercostal space at an angle that is perpendicular to the chest.

Each decompression needle pad 2750 may be made of a resilient material that is at least partially self-healing or otherwise adapted for repeated needle insertions. In particular, as with the simulated wounds above, the silicone pad may be made of a similar silicone rubber. For example each decompression needle pad 2750 may include a silicone rubber pad that is less than 1 centimeter thick.

Each decompression needle pad 2750 may be may be sized, dimensioned, and positioned on the outer surface of the outer garment 2700 anatomically, for training needle decompression techniques. In particular, one or more decompression needle pad 2750 may extend across a target area for the particular needle decompression technique to be trained on. According to one embodiment, the target area for the particular needle decompression technique to be trained on may include immediately surrounding areas so as to obfuscate the precise injection location or otherwise require the trainee to locate it. In such an arrangement, the decompression needle pad 2750 may made sufficiently compliant to locate underlying markers/landmarks (e.g., ribs). Alternately, such markers may be integrated into the decompression needle pad 2750.

According to one embodiment, the one or more decompression needle pads 2750 may extend across an area of the outer surface of the outer garment 2700 in alignment with the abovementioned second intercostal space of the manikin 2100 (when worn). For example, this decompression needle pad 2750 may be, preferably, a single pad across the entire chest, or two individual pads on each side of the midclavicular line.

According to another embodiment, the one or more decompression needle pads 2750 may be similarly configured for axillary needle decompression techniques. In particular, the one or more decompression needle pads 2750 may extend across the respective target areas on one or both sides of the outer surface of the outer garment 2700 (generally along the ribs and under the armpits of the manikin 2100—when worn).

According to another embodiment, the one or more decompression needle pads 2750 may be combined with one or more simulated wounds 2740 as described above. In particular, a single molded member may include wound features (wet and/or dry) as well as decompression needle padding. For example, as illustrated, the decompression needle pad 2750 extending across the manikin's chest includes several above-mentioned features (i.e., dry, functional bullet wound, with single decompression needle pad across two separate target locations and including immediately surrounding areas) integrated into a single silicone rubber molded member.

FIG. 34-38 show a method of manufacturing a simulated wound and/or a decompression needle pad for an exemplary emergency casualty care trainer, according to one embodiment of the disclosure. Generally, the simulated wound 2740 may include an outer layer 2742 coupled to an inner layer 2744, forming a cavity 2743 therebetween. The outer layer 2742 may be configured to realistically represent a wound visually, tactilely, and/or functionally. Likewise, the inner layer 2744 may be configured to realistically represent a wound visually, tactilely, and/or functionally. For example, outward facing portions of the wound may be realistically painted. Generally the decompression needle pad 2750 may be manufactured as the outer layer 2742, as follows.

Figure 34:
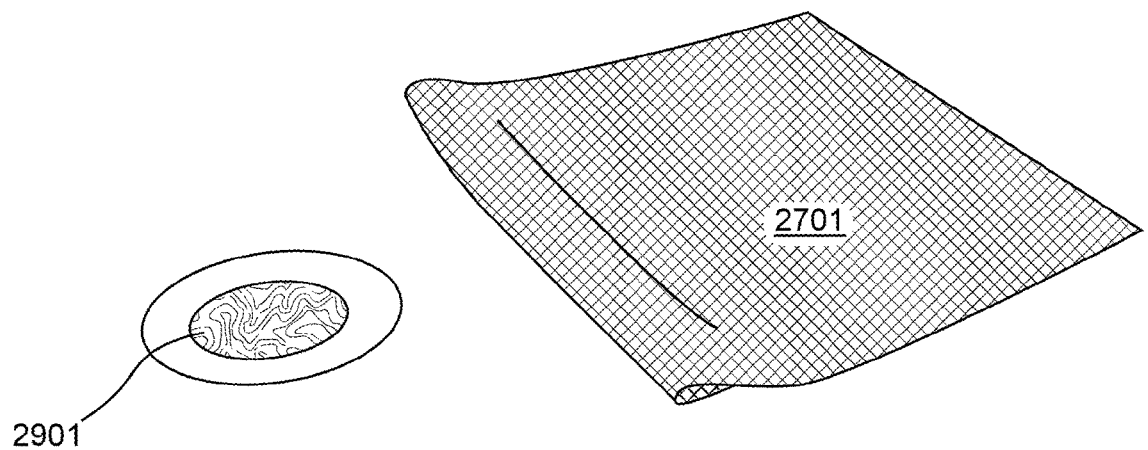
FIG. 34 is a method of manufacturing a simulated wound and/or a decompression needle pad for an exemplary emergency casualty care trainer, according to one embodiment of the disclosure.
Figure 35:
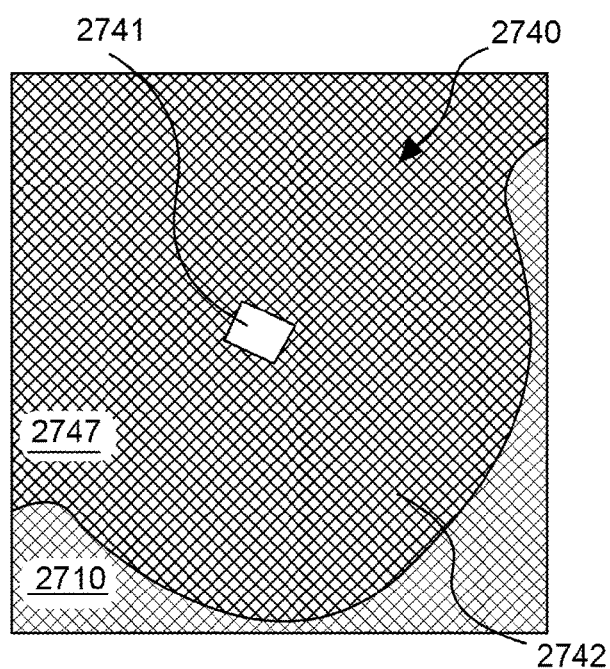
FIG. 35 is a method of manufacturing a simulated wound and/or a decompression needle pad for an exemplary emergency casualty care trainer, according to one embodiment of the disclosure.
Figure 36:
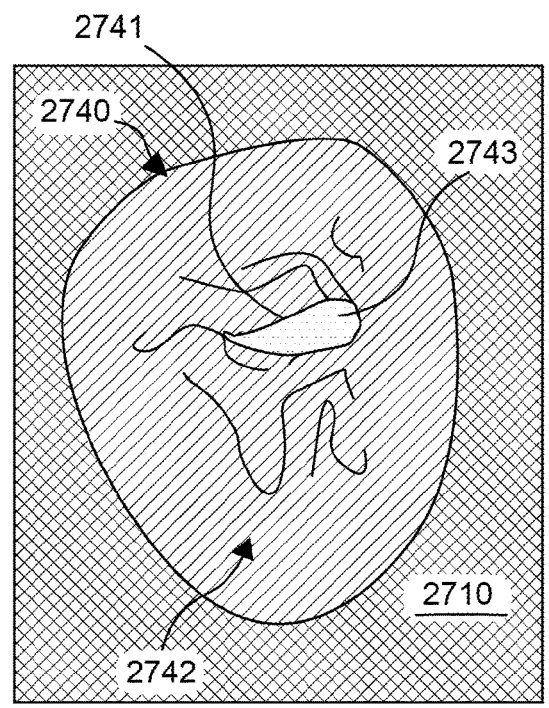
FIG. 36 is a method of manufacturing a simulated wound and/or a decompression needle pad for an exemplary emergency casualty care trainer, according to one embodiment of the disclosure.

Referring to FIGS. 34-36, in a preferred embodiment, the outer layer 2742 of the simulated wound 2740 may be manufactured as a polymer (e.g., silicone rubber) cured on top of and impregnated into the second material of the skin cover 2710. In particular, an uncured polymer may be poured into a wound mold 2901 that is configured to impart the desired outward facing features of the outer layer 2742 of the simulated wound 2740. For example, the features may include damaged skin and foreign matter. Next, the skin cover 2710 or a portion thereof (e.g., a panel) may be positioned over the mold so as to be wetted before curing.

Once the polymer has cured into the matrix of the skin cover 2710, the outer layer 2742 of the simulated wound 2740 may be removed from the wound mold 2901 and a bleed exit 2741 may be cut from the outer layer 2742. As shown, the bleed exit 2741 may traverse the outer layer 2742 from the wetted area 2747 to the front surface of the outer layer 2742 forming a port therethrough. Preferably, the bleed exit 2741 may be sized according to a maximum desired blood flow.

Figure 37:
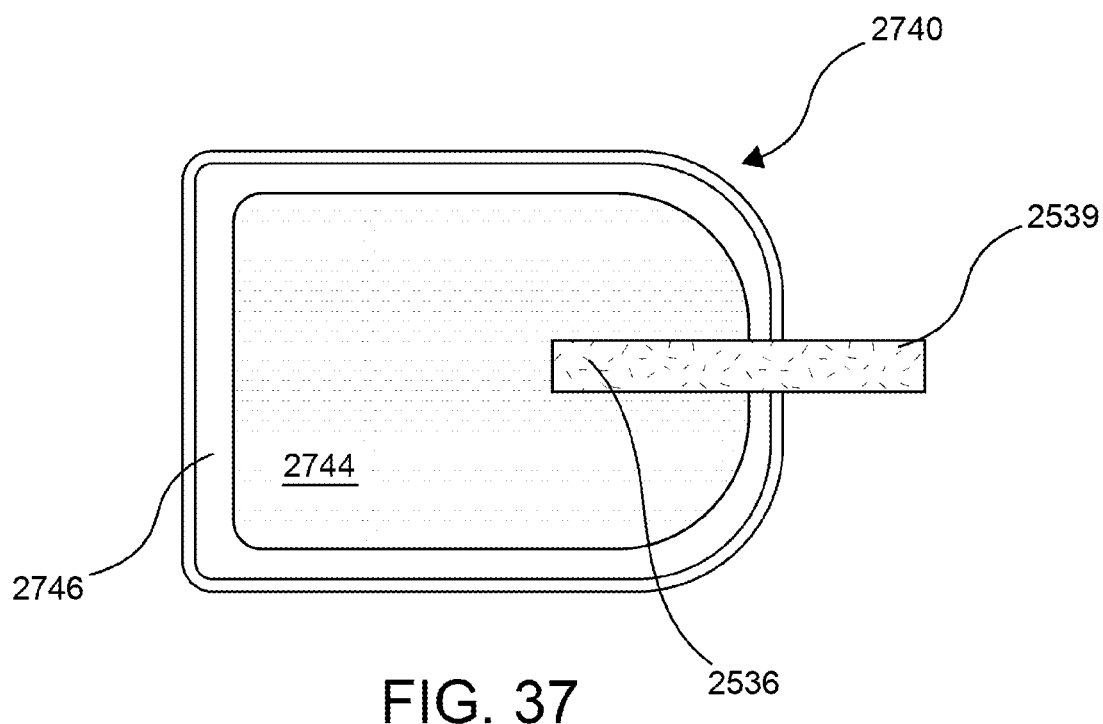
FIG. 37 is a method of manufacturing a simulated wound for an exemplary emergency casualty care trainer, according to one embodiment of the disclosure.

Now referring to FIG. 37, in a preferred embodiment, the inner layer 2744 of the simulated wound 2740 may be manufactured as a cured polymer (e.g., cured silicone rubber) having a substantially flat shape. As above, an uncured polymer may be poured into a wound mold 2901 (FIG. 34) that is configured to impart the desired outward facing features of the inner layer 2744 of the simulated wound 2740. Here, however, the features may be of muscle tissue and the overall shape may be generally flat.

Once the polymer has cured, for example, a wound interface 2536 and/or a simulated blood vessel 2539 may be positioned over the outward facing side of the inner layer 2744. Next, a seal 2746 may be added to a periphery of the inner layer 2744 (e.g., along the edge of its the outward facing side) and about the simulated blood vessel 2539 proximate the periphery.

Figure 38:
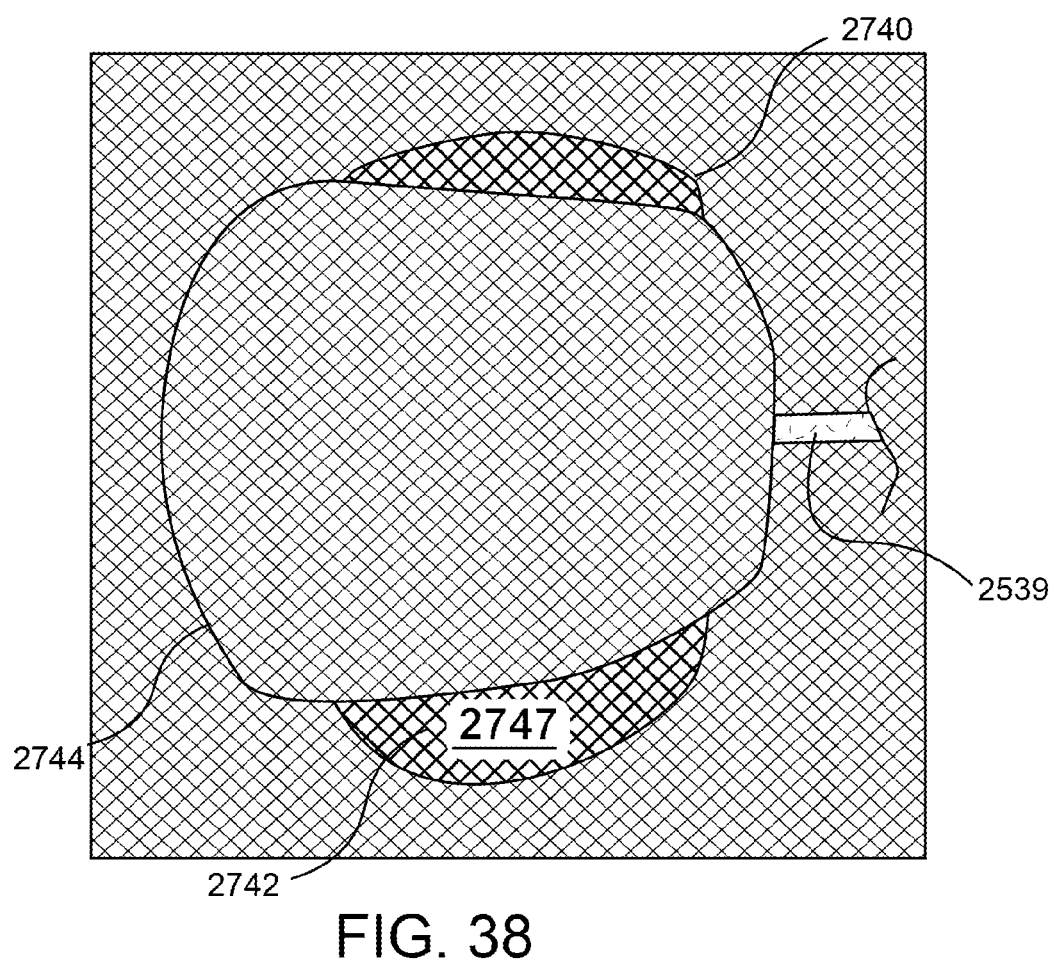
FIG. 38 is a method of manufacturing a simulated wound for an exemplary emergency casualty care trainer, according to one embodiment of the disclosure.

Now referring to FIG. 38, next, the wetted area 2747 of the outer layer 2742 may be mated to and subsequently cured (or otherwise adhered) to the seal 2746 of the inner layer 2744, such that the cavity 2743 is formed between the outer layer 2742 and the inner layer 2744, such that the cavity 2743 is completely sealed about the simulated blood vessel 2539, and such that inner side of the bleed exit 2741 is positioned with the cavity 2743. According to one embodiment, additional sealing and coupling may be added to the outer layer 2742 and the inner layer 2744.

Figure 39:
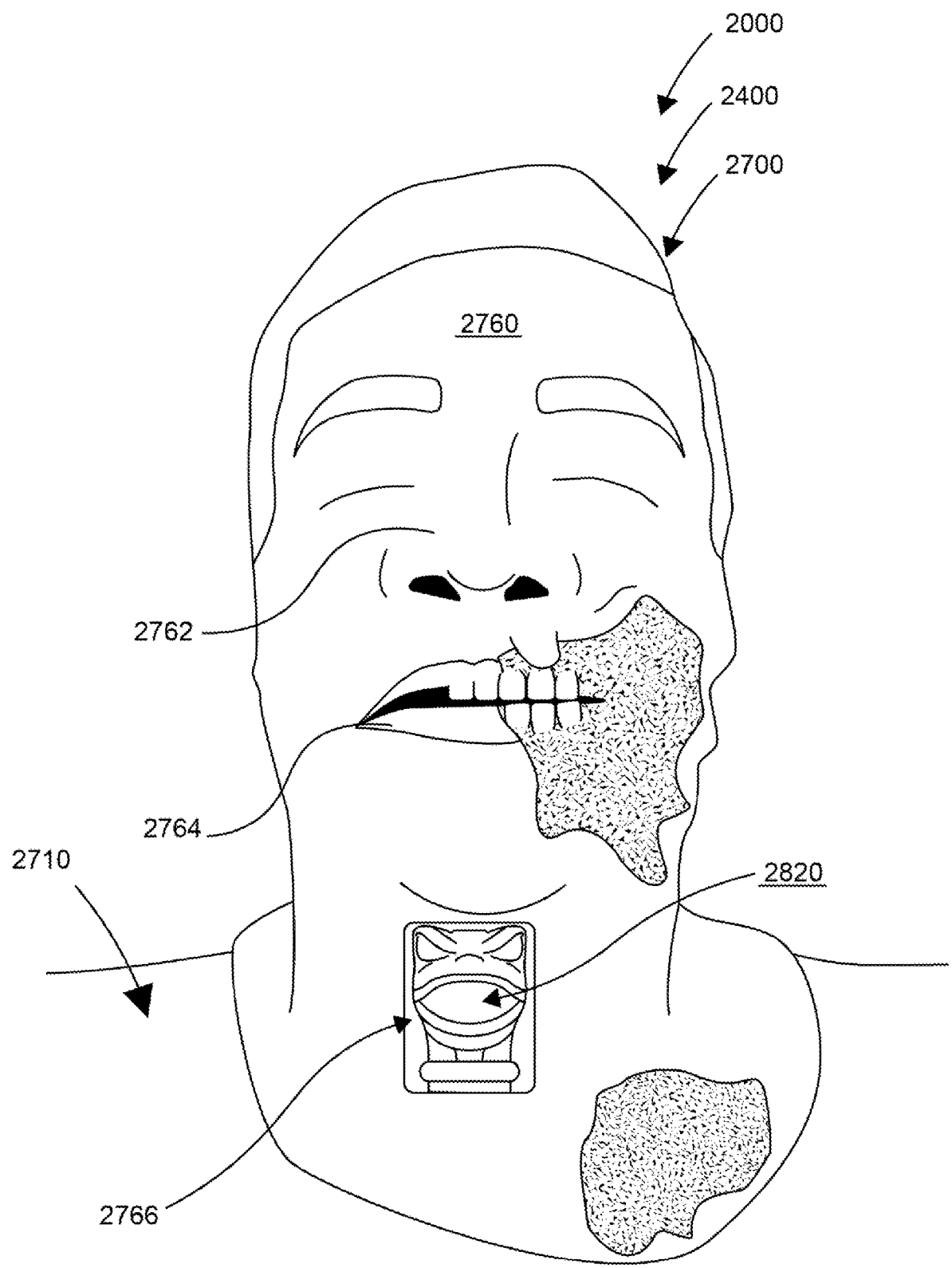
FIG. 39 is a detail view of a head area of the exemplary emergency casualty care trainer of FIG. 27, according to one embodiment of the disclosure.

FIG. 39 is a detail view of a head area of the exemplary emergency casualty care trainer of FIG. 27, according to one embodiment of the disclosure. As above, the emergency casualty care suit 2400 may be configured for training on hemorrhages, respiration and breathing management, and/or airway management. When configured for airway management, the outer garment 2700 may further include a mask 2760 configured to be worn over the head 2150 (FIG. 28) of the manikin 2100 (FIG. 28).

Returning to FIG. 31, according to one embodiment, the mask 2760 of the outer garment 2700 may further include a head access fastener 2769. In particular, the head access fastener 2769 may be configured to open and close portions of the outer garment 2700 to facilitate dressing the manikin 2100 with the outer garment 2700, and removal of the outer garment 2700 from the manikin 2100.

According to one embodiment, the head access fastener 2769 may be a heavy duty zipper that is corrosion resistant, which extends down the entire back of the head 2150 (FIG. 28) of the manikin 2100. This may be particularly beneficial as its full length facilitates dressing/undressing of a generally rigid bulbous head. Preferably, a gap may be provided between the head access fastener 2769 of the mask 2760 and the access fastener 2730 of the outer garment 2700, sized and dimensioned to permit free passage of the hanger 2130 of the manikin 2100. Advantageously, the entire emergency casualty care suit 2400 may be cleaned while the manikin 2100 is dressed, and may facilitate dressing/undressing the manikin 2100 as well.

According to another embodiment, the head access fastener 2769 may have reinforced stitching. According to yet another embodiment, the head access fastener 2769 may be configured to appear as the back of a human head, which may be accomplished with paint, a cover, or a combination thereof. Further, the cover may incorporate the reinforced material (the third material) described above.

Returning to FIG. 39, in this masked configuration, the emergency casualty care trainer 2000 may also be configured for training on airway obstruction (i.e., responsive to the airway being managed by rapid and aggressive opening of the airway—to include cricothyroidotomy). In particular, the emergency casualty care trainer 2000 may further include a trachea module 2820 and a trachea cover 2830 (FIG. 27). Referring also to the Hemorrhage Control Trainer (HCT) 1100 (shown in FIG. 19), here, the mask 2760 may be similar to the training suit head 1140 (shown in FIG. 19); the trachea module 2820 may be similar to the trachea module 1136 (shown in FIG. 23); and the trachea cover 2830 may be similar to the skin cover 1138 (shown in FIG. 24).

According to one embodiment, the mask 2760 may be made using conventional prosthetic mask materials and techniques. According to another embodiment, the entire mask may be made apart from the skin cover 2710 of the outer garment 2700, and subsequently attached to it proximate a neck area. For example, a silicone head skin of the mask 2760 may be sewn onto the top (e.g., neck/collar) of the outer garment 2700.

As shown, the mask 2760 of the outer garment 2700 may include a mask nose 2762, a mask mouth 2764, and a trachea module insertion area 2766. The mask 2760 may be configured to work in conjunction with the head 2150 (FIG. 28) of the manikin 2100 such that all air passageway are mated and aligned and such that the airway 2156 (FIG. 28) is unobstructed (discounting any object intentionally placed for training). Beneficially, this may provide for airway adjuncts to include supraglottic, OPA, NPA and surgical airways.

Likewise, the mask 2760 may be configured to work in conjunction with a trachea module 2820 and a trachea cover 2830 similar to the Hemorrhage Control Trainer (HCT). For example, the trachea module insertion area 2766 may be a cavity formed into the neck area of the mask and allows for the insertion of molded silicone anatomically correct trachea (trachea module 2820), which can be covered with a silicone molded neck skin fastenable via a hook and loop fastener (trachea cover 2830).

According to one embodiment, the mask 2760 may further include at least one simulated wound 2740 as described above. According to another embodiment, the simulated wound 2740 may be dry, wet, functional, non-functional, or any combination thereof. Where the simulated wound 2740 is a bleeding wound, it too may fluidly couple to blood plumbing system 2500, as described above. Further, the simulated wound 2740 may include maxillofacial trauma not found elsewhere on the body.

Figure 40:
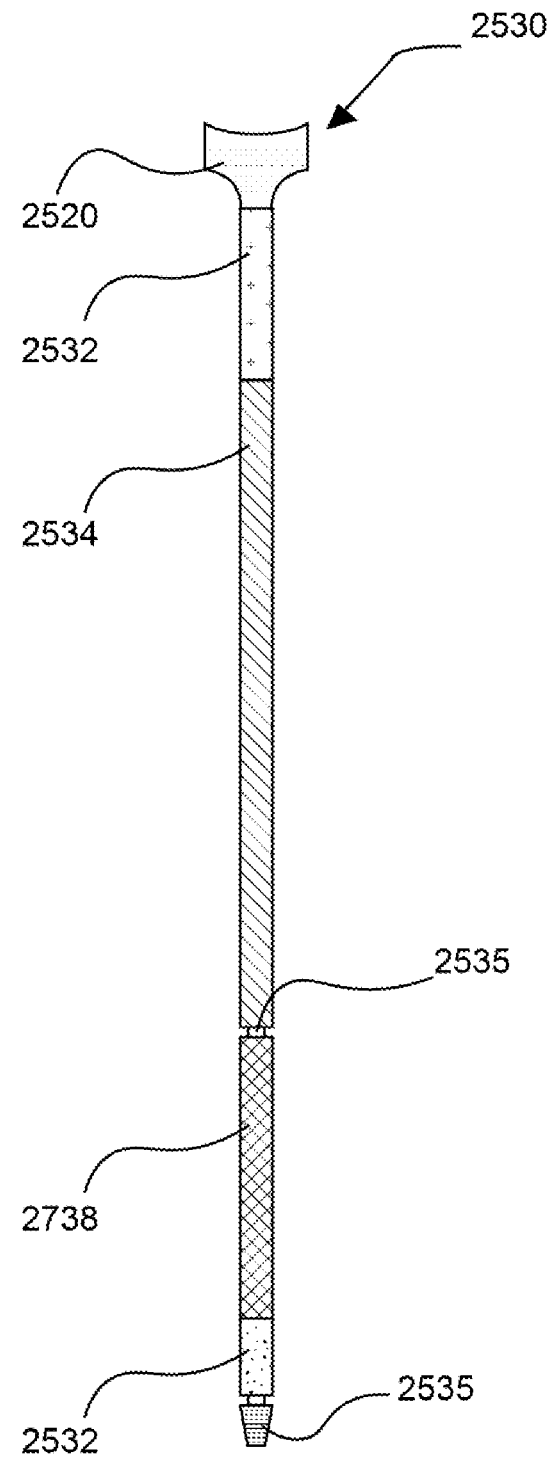
FIG. 40 is a detail view of a blood channel of a blood plumbing system of an exemplary emergency casualty care trainer, according to one embodiment of the disclosure.

FIG. 40 is a detail view of a blood channel of a blood plumbing system of an exemplary emergency casualty care trainer, according to one embodiment of the disclosure. As above, the emergency casualty care suit 2400 may include the blood plumbing system 2500 coupled to the inner garment 2600 and the outer garment 2700. The blood plumbing system 2500 is generally configured to deliver a simulated blood from the blood supply system 2200 to each simulated wound 2740 of the outer garment 2700, and at times passing through the inner garment 2600. As above, upstream refers to a fluid location closer to the blood supply system 2200, and downstream refers to a fluid location closer to the bleed exit 2741 of the simulated wound 2740.

The blood plumbing system 2500 may include at least one blood supply system interface 2520 and at least one blood channel 2530 fluidly coupled to the blood supply system interface 2520. According to one embodiment, the blood supply system interface 2520 may include one or more quick disconnect connectors configured to allow for rapid connection to simulated blood pumping systems. For example, where the blood plumbing system 2500 includes a plurality of blood channels 2530, the blood supply system interface 2520 may be configure as a plurality of individual (dedicated) quick disconnects, a single quick disconnect arraigned as a manifold or the like, or any combination thereof.

According to one embodiment, the blood channel 2530 may include a routing conduit 2534 and a wound interface 2536 (FIG. 37). The routing conduit 2534 may be fluidly coupled to and interspersed between the blood supply system interface 2520 (upstream) and wound interface 2536 (downstream).

According to one embodiment, the blood channel 2530 may further include a channel identifier 2532 configured to positively identify which simulated wound 2740 the blood channel 2530 pertains to. For example, the channel identifier 2532 may be a unique color or other indicia of how the blood channel 2530 should be routed, which is attached or otherwise present on at least a portion of the blood channel 2530. Preferably, the channel identifier 2532 may be added proximate an upstream end and/or a downstream end of one or more elements of the blood channel 2530. Further, the channel identifier 2532 may be added to any segment of the blood channel 2530 that is exposed to view when the blood channel 2530 is assembled in its respective blood channel guide 2620.

For example, and as shown, the channel identifier 2532 may include a uniquely colored portion proximate the downstream end of the routing conduit 2534. Also for example, and as shown, the channel identifier 2532 may include a uniquely colored portion proximate the downstream end of the routing conduit 2534. This may be accomplished by heat shrinking a colored sleeve to each end of the routing conduit 2534. In this configuration, the blood channel 2530 may be readily identifiable during manufacture, assembly, coupling, and repair. This may be particularly advantageous were a plurality of the blood channel 2530 are employed.

According to one embodiment, the blood channel 2530 may further include a simulated blood vessel 2539 (FIG. 37) fluidly coupled to routing conduit 2534. Where the blood channel 2530 includes both the routing conduit 2534 and the simulated blood vessel 2539, the routing conduit 2534 may be fluidly positioned upstream of the simulated blood vessel 2539. Preferably, the routing conduit 2534 and the simulated blood vessel 2539 will be fluidly coupled via an interconnect 2535 (e.g., conventional plastic pass through connector). In some embodiments, the wound interface 2536 may be integrated as at least a portion of the simulated blood vessel 2539.

According to one embodiment, the blood channel 2530 may further include an extension conduit 2538 fluidly coupled to routing conduit 2534. Since many elements of the emergency casualty care suit 2400 will be handmade, the extension conduit 2538 may be added to take up manufacturing tolerances, and may be configured to be trimmed during final assembly, as needed. In some embodiments, the extension conduit 2538 may be integrated as at least a portion of the simulated blood vessel 2539. Preferably, the routing conduit 2534, the extension conduit 2538, and the simulated blood vessel 2539 will be fluidly coupled via interconnects 2535 (e.g., conventional plastic pass through connector). For example, a pass-through connector (interconnect 2535) may be attached to the downstream end of each tube/hose segment, and coupleable to the upstream end of a serially adjacent tube/hose.

Where the blood channel 2530 includes both the routing conduit 2534 and the extension conduit 2538, the routing conduit 2534 may be fluidly positioned upstream of the extension conduit 2538. Where the blood channel 2530 includes the routing conduit 2534, the extension conduit 2538, and the simulated blood vessel 2539, the extension conduit 2538 may be fluidly positioned upstream of the simulated blood vessel 2539.

Preferably, the routing conduit 2534 may be made of a stiff material (such as rubber hose) that reduces inadvertent occlusion risks (e.g., when the system is moved). In contrast, the simulated blood vessel 2539 may be made of a more flexible material (such as silicone hose) that specifically provides for occlusion of plumbing during training (e.g., when medical devices are used to stop "bleeding" by compressing the tube). Similarly, the extension conduit 2538 may be made of a material that is easy to cut (such as with scissors). According to one embodiment, the extension conduit 2538 may be made of a silicone hose, and/or may be made of the same material as the simulated blood vessel 2539.

Figure 41:
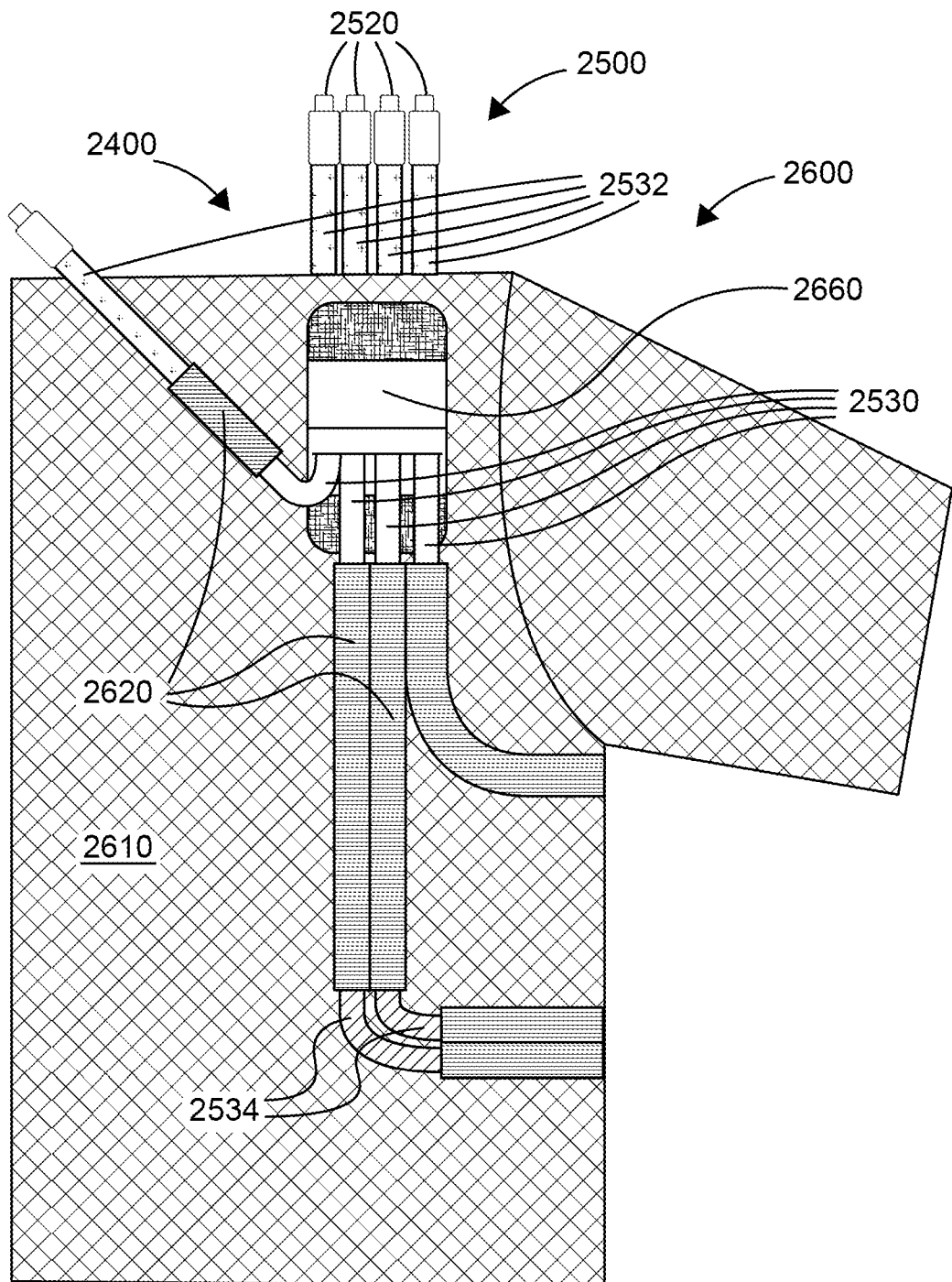
FIG. 41 is a detail view of a blood plumbing system of an exemplary emergency casualty care trainer, according to one embodiment of the disclosure.

FIG. 41 is a detail view of a blood plumbing system of an exemplary emergency casualty care trainer, according to one embodiment of the disclosure. Here, an upper (shoulder) portion of the inner garment 2600 is shown turned inside out. As illustrated, the blood plumbing system 2500 may preferably include a plurality of blood channels 2530. According to one embodiment, the blood plumbing system 2500 may include four blood channels 2530 configured to supply the simulated blood to a simulated wound 2740 representing a neck bleed, an arm bleed, a groin bleed, and a leg bleed, respectively. Further, each of the four blood channels 2530 may include a unique channel identifier 2532 (e.g., neck channel color coded red, arm channel color coded yellow, groin channel color coded green, leg channel color coded blue).

According to one embodiment, the inner garment 2600 may include a blood channel union 2660 configured to unite and hold the upstream ends of the plurality of blood channels 2530 securely in a predefined location (e.g., top back of shoulder). Preferably, the blood channel union 2660 may be configured to position the blood supply system interface 2520 of each blood channel 2530 (e.g., four quick disconnects) in one convenient location for connection to the blood supply system 2200 (FIG. 27). According to one embodiment, the blood channel union 2660 may be a reinforced fabric fold over patch (e.g., Cordura nylon patch) having toolless fastener (e.g., hood and latch fastener), which is configured to receive and secure in place the plurality of blood channels 2530 via opening and closing the toolless fastener over the plurality of blood channels 2530

According to one embodiment, the emergency casualty care suit 2400 may be assembled by routing the blood plumbing system 2500 the inner garment 2600 and coupling it to the outer garment 2700 (FIG. 27). In particular, the upstream end of the blood plumbing system 2500 may be secured by the blood channel union 2660, but leaving the blood supply system interface 2520 and the channel identifier 2532 exposed so as to be readily and fluidly coupleable to the blood supply system 2200 (e.g., via one or more quick disconnect connectors). It is understood that the blood plumbing system 2500 may include one or more blood channels 2530. Next the routing conduit 2534 of the blood plumbing system 2500 may be plumbed underneath the padding material 2610 and through the blood channel guide 2620 of the inner garment 2600 as desired. Preferably, the routing conduit 2534 may terminate between 2-6 inches from the via 2640 of the inner garment 2600, continued by the extension conduit 2538 (FIG. 40). Next the extension conduit 2538 of the blood plumbing system 2500 may be plumbed and passed through the padding material 2610 via the via 2640 (FIG. 28) and on to the outer garment 2700 (with the exception of the neck bleed, which the routing conduit 2534 may pass through a neck opening and couple directly to the neck wound, without the need for the extension conduit 2538). The extension conduit 2538 (where used) may be trimmed as needed, such that approximately an inch or less of the extension conduit 2538 extends beyond the via 2640. Next the extension conduit 2538 may be fluidly coupled to the simulated blood vessel 2539 (which may be integrated in advance as part of the simulated wound 2740 of the outer garment 2700. While the simulated blood vessel 2539 is not in a channel, it is anatomically positioned (e.g., proximate an associated artery) and it is left free to provide for its proper occlusion medical devices. Additionally, not being in the channels allows for more realism by not having stitching that would give a user landmarks to place a medical device.

Figure 42:
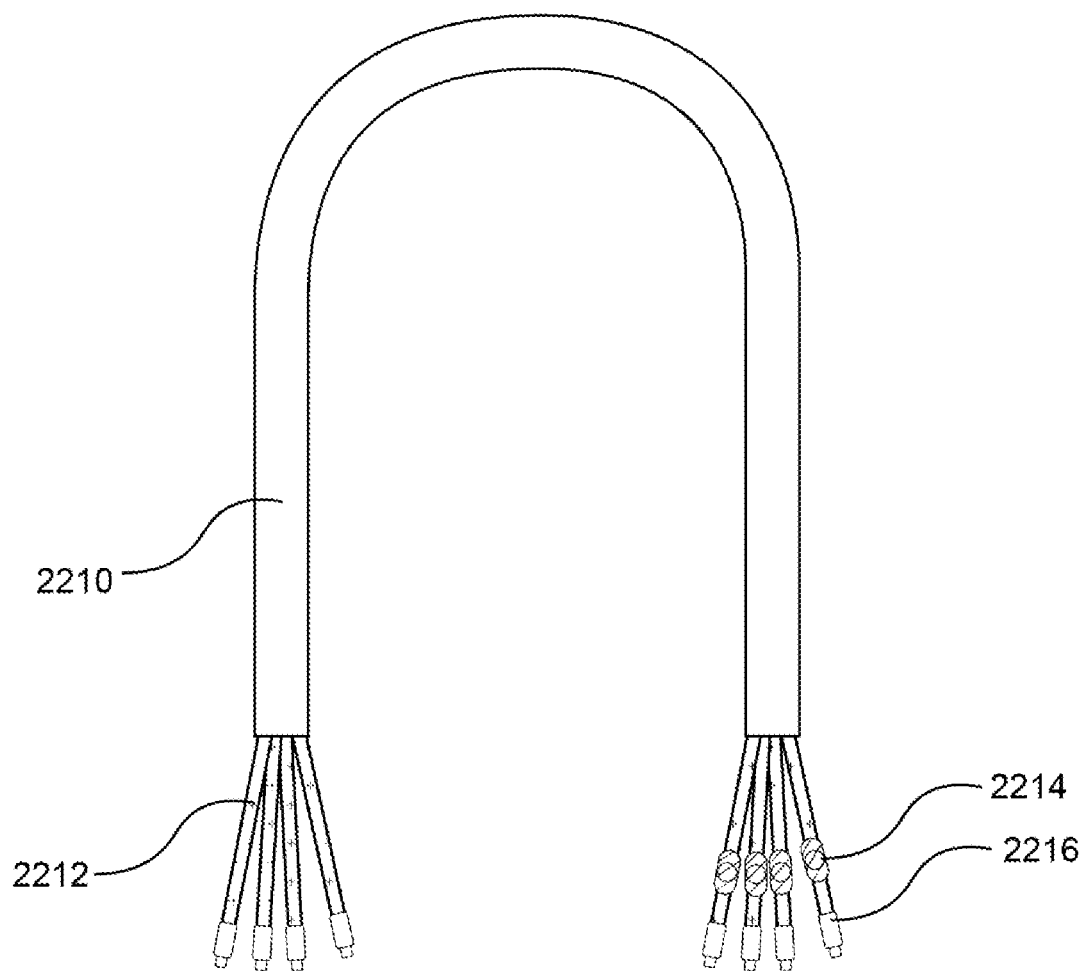
FIG. 42 shows a flow harness of a blood supply system of an exemplary emergency casualty care trainer, according to one embodiment of the disclosure.

FIG. 42 shows a flow harness of a blood supply system of an exemplary emergency casualty care trainer, according to one embodiment of the disclosure. As above, the blood supply system 2200 is configured to supply a simulated blood to the blood plumbing system 2500 (and ultimately to each simulated wound 2740) of the emergency casualty care trainer 2000. As shown, the blood supply system 2200 may include a flow harness 2210 configured to communicate the simulated blood from an offboard fluid delivery system to the blood supply system interface 2520 of each blood channel 2530. According to one embodiment, and as shown, the flow harness 2210 may include at least one tube 2212 configured to communicate the simulated, at least one flow valve 2214 (e.g., micro valve) configured to manually control flow (e.g., between full open and full closed), and at least one fluid couple 2216 configured to mate with the blood supply system interface 2520.

While there have been shown what are presently considered to be preferred embodiments of the present disclosure, it will be apparent to those skilled in the art that various changes and modifications can be made herein without departing from the scope and spirit of the disclosure. Further, the above description of the various embodiments is provided to enable a person of ordinary skill in the art to make or use the subject matter of the disclosure. Various modifications to the embodiments will be readily apparent to those skilled in the art, and the generic principles defined herein may be applied to other variations without departing from the spirit or the scope of this disclosure. Thus, it is to be understood that the disclosure is not intended to be limited to the examples and designs described herein, which merely represent a presently preferred implementation of the disclosure, but that the disclosure is to be accorded the widest scope consistent with the principles and novel features disclosed herein. It is to be further understood that the scope of the present disclosure fully encompasses other embodiments that may become obvious to those skilled in the art.

The invention claimed is:

1. A wearable medical trainer for a reference torso, the wearable medical trainer comprising:
an internal portion sized and dimensioned to cover the chest of a human, said internal portion made of a first material and configured as a protective layer over the reference torso;
a torso couple affixed to the internal portion, and configured to couple the internal portion to the reference torso;

an external raiment having an inner surface and an outer surface, the inner surface configured to face inward, relative to the reference torso, and to cover the internal portion, and the outer surface configured face outward, relative to the reference torso, and to simulate a human skin, the external raiment made of a second material, with the first material being more rigid than the first material; and a simulated injury positioned forward of the internal portion, relative to the reference torso.

2. The wearable medical trainer of claim 1, wherein the torso couple includes one or more straps secured to the internal portion, and configured to wrap around the reference torso such that the internal portion can be worn by the reference torso.

3. The wearable medical trainer of claim 2, wherein the internal portion is further configured as a shield to protect the reference torso against medical procedures performed upon the wearable medical trainer.

4. The wearable medical trainer of claim 3, wherein the internal portion includes a chest portion configured to shield a chest area of the reference torso, a left side portion configured to wrap around and shield a left abdominal area of the reference torso, and a right side portion configured to wrap around and shield a right abdominal area of the reference torso.

5. The wearable medical trainer of claim 4, wherein torso couple is separable such that the left side portion, and the right side portion can be unwrapped from the reference torso.

6. The wearable medical trainer of claim 5, wherein the torso couple, the left side portion, and the right side portion are integrated together as a wearable vest.

7. The wearable medical trainer of claim 2, wherein the reference torso includes two shoulders, two upper arms, a groin, and two upper thighs; and wherein the external raiment is configured to cover the shoulders, upper arms, groin, and upper thighs of the reference torso.

8. The wearable medical trainer of claim 2, further comprising a middle portion including a rib cage, and attached to the internal portion and forming a cavity between the internal portion and middle portion.

9. The wearable medical trainer of claim 8, wherein the torso couple, the internal portion and the middle portion are coupled together as a wearable vest; and wherein the internal portion and the middle portion are configured to simulate an internal structure of a human torso underneath the human skin.

10. The wearable medical trainer of claim 9, further comprising at least one prosthetic internal organ positioned between the internal portion and the external raiment.

11. The wearable medical trainer of claim 10, further comprising at least one of a prosthetic omentum and a prosthetic pleural membrane configured to cover the at least one prosthetic internal organ positioned between the internal portion and the external raiment, and to resemble a respective portion of an internal cavity of the human torso underneath the human skin.

12. A wearable medical trainer for a reference torso, the wearable medical trainer comprising:

a wearable vest including a first portion sized and dimensioned to cover the chest of a human, a second portion configured to simulate an internal structure of a human torso underneath a human skin, and a torso couple configured to couple the wearable vest to the reference torso, said first portion made of a first material and configured as a protective layer over the reference torso; and a simulated skin having an inner surface and an outer surface, the inner surface configured to face inward, relative to the reference torso, and to cover the simulated internal structure of the human torso, and the outer surface configured face outward, relative to the reference torso, and to simulate the human skin, the simulated skin made of a second material, with the first material being more rigid than the first material.

13. The wearable medical trainer of claim 12, wherein the first portion is further configured as a shield to protect the reference torso against medical procedures performed upon the wearable medical trainer; and wherein the first portion includes a chest portion configured to shield a chest area of the reference torso, a left side portion configured to wrap around and shield a left abdominal area of the reference torso, and a right side portion configured to wrap around and shield a right abdominal area of the reference torso, respectively, against medical procedures performed upon the wearable medical trainer.

14. The wearable medical trainer of claim 12, further comprising a simulated external injury integrated with the simulated skin.

15. The wearable medical trainer of claim 14, wherein the simulated external injury is configured to bleed out a simulated blood from the outer surface of the simulated skin, and to reduce or stop said bleeding, upon proper application of medical treatment.

16. The wearable medical trainer of claim 12, wherein the second portion includes at least a partial torso skeletal structure having at least one of a simulated rib cage, a simulated sternum, a simulated collar bone, and a simulated spine, the wearable medical trainer further comprising at least one prosthetic internal organ positioned between the internal portion and the simulated skin.

17. The wearable medical trainer of claim 16, wherein the at least one prosthetic internal organ positioned between the internal portion and the simulated skin is configured as a having a simulated internal injury that is inaccessible for medical treatment without first perforating the simulated skin.

18. The wearable medical trainer of claim 17, further comprising a module frame configured as a platform to which the at least one prosthetic human organs is attached to, said module frame positioned in front of the first portion and behind the least a partial torso skeletal structure of the second portion.

19. A medical trainer comprising:

a simulated torso sized and dimensioned as a human torso, said simulated torso including a chest;

a wearable vest including a first portion sized and dimensioned to cover the chest of the simulated torso, a second portion configured to simulate an internal structure of a human torso underneath a human skin, and a torso couple configured to couple the wearable vest to the simulated torso and alternately a human torso, said first portion made of a first material and configured as a protective layer over the simulated torso; and a simulated skin having an inner surface and an outer surface, the inner surface configured to face inward, relative to the reference torso, and to cover the simulated internal structure of the human torso, and the outer surface configured face outward, relative to the reference torso, and to simulate the human skin, the simulated skin made of a second material, with the first material being more rigid than the first material.

20. The medical trainer of claim 19, wherein the simulated torso further includes a throat cavity, the medical trainer further comprising
- a trachea module configured to physically simulate a human trachea, and positioned in the throat cavity of the simulated torso; and
- a trachea cover including a neck skin and neck fastener configured to removably cover the trachea module insertion area when the trachea module is in position.

* * * * *